United States Patent
Martínez González et al.

(10) Patent No.: US 12,263,632 B2
(45) Date of Patent: *Apr. 1, 2025

(54) DYNAMIC THERMOFORMING OF DENTAL APPLIANCES

(71) Applicant: Align Technology, Inc., San Jose, CA (US)

(72) Inventors: Luis Carlos Martínez González, Ciudad Juárez (MX); Rowan Fernando Garcia Saucedo, Pradera Dorada (MX); Mario Alfonso Rito Martinez, Ciudad Juárez (MX); Ismael Núñez García, Ciudad Juárez (MX); René David Alfaro, El Paso, TX (US); Shiva P. Sambu, Milpitas, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,616

(22) Filed: Oct. 10, 2023

(65) Prior Publication Data

US 2024/0033989 A1 Feb. 1, 2024

Related U.S. Application Data

(63) Continuation of application No. 17/835,839, filed on Jun. 8, 2022, now Pat. No. 11,897,181.

(60) Provisional application No. 63/210,443, filed on Jun. 14, 2021.

(51) Int. Cl.
*B29C 51/46* (2006.01)
*B29C 51/08* (2006.01)
*B29C 51/18* (2006.01)
*B29C 51/26* (2006.01)
*A61C 7/08* (2006.01)
*B29L 31/00* (2006.01)

(52) U.S. Cl.
CPC .............. *B29C 51/46* (2013.01); *B29C 51/08* (2013.01); *B29C 51/18* (2013.01); *B29C 51/266* (2013.01); *A61C 7/08* (2013.01); *B29L 2031/7532* (2013.01)

(58) Field of Classification Search
CPC ....... B29C 51/46; B29C 51/266; B29C 51/08; B29C 51/18; B29C 51/422; B29C 51/10; B29C 51/30; B29C 51/22; A61C 9/0046; A61C 7/002; A61C 7/08; B29L 2031/7536; B29L 2031/7532
See application file for complete search history.

(56) References Cited

U.S. PATENT DOCUMENTS 11,897,181 B2 * 2/2024 Martínez González ..................... B29C 51/08

* cited by examiner

*Primary Examiner* — Monica A Huson
(74) *Attorney, Agent, or Firm* — Lowenstein Sandler LLP

(57) ABSTRACT

A method includes identifying one or more images of a mold of a dental arch, identifying a digital model corresponding to the mold of the dental arch, providing the one or more images and the digital model as input into a trained machine learning model, receiving, from the trained machine learning model, output, and determining, based on the output, whether the mold matches the digital model.

21 Claims, 26 Drawing Sheets

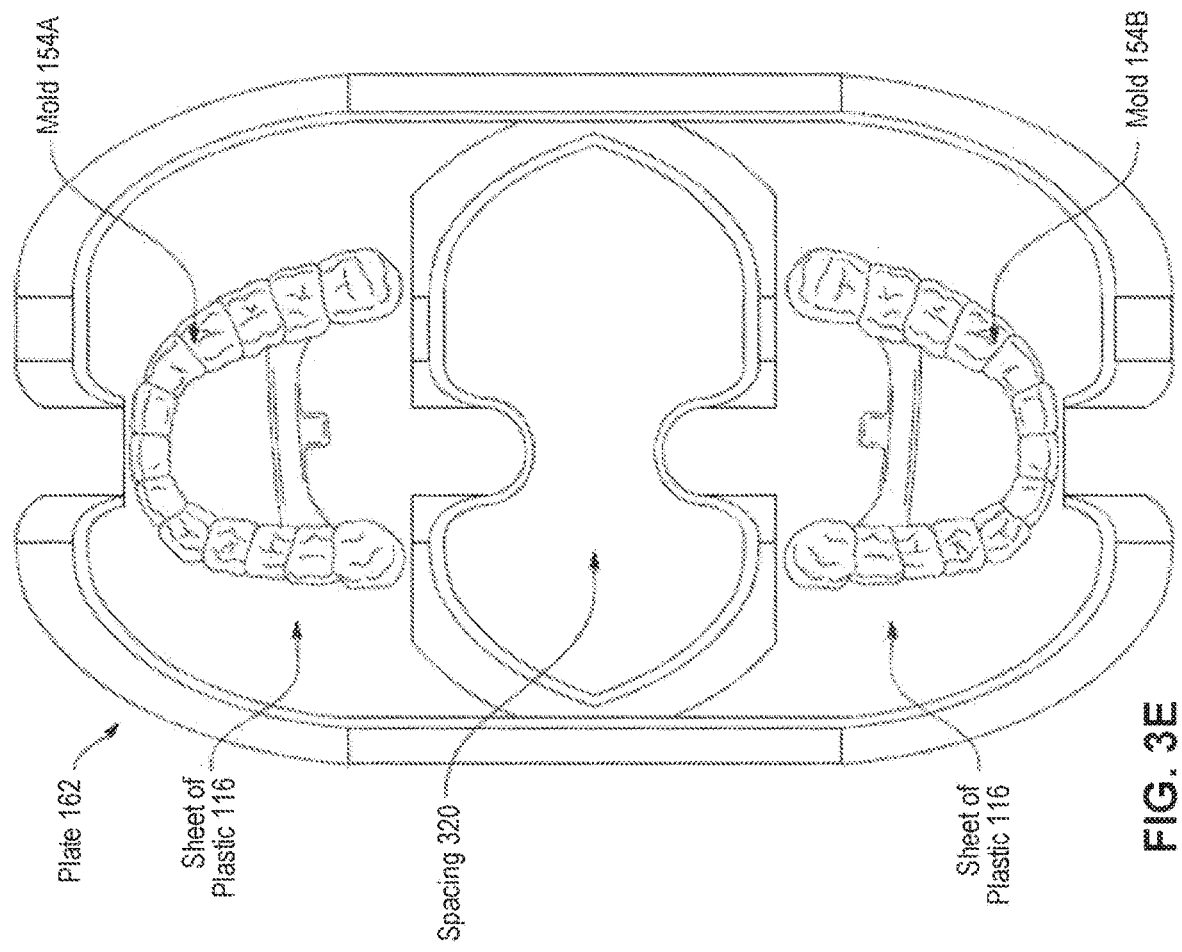
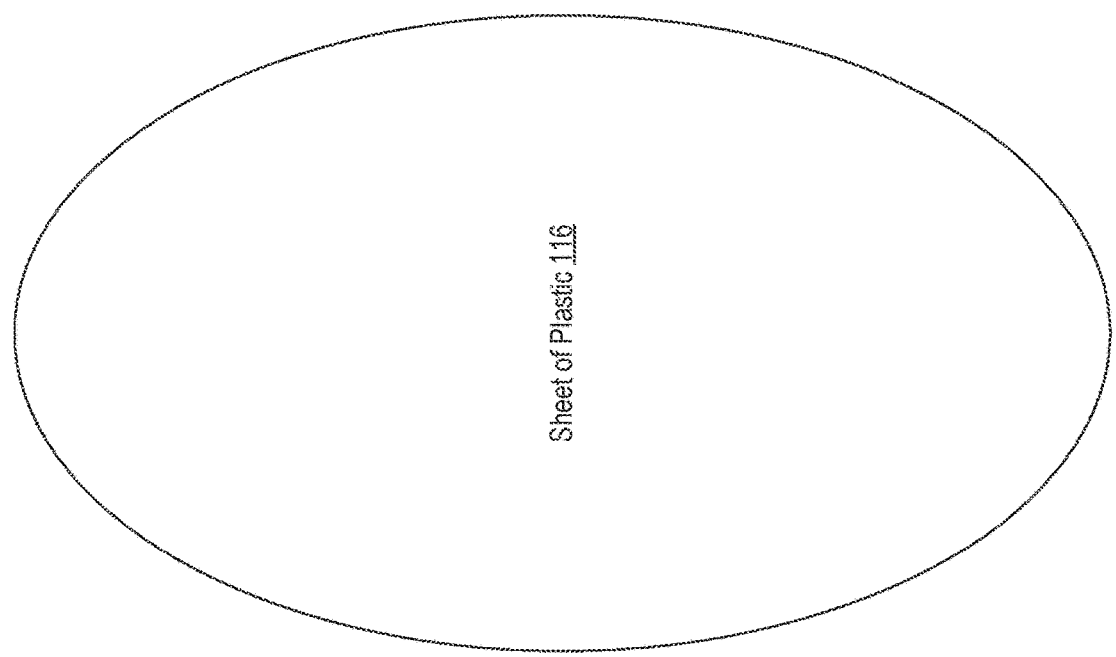
FIG. 3E
FIG. 3D

750 
Apply a first orthodontic appliance to a patient's teeth to reposition the teeth from a first tooth arrangement to a second tooth arrangement 760
Apply a second orthodontic appliance to the patient's teeth to reposition the teeth from the second tooth arrangement to a third tooth arrangement 770
FIG. 7C

```
                                                            800
                                                           ╱

┌─────────────────────────────────────────────────────────┐
    │ Determine a movement path to move one or more teeth     │
    │ from an initial arrangement to a target arrangement     │
    │                        810                              │
    └─────────────────────────────────────────────────────────┘
                              │
                              ▼
    ┌─────────────────────────────────────────────────────────┐
    │ Determine a force system to produce movement of the     │
    │ one or more teeth along the movement path               │
    │                        820                              │
    └─────────────────────────────────────────────────────────┘
                              │
                              ▼
    ┌─────────────────────────────────────────────────────────┐
    │ Determine an arch or palate expander design for an      │
    │ orthodontic appliance configured to produce the force   │
    │ system                                                   │
    │                        830                              │
    └─────────────────────────────────────────────────────────┘
                              │
                              ▼
    ┌─────────────────────────────────────────────────────────┐
    │ Determine instructions for fabrication of the           │
    │ orthodontic appliance incorporating the arch or palate  │
    │ expander design                                         │
    │                        840                              │
    └─────────────────────────────────────────────────────────┘
```

```
Receive a digital representation of a patient's teeth
910
                    ↓
Generate one or more treatment stages based on the digital representation of
the teeth
920
                    ↓
Fabricate at least one orthodontic appliance based on the generated
treatment stages
930
```

DYNAMIC THERMOFORMING OF DENTAL APPLIANCES

RELATED APPLICATIONS

This application is a continuation of U.S. patent application Ser. No. 17/835,839, filed Jun. 8, 2022 which claims the benefit of Provisional Application No. 63/210,443, filed Jun. 14, 2021, the entire content of which is incorporated by reference herein.

TECHNICAL FIELD

The technical field relates to the field of manufacturing dental appliances and, in particular, to dynamic thermoforming of dental appliances.

BACKGROUND

For some applications, shells are formed around molds to achieve a negative of the mold. The shells are then removed from the molds to be further used for various applications. One example application in which a shell is formed around a mold and then later used is corrective dentistry or orthodontic treatment. In such an application, the mold is of a dental arch for a patient and the shell is a dental appliance (e.g., aligner to be used for aligning one or more teeth of the patient, orthodontic retainers, orthodontic splints, sleep appliances for mouth insertion, etc.).

Molds may be formed using rapid prototyping equipment such as 3D printers, which may manufacture the molds using additive manufacturing techniques (e.g., stereolithography) or subtractive manufacturing techniques (e.g., milling). The dental appliances may then be formed over the molds one at a time using the dental appliance manufacturing equipment that is sized and configured the same for all sizes of dental appliances. The forming of dental appliances one at a time using dental appliance manufacturing equipment that is sized and configured the same for all sizes of dental appliances may result in a bottleneck in the dental appliance production process and may result in waste of material, time, and energy.

BRIEF DESCRIPTION OF THE DRAWINGS

The present invention is illustrated by way of example, and not by way of limitation, in the figures of the accompanying drawings.

FIGS. 3A-E illustrate components associated with forming dental appliances, according to certain embodiments.

FIG. 7C illustrates a method of orthodontic treatment using a plurality of appliances, according to certain embodiments.

FIG. 8 illustrates a method for designing an orthodontic appliance, according to certain embodiments.

DETAILED DESCRIPTION

Figure 1A:
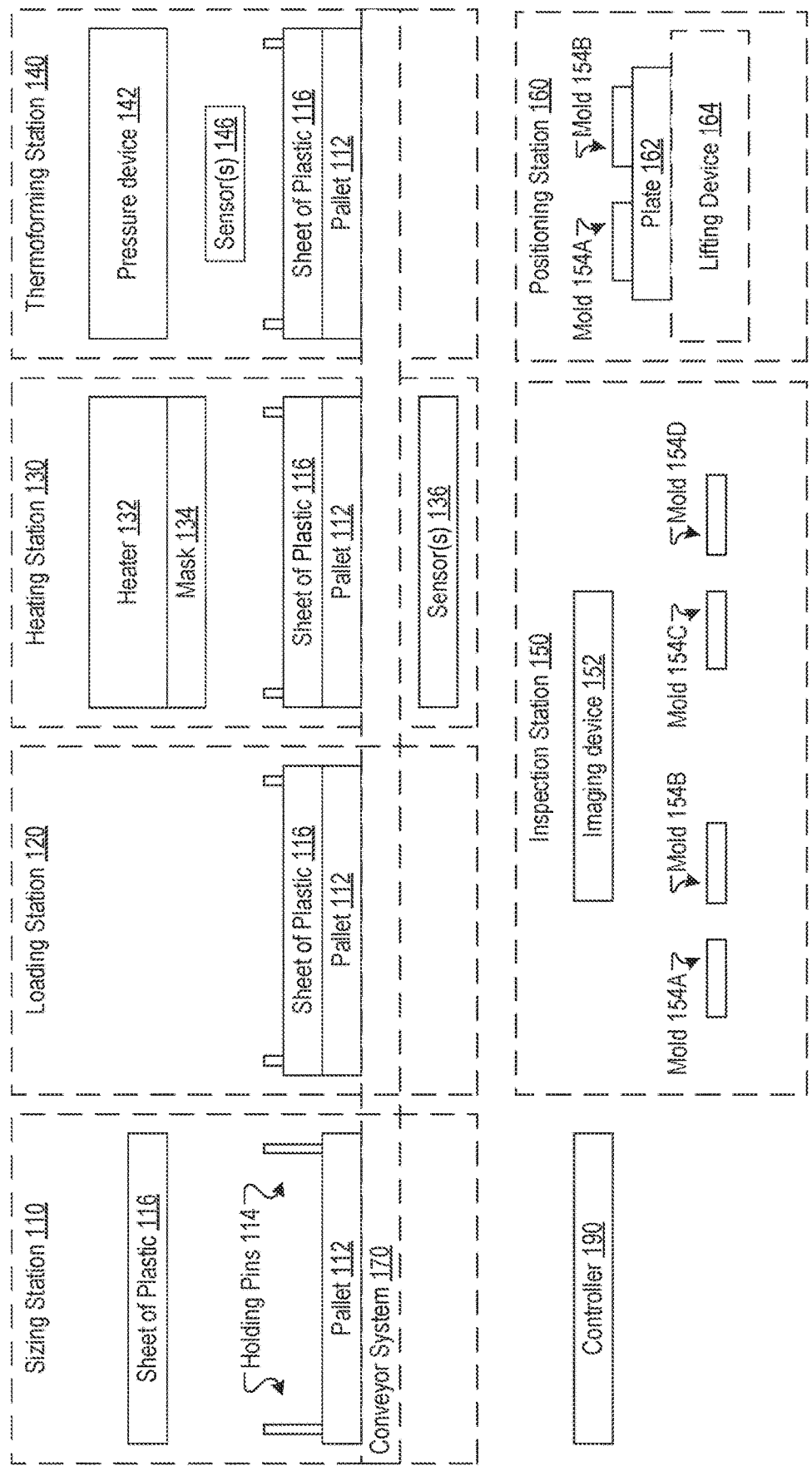
FIGS. 1A-C illustrate dental appliance manufacturing systems, according to certain embodiments.

Described herein are embodiments of dynamical thermoforming of dental appliances. Dental appliances may be polymeric dental appliances (also referred to as an aligner, shell, plastic aligner, plastic shell, appliance, orthodontic appliance, orthodontic retainer, orthodontic splint, sleep appliance for mouth insertion, etc.).

Conventionally, automated production of dental appliances includes attaching a long continuous roll of plastic to a conveyor system, pulling the roll of plastic so that a first portion of the roll is heated at a first station, and pulling the roll of plastic further so that the heated first portion is thermoformed over a single mold at a second station (e.g., to form a dental appliance). The thermoformed first portion is later removed from the roll. The roll of plastic is pulled so that the heated first portion enters the second station, a second portion enters the first station, and so forth. As a portion of the roll is heated at the first station, adjacent portions of the roll may also become heated (e.g., via convection, conduction, radiation, etc.) which may damage and reduce performance of the dental appliances. Thermoforming a portion of the roll over a single mold may result in wasted plastic (e.g., the remaining part of the portion of the roll that does not become the dental appliance). For example, about 70% of the plastic roll may be wasted by thermoforming a single dental appliance at a time. Thermoforming a single dental appliance at a time may become a bottleneck in the dental appliance production process.

Conventionally, the dental appliance manufacturing system is configured the same for production of different sizes and types of dental appliances (e.g., components of the dental appliance manufacturing system are sized for the largest mold). This causes waste of material, time, and energy and can cause defects in the dental appliances.

Embodiments described herein are directed to dynamical thermoforming of dental appliances.

In some embodiments, a processing device identifies geometries of molds associated with dental arches. In some examples, images are captured of the molds and the images are processed to measure the molds to determine the geometries. In some examples, images are captured of the molds, identifiers associated with digital models of the dental arches are determined based on the images, and the geometries of the molds are identified based on the digital models.

The processing device determines, based on the geometries of the molds, that particular molds are to be secured to a plate for simultaneous forming of dental appliances. In some embodiments, two molds of similar dimensions are to be secured to the plate for simultaneous forming of dental appliances. In some embodiments, more than two molds are secured to the plate for the simultaneous forming of the dental appliances. In some embodiments, particular molds are secured to the plate for the simultaneous forming of the dental appliances to minimize waste of material per dental appliance, minimize time per dental appliance, minimize cost per dental appliance, and/or the like.

The processing device causes, based on the geometries of the molds, one or more portions of the dental appliance manufacturing system to be configured to form dental appliances. In some embodiments, the length and/or width of the pallet are adjusted based on the molds (e.g., geometries of the molds, positioning of the molds, clearances of the molds, etc.). In some embodiments, the size of the sheet of plastic to be secured to the pallet is selected based on the molds. In some embodiments, the heating station is configured based on the molds (e.g., mask size is adjusted, location of heating elements are adjusted, temperature is adjusted, etc.). In some embodiments, the thermoforming station is adjusted (e.g., cup size, pressure, etc.) based on the molds.

In some embodiments, one or more trained machine learning models are used to generate the dental appliances.

In some embodiments, a trained machine learning model is used to determine whether a mold matches a digital model. A processing device identifies images of a dental arch and identifies a digital model corresponding to the mold of the dental arch. The digital model may be determined based on an identifier (e.g., via optical character recognition, via an asset tag, etc.) associated with the mold. The processing device provides the images and digital model as input to a trained learning model and receives output from the trained machine learning model. The processing device determines, based on the output, whether the mold matches the digital model (e.g., dimensions of the mold matches dimensions of the digital model within a threshold amount). Responsive to determining the mold does not match the digital model, the processing device may cause a corrective action (e.g., mark the mold for further inspection, scrap the mold, cause corrective action in the mold generation process, etc.). Responsive to determining the mold matches the digital model, the processing logic may cause the mold to be used to form a dental appliance.

To generate the trained machine learning model to determine whether a mold matches a digital model, a processing device may receive historical images of historical molds, identify historical digital models, and receive historical matching data (e.g., whether dimensions of historical molds matched dimensions of corresponding digital models within a threshold amount). The processing device trains the machine learning model based on input including the historical images and historical digital models and target output including historical matching data to generate the trained machine learning model.

In some embodiments, a trained machine learning model is used to configure the heating station for forming of dental appliances. A processing device may receive sensor data associated with manufacturing dental appliances (e.g., based on current setpoints) and provide the sensor data as input to a trained machine learning model. The processing device may receive, from the trained machine learning model, output and determine, based on the output, one or more heating element setpoints to cause a substantially even heat distribution a sheet of plastic to form the dental appliances.

To generate the trained machine learning model to configure the heating station for forming of dental appliances, a processing device may receive historical sensor data, identify historical heating element setpoints, and identify historical heat distribution data (e.g., heating is substantially constant, heating of the sheet of plastic meets a threshold time, heating of the sheet of plastic does not meet a threshold time, etc.). The processing device may train the machine learning model based on input data that includes the historical sensor data and target output that includes historical heating element setpoints and historical heat distribution data to generate the trained machine learning model.

Aspects of the present disclosure result in technological advantages of significant reduction in wasted plastic, significant increase in throughput, and significant improvement in quality. By dynamically generating dental appliances (e.g., thermoforming at least two dental appliances on a single sheet of plastic), the present disclosure results in significant reduction in wasted plastic. For example, the present disclosure may have more than 30% reduction in wasted plastic compared to conventional automated systems. By dynamically generating dental appliances, the present disclosure results in significant increase in throughput. For example, the present disclosure may have an 80% increased capacity compared to conventional automated systems. By using a mask (e.g., that is dynamically adjusted based on the molds) to surround the sheet of plastic during heating, the present disclosure minimizes heat transfer to other sheets of plastic and improves quality of the dental appliances compared to conventional automated systems. Aspects of the present disclosure may be provided in a new dental appliance manufacturing system. In some embodiments, a dental appliance manufacturing system may be retrofit (e.g., upgraded, modified) with aspects of the present disclosure.

Figure 1B:
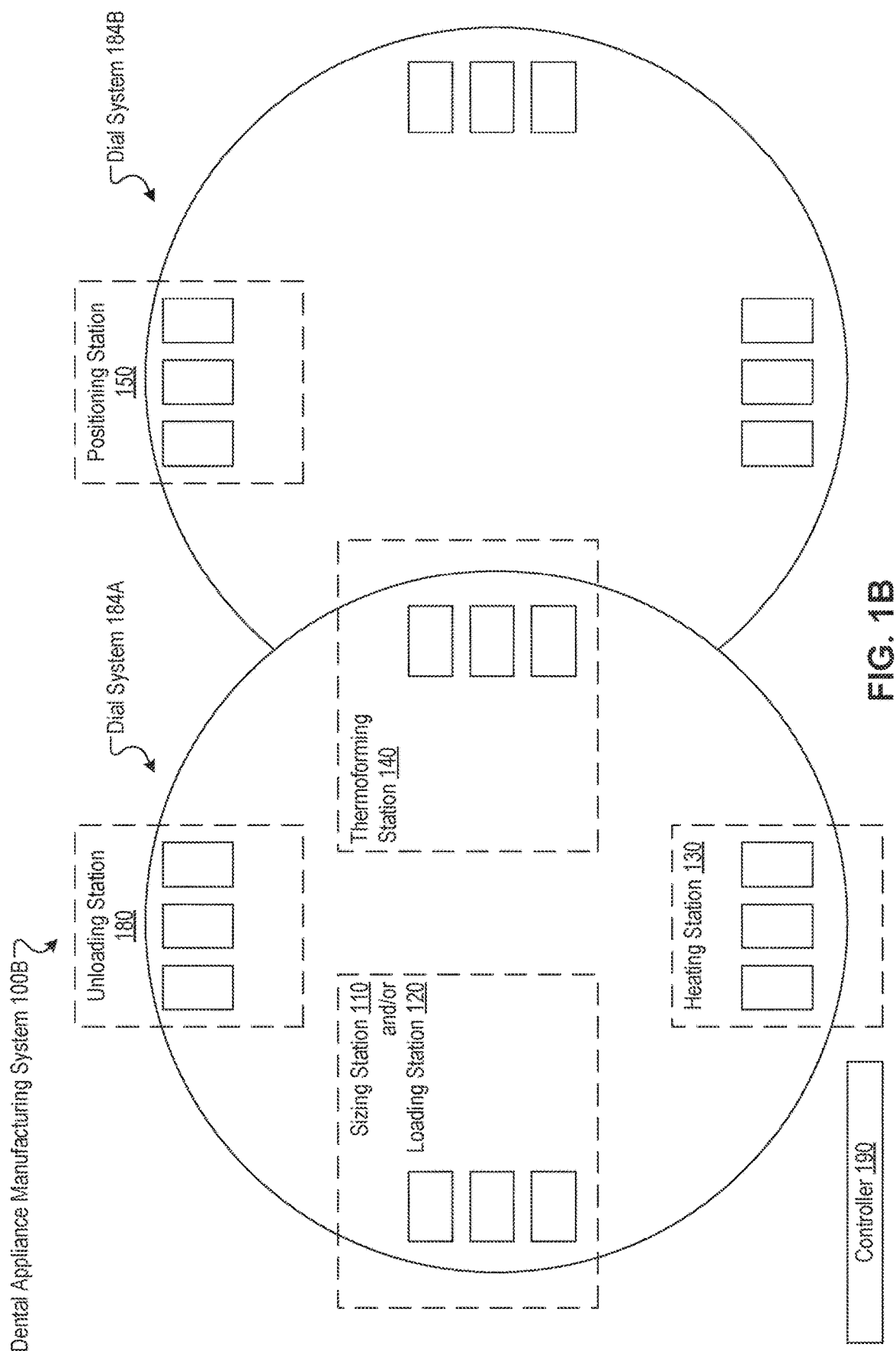
Figure 1C:
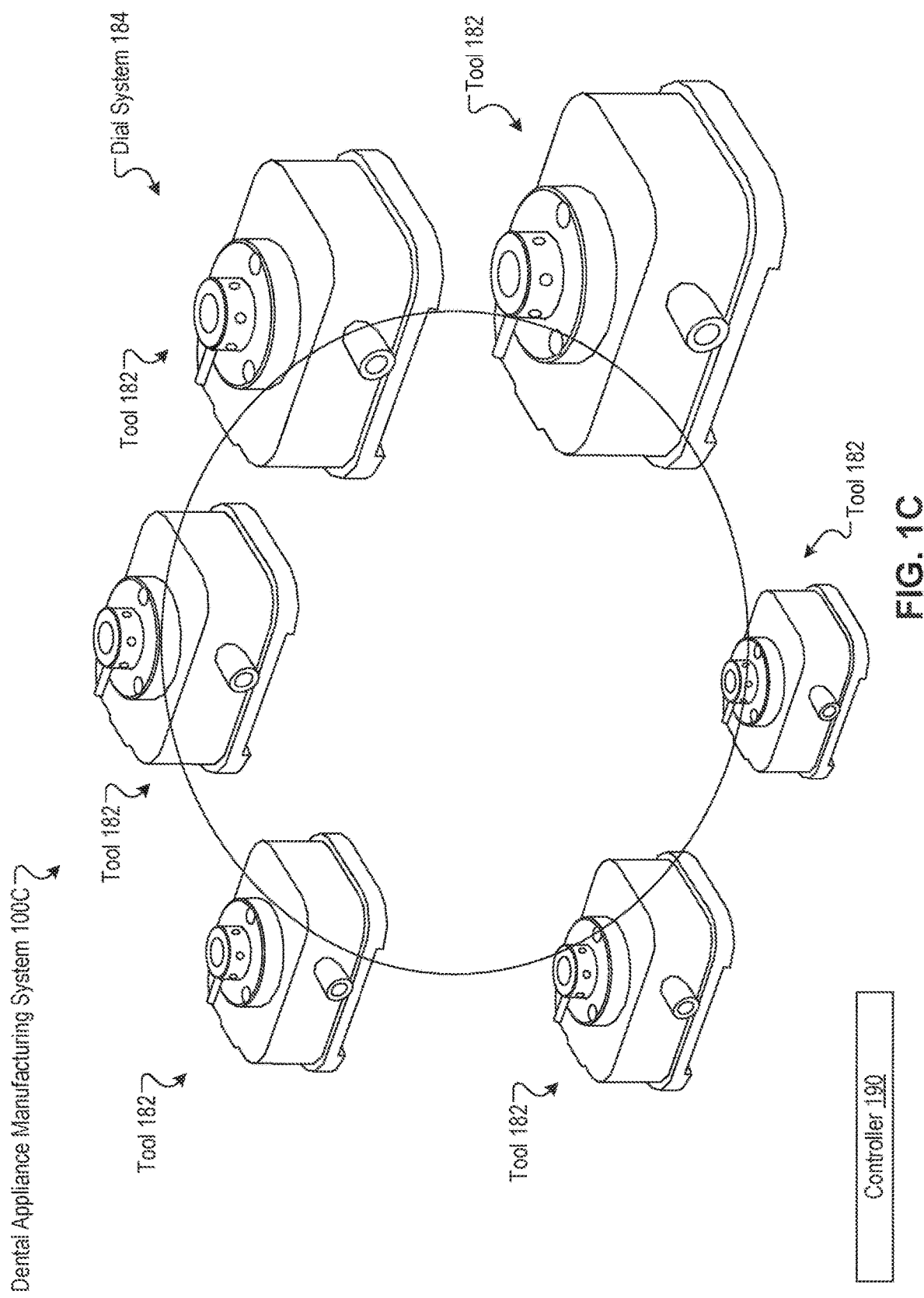

FIGS. 1A-C illustrate dental appliance manufacturing systems 100A-C (hereinafter dental appliance manufacturing systems), according to certain embodiments. Dental appliance manufacturing system 100 may include one or more of sizing station 110, loading station 120, heating station 130, thermoforming station 140, inspection station 150, and/or positioning station 160. In some embodiments, one or more stations may be included before, after, or between the stations illustrated in FIGS. 1A-C. For example, a trimming station to trim the dental appliances from the thermoformed sheet of plastic 116 may be located after the thermoforming station 140.

In some embodiments, dental appliance manufacturing system 100 is related to a thermoforming process system for dental appliances that adjusts dynamically to different input geometries. The dental appliance manufacturing system 100 optimizes material utilization to produce the dental appliances (e.g., allows maximization of material and resources by mechanisms adjustment during the forming cycle). Based on the input geometry, the dental appliance manufacturing system 100 (e.g., the dynamic forming system) determines and adjusts the material, reconfiguring the dimensions and behavior of one or more components of the dental appliance manufacturing system 100 to create dental appliances. The dental appliance manufacturing system 100 provides the ability to use different material geometries for thermoforming, whether manually or automatically.

In some embodiments, one or more components (e.g., pallet 112) are transported via a conveyor system 170 (e.g., see FIG. 1A) through one or more of sizing station 110, loading station 120, heating station 130, thermoforming station 140, and/or positioning station 160. The conveyor system 170 may be a conveyor belt, chain conveyor system, and/or the like. The pallets 112 may be chain conveyor pallets.

In some embodiments, one or more stations (e.g., sizing station 110, loading station 120, heating station 130, thermoforming station 140, etc.) are rotated (e.g., via a dial system 184A of FIG. 1A) and one or more components (e.g., inspection station 150, positioning station 160, molds 154) are rotated (e.g., via dial system 184B of FIG. 1B) to interface with each other.

At sizing station 110, a pallet 112 including holding pins 114 and/or a sheet of plastic 116 may be configured and/or selected. At loading station 120, the sheet of plastic 116 may be secured to the pallet 112 via the holding pins 114 (e.g., the holding pins pierce the sheet of plastic). At heating station 130, heater 132 may heat the sheet of plastic 116 secured to the pallet 112. In some embodiments, mask 134 is disposed between the heater 132 and the sheet of plastic 116 (e.g., to provide a substantially thermally isolated environment for heating the sheet of plastic 116). At thermoforming station 140, a pressure device 142 may thermoform the heated sheet of plastic 116 onto the molds 154. In some embodiments, the molds 154 are secured to a plate 162 that is lifted via a lifting device 164 to interface with the heated sheet of plastic 116 for the thermoforming. In some embodiments, the molds 154 and sheet of plastic 116 are secured to the same component (e.g., pallet 112, plate 162).

In some embodiments, molds 154 are generated based on digital models associated with a dental arch of a user. At inspection station 150, imaging device 152 is used to determine whether each mold 154 matches a corresponding digital model. In some embodiments, the imaging device 152 captures images of each mold 154. A controller 190 (e.g., processing device, client device, server device) may determine, based on the images geometries of a mold 154. The controller 190 may determine (e.g., based on one or more images or other data provided by imaging device 152) an identifier of the mold 154 (e.g., via optical character recognition (OCR), reading a bar code, reading a quick response (QR) code, reading an asset tag, reading a radio frequency identification (RFID) tag, reading a near-field communication (NFC) tag, etc.). The controller 190 may identify a digital model based on the identifier. The controller 190 may compare the geometry of the mold 154 with the digital model to determine whether the dimensions of the mold 154 match the dimensions of the digital model within a threshold value (e.g., meet threshold difference of dimensions). Responsive to the controller 190 determining the mold 154 matches the digital model, controller 190 causes the mold 154 to be used for generating a dental appliance. Responsive to the mold not matching the digital model, controller 190 causes a corrective action to be performed (e.g., discard the mold 154, prevent the mold 154 from being used for generating a dental appliance, etc.).

The controller 190 identifies two or more molds 154 that are to be used for simultaneous thermoforming of dental appliances (e.g., responsive to the molds 154 matching corresponding digital models). The controller 190 may identify the molds 154 for simultaneous thermoforming of dental appliances that would use the least amount of material, energy, and/or time per dental appliance. In some examples, the molds 154 that are identified for simultaneous thermoforming of dental appliances are similarly sized.

At positioning station 160, the molds 154 are positioned on a plate 162 to minimize use of material while maintaining clearances around the molds 154. In some embodiments, the plate 162 is lifted by a lifting device 164 to interface with the heated sheet of plastic 116 in the thermoforming station 140.

In some embodiments, the controller 190 causes one or more portions of the dental appliance manufacturing system 100 to be configured (e.g., adjusted, re-sized, etc.) based on the molds 154 (e.g., geometries of the molds 154, positioning of the molds 154 on the plate 162, etc.) that are to be simultaneously thermoformed to form dental appliances. In some embodiments, the controller 190 selects (e.g., generates, cuts, etc.) the sheet of plastic 116 based on the molds 154. In some embodiments, the controller 109 adjusts width and/or length of the pallet 112 (e.g., via servo motors) based on the molds 154. In some embodiments, the sheet of plastic 116 is sized based on the adjusted size of the pallet 112. In some embodiments, the controller 190 selects and/or adjusts size of the plate 162 based on the molds 154.

In some embodiments, the controller 109 causes the heating station 130 to be configured based on the molds 154. The size of the mask 134 may be adjusted (e.g., via servo motors) based on the molds 154 (e.g., to match the pallet 112 and/or sheet of plastic 116). The position of heating elements in the heater 132 may be adjusted based on the molds 154. The temperature and/or heating time associated with the heater 132 heating the sheet of plastic 116 may be adjusted based on the molds 154.

In some embodiments, the controller 109 causes the thermoforming station 140 to be configured based on the molds 154. The controller 109 may configure the pressure device 142 (e.g., size of the cup used to thermoform the sheet of plastic 116) and/or the pressure provided by the pressure device 142 based on the molds.

In some embodiments, controller 190 may control one or more robots to secure molds 154, secure molds 154 to plate 162, secure sheet of plastic 116 (e.g., activate vacuum to pick up sheet of plastic 116), secure sheet of plastic 116 to pallet 112 (e.g., push the sheet of plastic 116 onto the holding pins 114 and deactivate vacuum), etc. In some embodiments, controller 190 may control one or more adjustment devices (e.g., servo motors, pneumatic devices) to adjust size of one or more of pallet 112, mask 134, heater 132, pressure device 142, plate 162, lifting device 164, and/or the like.

Responsive to the sheet of plastic 116 being secured to the pallet 112 in loading station 120, the sheet of plastic 116 may remain secured to the pallet 112 during heating via the heating station 130 and during thermoforming via the thermoforming station 140. In some embodiments, the pallet 112 has an upper surface that has a substantially rectangular surface area that forms four corners. The pallet 112 may include a holding pin 114 on the upper surface at each corner. The pallet 112 may include a holding pin 114 on the upper surface at a midpoint between each set of adjacent corners and/or at other positions along a perimeter of the pallet 112. The pallet 112 may have multiple holding pins 114 (e.g., six holding pins, eight holding pins) on the upper surface of the pallet 112 in some embodiments. The holding pins may have sharp points, and may pierce the sheet of plastic 116 to secure the sheet of plastic 116 in embodiments.

After the loading station 120, the controller 190 (e.g., via conveyor system 170) may move pallet 112 to the heating station 130. The heating station 130 may include a heater 132 and a mask 134 (e.g., heater mask, heat mask). The heater 132 may be a ceramic heater, a convection oven, or an infrared heater in embodiments. The mask 134 may be heat resistant up to about 500° F. in embodiments. The mask 134 may be an insulator. The mask 134 may not adhere to the sheet of plastic 116 when the mask 134 and sheet of plastic 116 are heated. The mask may include polytetrafluoroethylene (PTFE) (e.g., Teflon™) in some embodiments. Other materials that are heat resistant, have low thermal conductivity, and that will not adhere to the plastic sheet may also be used.

In some embodiments, the heating section 126 includes one or more heaters 132 (e.g., three heaters, four heaters, heating elements), where each heater 132 (e.g., heating element, infrared heater) heats a corresponding zone. The heating section 126 may include one or more sensors 136 (e.g., to measure temperature). In some embodiments, there is at least one sensor 136 per heater 132 (e.g., at least one sensor 136 per zone). A sensor 136 may be located below each heater 132 (e.g., below the sheet of plastic 116). The sensors 136 may determine the temperature of the sheet of plastic 116 and/or the air around the sheet of plastic 116. A heating profile of the sheet of plastic 116 may be determined based on sensor data from the sensors 136.

In some embodiments, one or more sensors 136 may be disposed in the heating station 130 (e.g., in the heating chamber, above the sheet of plastic 116, etc.). In some embodiments, a corresponding sensor 136 is located above or below each corner of the sheet of plastic 116 (e.g., within the heating space, within the interior perimeter of the mask 134). In some embodiments, one or more sensors 136 are located above or below a middle portion of the sheet of plastic 116 (e.g., between a first mold and a second mold).

In some embodiments, the sensors 136 may be disposed below the sheet of plastic 116. One or more sensors 136 may be disposed in a first plane and the sheet of plastic 116 may be disposed in a second plane. The second plane may be substantially parallel to the first plane. The second plane may be a distance above the first plane. The distance between a first sensor 136 and a second sensor 136 may be less than the distance between the first plane and the second plane. In some embodiments, the distance between a first sensor 136 and a second sensor 136 is about one tenth the distance between the first plane and the second plane (e.g., sensor spacing is about one tenth the spacing between a sensor 136 and the sheet of plastic 116).

Controller 190 (e.g., processing device) may receive the sensor data from the sensors 136. The controller 190 may determine whether one or more temperatures associated with the sheet of plastic 116 meet one or more threshold values (e.g., high enough of temperature, not too high of temperature, total time of heating, rate of increase of temperature, temperature in each of the zones is substantially the same, etc.). Responsive to determining that the one or more temperatures associated with the sheet of plastic 116 meet the one or more threshold values, the controller 190 may allow the heated sheet of plastic continue being formed into an aligner. Responsive to determining that one or more temperatures associated with the sheet of plastic 116 do not meet one or more threshold values (e.g., uneven temperature, overheating, underheating, etc.), the controller 190 may perform a corrective action. A corrective action may include one or more of causing the heated sheet of plastic 116 to be discarded, causing the sheet of plastic 116 to be reheated, recalibrating the heaters 132, interrupting one or more components (e.g., heaters 132) of the dental appliance manufacturing system 100, providing an alert, changing the manufacturing parameters (e.g., controlling power fed to the heaters 132, controlling the heat to be in an acceptable range, controlling total time of heating, etc.), and/or the like.

The heating station 130 may move (e.g., via a pneumatic cylinder of the heating station 130) the mask 134 to interface with the sheet of plastic 116 on the pallet 112. The mask 134 may include features so that the mask 134 avoids interfacing with the holding pins 114 while the mask 134 surrounds the sheet of plastic 116. The mask 134 may surround the sheet of plastic 116 to minimize heat transfer from the heating section to other sheets of plastic 116. The heater 132 may heat the sheet of plastic 116 to about 320 to about 350° F. (e.g., about 336° F.) without hanging of the sheet of plastic 116 (e.g., without sagging portions of the sheet of plastic) by using the mask 134. For example, the mask 134 may surround a perimeter of the sheet of plastic 116 and provide a force sandwiching the sheet of plastic 116 between the mask 134 and the pallet 112. The force may be applied approximately uniformly about the perimeter of the sheet of plastic 116, and may prevent or mitigate sagging and/or warping of the sheet of plastic 116 during the heating process. By avoiding generation of hanging or sagging portions of the sheet of plastic 116, air leaks may be avoided during the thermoforming. The mask 134 may be removed from the sheet of plastic 116 after the heating is completed.

After the heating station 130, the controller 190 (e.g., via conveyor system 170) may move the pallet 112 (e.g., with the heated sheet of plastic 116 secured to the pallet 112 via the holding pins 114) to the thermoforming station 140. The thermoforming station 140 may include a pressure device 142. In some embodiments, the pressure device 142 may be lowered to interface with at least a portion (e.g., of an upper surface of the heated sheet of plastic 116 and/or of an upper surface of the pallet 112 proximate the perimeter of the pallet 112). Molds 154 (e.g., at least a first mold 154A and a second mold 154B) may be secured to a plate 162 that is disposed on a lifting device 164. The pallet 112 may form a border, where the molds 154A-B and/or plate 162 may pass through the pallet (e.g., the pallet 112 creates a channel from the lower surface to the upper surface of the pallet 112 sized for the molds 154 and/or plate 162 to pass through the channel).

The lifting device 164 may lift the molds 154A-B and plate 162 to interface with a lower surface of the heated sheet of plastic 116 in the thermoforming station 140. The pressure device 142 may maintain a pressure level (e.g., high pressure, lower pressure, vacuum, substantially vacuum, etc.) at the upper surface of the heated sheet of plastic 116. The lifting device 164 may push the molds 154A-B against the lower surface of the heated sheet of plastic 116 to thermoform the heated sheet of plastic 116 to form aligners. Subsequent to thermoforming the heated sheet of plastic 116, the lifting device 164 may lower to allow the conveyor system 170 to move the pallet 112 and thermoformed sheet of plastic 116 out of the thermoforming station 140. The thermoforming station 140 may include one or more sensors 146. The controller 190 may receive sensor data from the sensors 146 to configure the pressure device 142 (e.g., adjust size of the cup of the pressure device 142, adjust pressure value provided by the pressure device 142, etc.).

After the thermoforming station 140, the thermoformed sheet of plastic 116 may be moved (e.g., via conveyor system 170) to other sections of the dental appliance manufacturing system 100 for one or more of reading identifiers on the dental appliances, marking the dental appliances, dividing the dental appliances, trimming the dental appliances, etc.

The conveyor system 170 may continue to move pallets 112 from the sizing station 110, to the loading station 120, to the heating station 130, and to the thermoforming station 140 to thermoform additional sets of dental appliances in parallel (e.g., simultaneously, on the same plate 162). For example, there may be a pallet 112 in sizing station 110, a pallet 112 in the loading station 120, pallet 112 in the heating station 130, and a pallet 112 in the thermoforming station 140 at substantially the same time.

Embodiments are discussed with reference to dynamically generating dental appliances (e.g., using mold 154A and mold 154B to form dental appliances at substantially the same time). However, it should be understood that in alternative embodiments more than two dental appliances may be formed together using a single sheet of plastic. For example, three dental appliances, four dental appliances, five dental appliances, etc. may be formed in parallel on a single sheet of plastic. Additionally, embodiments are discussed with reference to the simultaneous thermoforming of multiple dental appliances. It should be understood that in some embodiments there may be a slight delay between the beginning of thermoforming a first dental appliance and thermoforming a second dental appliance and/or between the ending of thermoforming a first dental appliance and ending of thermoforming a second dental appliance. For example, mold 154A may be slightly vertically offset from mold 154B, which may cause the thermoforming of a first dental appliance by mold 154A to start and end at a slightly different time from the thermoforming of a second dental appliance by mold 154B. Accordingly, it should be understood that embodiments that are discussed with reference to simultaneous processing or manufacturing also include parallel processing or manufacturing that may not be simultaneous.

FIG. 1B illustrates a dental appliance manufacturing system 100B, according to certain embodiments. Elements with the same or similar numbering may have the same or similar functionality as those described in FIG. 1A. The dental appliance manufacturing system 100B may include a sizing station 110, a loading station 120, a heating station 130, a thermoforming station 140 (e.g., one or more thermoforming chambers), a positioning station 160, and/or an unloading station 180. One or more dial systems 184 may be used to form the dental appliances. A dial system 184A may rotate to move pallets 112 through the sizing station 110, loading station 120, heating station 130, thermoforming station 140, and/or unloading station 180. A dial system 184B may be used to load the plate 162 and/or molds 154 onto a lifting device 164 (e.g., positioning the molds 154 via positioning station 160). In some embodiments, two or more of the sizing station 110, loading station 120, heating station 130, thermoforming station 140, and/or unloading station 180 may be combined. In some embodiments, additional stations may be included before, after, or during the sizing station 110, loading station 120, heating station 130, thermoforming station 140, positioning station 160, and/or unloading station 180.

In some embodiments, the dial system 184A is configured to receive different sizes of pallets 112 (e.g., three sizes of pallets). Each pallet 112 may be configured for multiple molds (e.g., two molds). A size of pallet 112 may be selected and/or adjusted based on the size of the largest mold to be used with the pallet 112. Responsive to the largest mold to be used with the pallet 112 meeting a first threshold size, a first size of pallet 112 may be selected. For each size of pallet 112, there may be a corresponding size of sheet of plastic 116, a corresponding configuration of heaters 132, a corresponding size of mask 134, a corresponding pressure device 142, a corresponding plate 162, a corresponding lifting device 164, and/or the like.

In some embodiments, groups of two or more pallets 112 (e.g., three pallets 112) of different sizes are located on the dial system 184A proximate each other. Responsive to the dial system 184A rotating, a first group of the two or more pallets 112 is moved into the loading station 120. Responsive to the largest mold to be used meeting a threshold size, a particular size of sheet of plastic 116 is placed on a particular size of pallet 112.

After securing the sheet of plastic 116 to the pallet 112, the dial system 184A is rotated and the first group of two or more pallets 112 of different sizes is moved into the heating station 130. A heater 132 and mask 134 are moved to heat the sheet of plastic 116 secured to the pallet 112. In some embodiments, the same heater 132 and mask 134 are used to heat a sheet of plastic 116 secured to any of the two or more pallets 112. In some embodiments, there are three heaters 132 and three masks 124 that each correspond to a different sized pallet 112 and only the heater 132 above the pallet 112 that is securing a sheet of plastic 116B is actuated (e.g., lowered, caused to perform a heating function, etc.).

After heating the sheet of plastic 116 that is secured to the pallet 112, the dial system 184A is rotated and the first group of two or more pallets 112 of different sizes is moved into the thermoforming station 140. The thermoforming station may include the same number of thermoforming stations 140 (e.g., thermoforming chambers), pressure devices 142, plates 162, and/or lifting devices 164 as the number of pallets 112. Each thermoforming station 140, pressure device 142, plate 162, and/or lifting device 164 may be sized for the corresponding pallet 112. In some embodiments, only the thermoforming station 140, pressure device 142, and/or lifting device 164 corresponding to the pallet 112 securing a heated sheet of plastic 116 are actuated. A single lifting device 164 may be used for the two or more pallets 112. In some embodiments, the lifting device 164 is configured to receive and lift two or more plates 162, each sized for a corresponding pallet 112 (e.g., all two or more plates 162 are lifted at the same time by the lifting device 164). In some embodiments, the lifting device 164 is configured to receive a single plate 162 and move the plate 162 to the corresponding pallet 112 that is securing a sheet of plastic. In some embodiments, the thermoforming station 140 has two or more thermoforming chambers. In some embodiments, the thermoforming station 140 has a single thermoforming station 140 that is aligned with the pallet 112 that is securing a sheet of plastic 116.

After thermoforming the heated sheet of plastic 116 that is secured to the pallet 112, the dial system is rotated and the first group of two or more pallets 112 of different sizes is moved into the unloading station 180. The unloading station 180 may read one or more identifiers (e.g., patient identifier (PID, stage, etc.), laser mark the thermoformed sheet of plastic 116 (e.g., dental appliance), trim the one or more dental appliances form the thermoformed sheet of plastic 116, unload the thermoformed sheet of plastic 116 (e.g., dental appliances) from the plate 162, and/or the like. In some embodiments, the unloading station 180 may include one or more substations and the dial system 184A may be rotated to move the first group of two or more pallets 112 from one substation to another. For example, one or more identifiers of the thermoformed sheet of plastic 116 may be read at a first substation, the dial system 184A is rotated, the thermoformed sheet of plastic 116 is laser marked at a second substation, the dial system 184A is again rotated, the thermoformed sheet of plastic 116 is unloaded (e.g., along with the molds, without the molds) from the plate 162, and the dial system 184A is again rotated (e.g., to locate the first group of two or more pallets 112 in the loading station 120).

In some embodiments, the dental appliance manufacturing system 100B includes multiple dial systems 184. A dial system 184B may be located under the dial system 184A. The dial system 184B may be used to locate the lifting device 164, plate 162, and/or one or more molds 154 under the corresponding pallet 112 securing a sheet of plastic 116 in the thermoforming station 140. The lifting device 164 may lift the plate 162 securing one or more molds 154 to the pallet 112 securing the sheet of plastic 116 to thermoform the sheet of plastic 116 on the one or more molds. The dial system 184B may rotate through one or more different stations. In some embodiments, a plate 162 may be loaded to the dial system 184B at a station of the dial system 184B. In some embodiments, one or more molds 154 may be loaded on a plate 162 at a station of the dial system 184B. In some embodiments, the one or more molds 154 and/or the plate 162 are unloaded from the dial system 184B at a station of the dial system 184B. In some embodiments, the lifting device 164 remains located under the thermoforming station 140 and the lifting device 164 lifts the plate 162 securing the molds 154 from the dial system 184B to the pallet 112 securing the sheet of plastic 116. In some embodiments, the lifting device 164 rotates with the dial system 184B.

In some embodiments, the dial system 184A and the dial system 184B rotate in the same direction (e.g., both clockwise, both counter-clockwise). In some embodiments, the dial system 184A and the dial system 184B rotate in opposite directions. In some embodiments, the dial system 184A and the dial system 184B rotate simultaneously or substantially simultaneously (e.g., at the same speed, etc.). In some embodiments, the dial system 184A and the dial system 184B are rotated separately (e.g., the pallet 112 securing a sheet of plastic 116 may be rotated to the thermoforming station 140 at a time different than the plate 162 securing the one or more molds 154 is rotated under the thermoforming station 140).

In some embodiments, the dial system 184A may include multiple groups of two or more pallets 112. A first group may be located in the loading station 120, a second station may be located at the heating station 130, a third group may be located in the thermoforming station 140, and a fourth group may be located in the unloading station 180. In some embodiments, different stations of the dial system 184A are being interacted with at substantially the same time. In some embodiments, a sheet of plastic 116A is being placed on a pallet 112A, a heater 132 is heating the sheet of plastic 116B loaded on a pallet 112B, and a pressure device 142 is thermoforming a heated sheet of plastic 116C secured to a pallet 112C at substantially the same time. In some embodiments, different stations of the dial system 184B are being interacted with at substantially the same time.

In some embodiments, width and/or length of the pallets 112 of dial system 184A are adjustable based on the molds 154 to be used for thermoforming. In some embodiments, the heater 132, mask 134, pressure device 142, plate 162, lifting device 164, and/or the like are configurable based on the molds 154 to be used for thermoforming.

The operations of forming a dental appliance by using a conveyor system 170 may be applied to forming a dental appliance by using one or more dial systems 184A-B.

FIG. 1C illustrates a dental appliance manufacturing system 100C, according to certain embodiments. In some embodiments, different sizes of tools 182 (e.g., components or stations) are provided via a dial system 184 (e.g., turret system). The controller 190 selects a tool 182 based on the geometry of the molds 154 to be used for simultaneous thermoforming and causes the dial system 184 (e.g., turret system) to rotate to use the tool 182.

FIGS. 2A-K illustrate components of dental appliance manufacturing systems 100, according to certain embodiments.

Figure 2A:
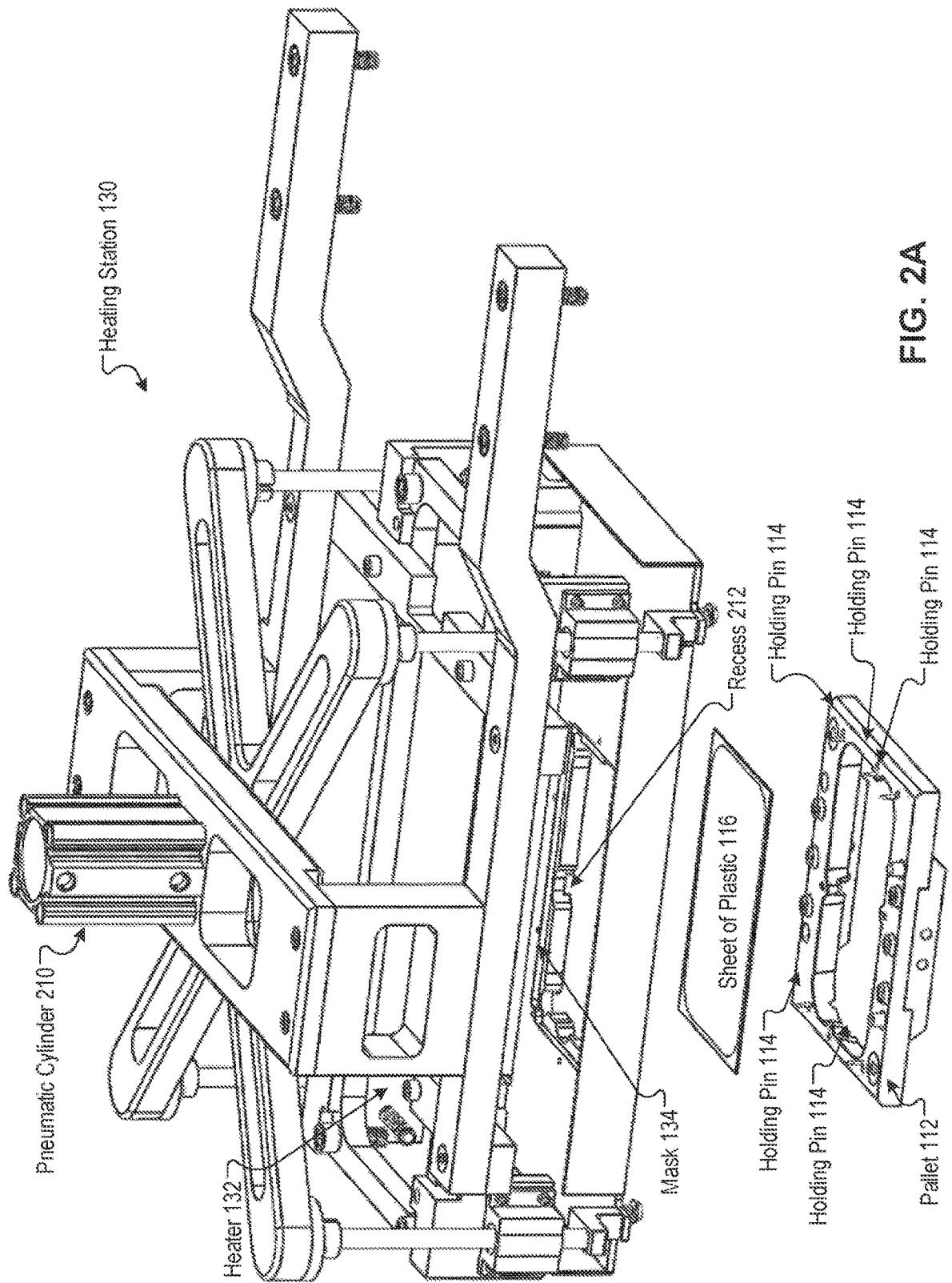
FIGS. 2A-K illustrate components of dental appliance manufacturing systems, according to certain embodiments.

FIG. 2A illustrates a heating station 130 of dental appliance manufacturing system 100, according to certain embodiments. The heating station 130 may include a pneumatic cylinder 210, a heater 132, a mask 134, a pallet 112, and a sheet of plastic 116 to be secured to pallet 112. The heater 132 may be located proximate the sheet of plastic 116 disposed on a pallet 112. The mask 134 may be disposed between the heater 132 and the sheet of plastic disposed on the pallet 112. The mask 134 may lower to interface with the sheet of plastic 116 disposed on the pallet 112.

In some embodiments, mask 134 provides a thermal seal between the heater 132 and the sheet of plastic 116 on the pallet 112. The mask 134 may be a border that forms a channel from the lower surface to the upper surface of the mask 134. The channel of the mask 134 may be substantially similar in size to the channel of the pallet 112. The mask 134 may be shaped to not interfere with the holding pins 114 (e.g., the mask 134 may have recesses 212 to go around the holding pins 114). In some embodiments, the mask 134 substantially covers the pallet 112 so that the mask 134 is disposed on substantially all portions of the sheet of plastic 116 that are disposed on the pallet 112.

The mask 134 may have an upper surface configured to couple with a heater of a dental appliance manufacturing system 100. The mask 134 may have a lower surface configured to be disposed on a sheet of plastic 116. The sheet of plastic 116 is to be disposed between a pallet 112 and the lower surface of the mask 134. The mask 134 may have inner sidewalls forming recesses 212 (e.g., cut-outs, indents, etc.). A first portion of the sheet of plastic 116 that is disposed on the pallet 112 is exposed by the recesses 212 to heat transfer from the heater (e.g., the first portion is heated by the heater). The heated first portion of the sheet of plastic 116 provide a seal between the sheet of plastic 116 and the pallet 112 and/or one or more portions of the thermoforming station 140. The mask 134 is to minimize the heat transfer from the heater to a second portion of the sheet of plastic 116 that is disposed on the pallet and is covered by mask 134 (e.g., portions that are not exposed by the recesses 212).

The recesses 212 of the inner walls of mask 134 may be substantially uniformly formed (e.g., substantially evenly spaced) along the inner sidewalls to provide the heat transfer from the heater to the first portion of the sheet of plastic 116 to seal the sheet of plastic to the pallet for thermoforming. The recesses 212 substantially uniformly formed recesses 212 may provide for substantially uniform heating to provide an improved seal.

In some embodiments, the recesses 212 have substantially vertical sidewalls. In some embodiments, the recesses 212 have planar (e.g., planar vertical) sidewalls. In some embodiments, the recesses 212 have curved (e.g., curved vertical, rounded vertical) sidewalls.

Figure 2B:
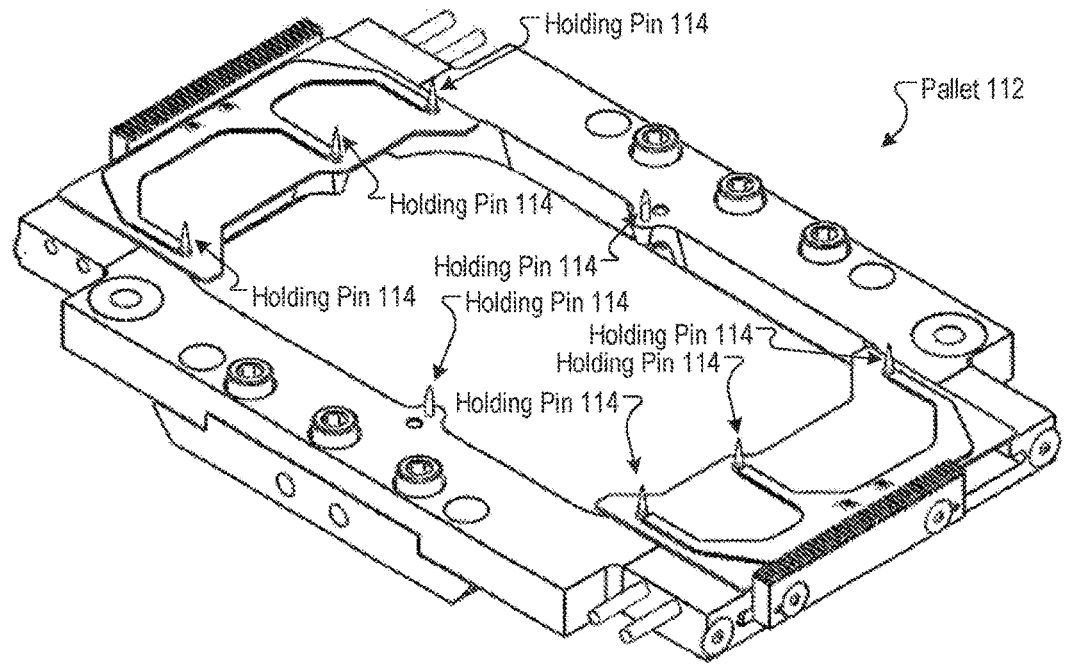
Figure 2C:
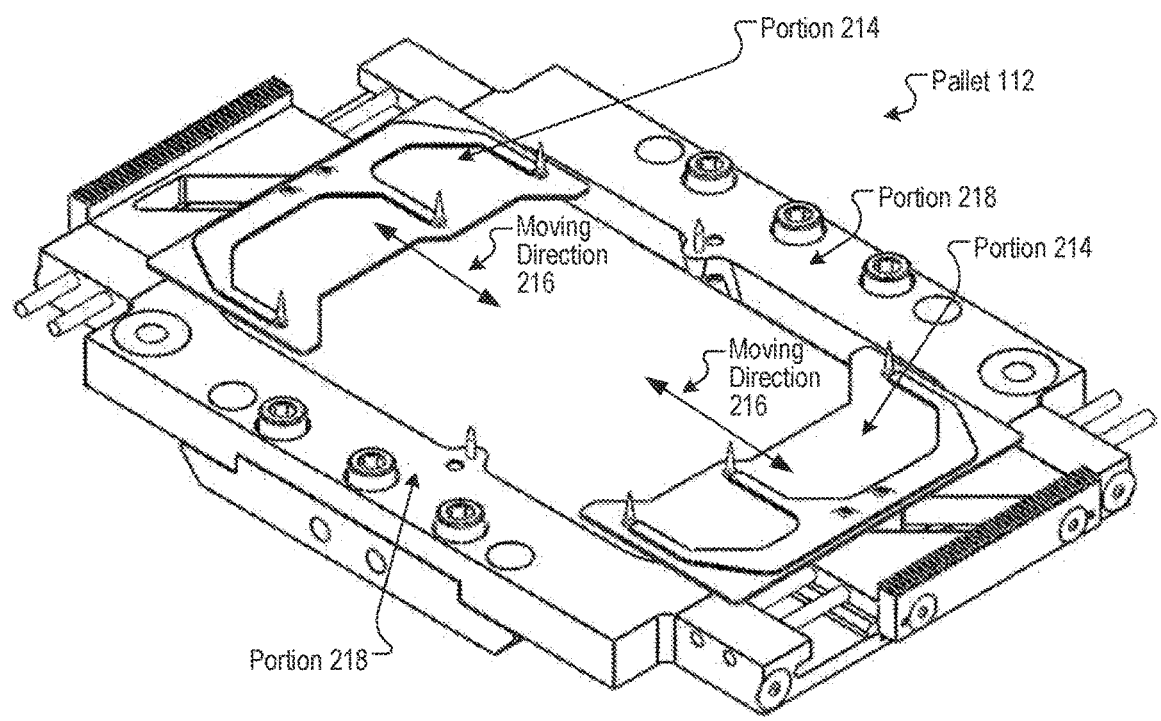

FIGS. 2B-C and 2I-K illustrate pallets 112 of dental appliance manufacturing systems 100, according to certain embodiments. In some embodiments, pallet 112 of FIG. 2B is in a longer-length configuration and pallet 112 of FIG. 2C is in a shorter-length configuration. In some embodiments, responsive to determining the molds 154 to be used for simultaneous thermoforming, pallet 112 is adjusted (e.g., via servo motors, via pneumatics, etc.) to be in a longer-length configuration or a shorter-length configuration to minimize the amount of plastic used (e.g., use the smallest sheet of plastic 116 possible) while providing clearances around the molds 154. In some embodiments, the length and/or width of the pallet 112 is adjustable.

In some embodiments, portions 214 of pallet 112 are moving portions that are configured to move (e.g., in direction of moving direction 216 arrows) relative to each other (e.g., towards each other and away from each other) to resize the pallet 112. The portions 214 may include one or more holding pins 114 (e.g., each portion 214 may include three holding pins 114). In some embodiments, portions 218 of the pallet 112 are stationary portions that are configured to not move relative to each other. The portions 218 may each include one or more holding pins 114 (e.g., one holding pin each).

In some embodiments, portions 218 move relative to each other to size the pallet 112 (e.g., change the size in the width direction). In some embodiments, portions 218 move relative to each other and portions 214 are stationary (e.g., do not move relative to each other). In some embodiments, portions 218 move relative to each other and portions 214 move relative to each other (e.g., change the size in the width and length directions). A structure (e.g., gasket, plates, blades) may be used (e.g., in the interior corners of pallet 112) to maintain a substantially sealed environment (e.g., substantially thermally isolated environment, maintain a pressure level, etc.).

Pallet 112 has an upper surface configured to receive a sheet of plastic 116. The pallet 112 also includes inner sidewalls sized and shaped to receive a plate 162 securing mold 154A and mold 154B for thermoforming of the sheet of plastic 116. The pallet 112 also includes holding pins 114 disposed on the upper surface of the pallet. The holding pins 114 are configured to pierce the sheet of plastic 116 to secure the sheet of plastic 116 during heating and thermoforming.

The inner sidewalls form a first inner corner of the pallet 112, a second inner corner of the pallet 112, a third inner corner of the pallet 112, and a fourth inner corner of the pallet 112. The holding pins 114 include a first holding pin 114 located on the upper surface proximate the first inner corner, a second holding pin 114 located on the upper surface proximate the second inner corner, a third holding pin 114 located on the upper surface proximate the third inner corner, and a fourth holding pin 114 located on the upper surface proximate the fourth inner corner. The holding pins 114 may also include a fifth holding pin 114 located on the upper surface between (e.g., substantially midway between) the first holding pin 114 and the second holding pin 114, a sixth holding pin 114 located on the upper surface between (e.g., substantially midway between) the second holding pin 114 and the third holding pin 114, a seventh holding pin 114 located on the upper surface between (e.g., substantially midway between) the third holding pin 114 and the fourth holding pin 114, and an eighth holding pin 114 located on the upper surface between (e.g., substantially midway between) the fourth holding pin 114 and the first holding pin 114.

In some embodiments, the pallet 112 has at least four holding pins 114. In some embodiments, the pallet 112 has at least six holding pins 114. In some embodiments, the pallet 112 has at least eight holding pins 114. The holding pins 114 may hold the sheet of plastic 116 in place (e.g., during heating and thermoforming).

In some embodiments, the pallet 112 adjusts in width and in length. In some embodiments, a seal (e.g., gasket, etc.) is provided between the moving components of the pallet 112 to provide a substantially sealed environment and/or a substantially thermally isolated environment.

Figure 2D:
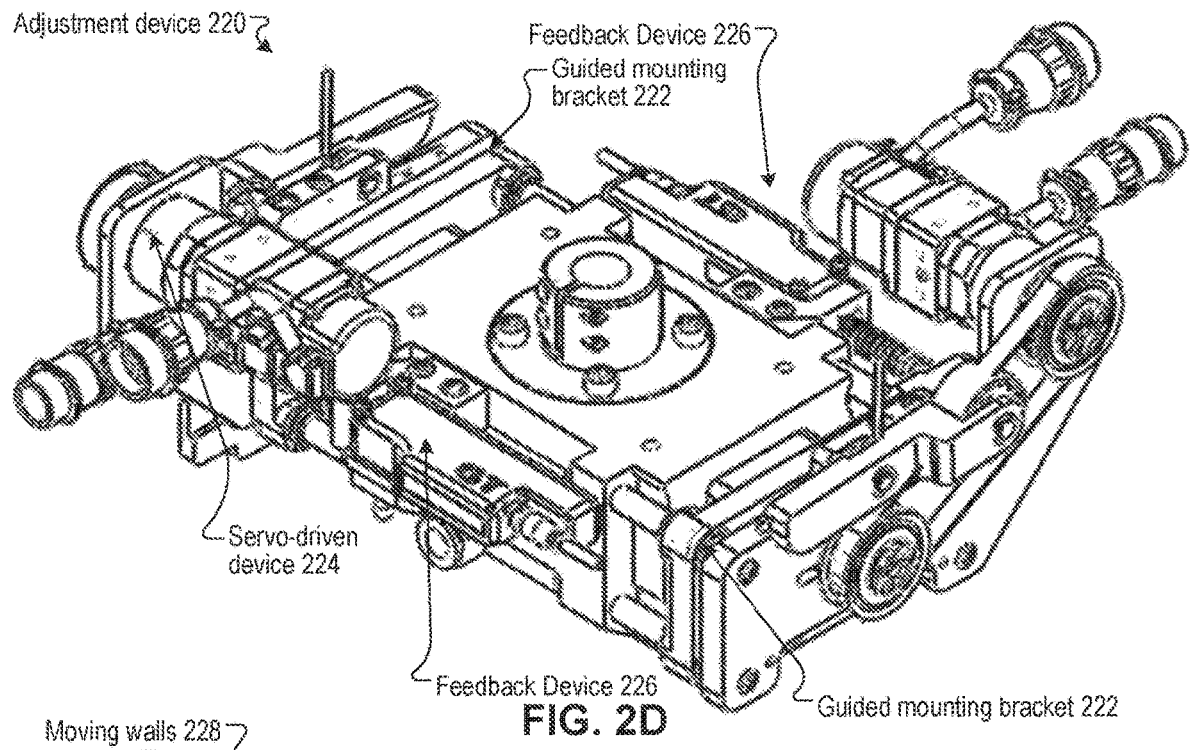
Figure 2E:
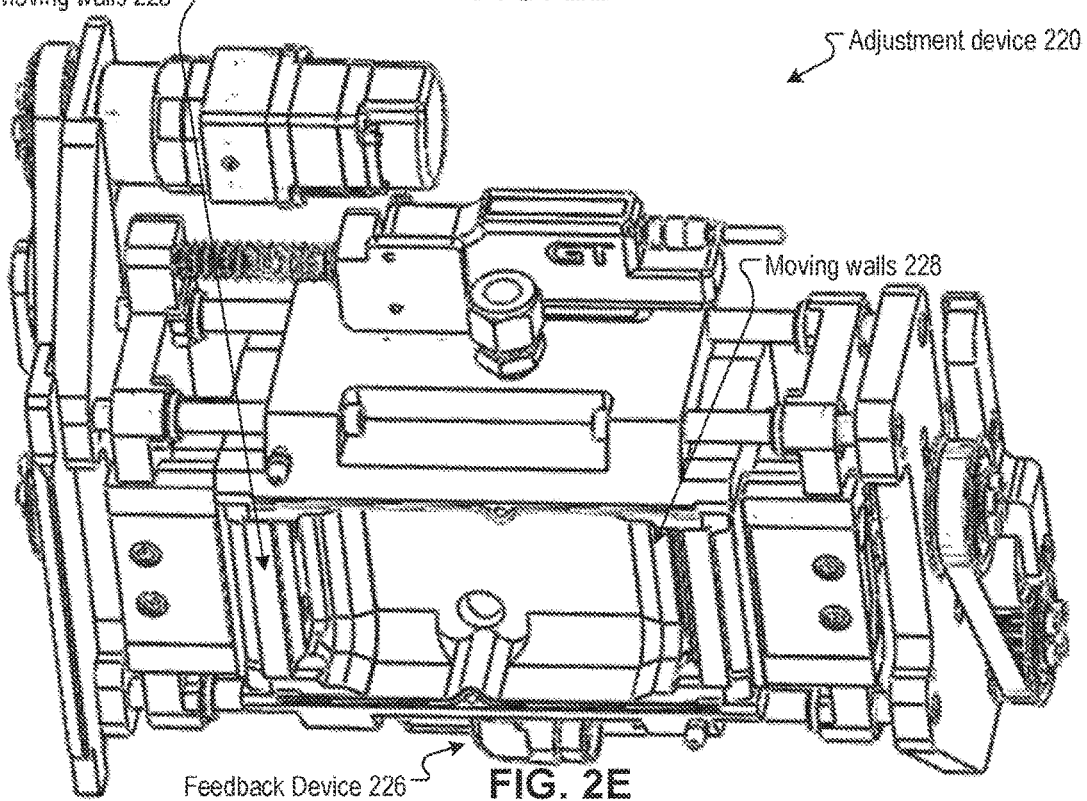
Figure 2F:
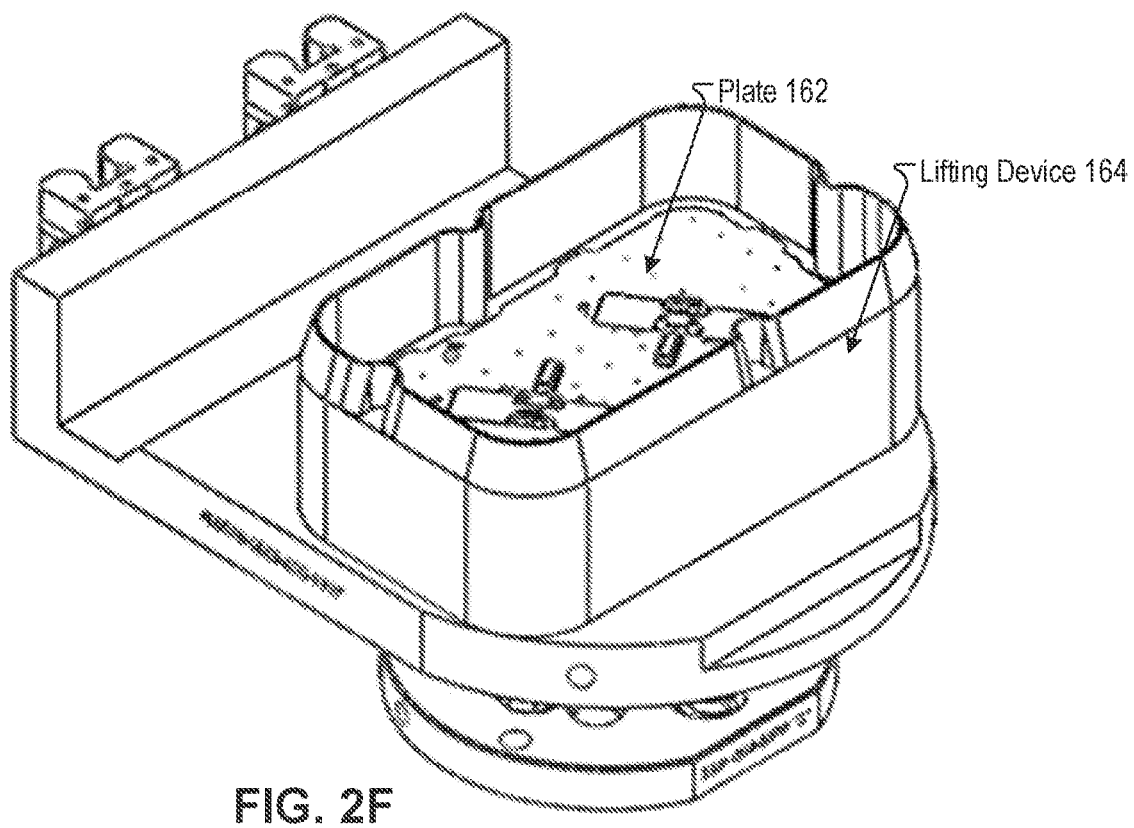
Figure 2G:
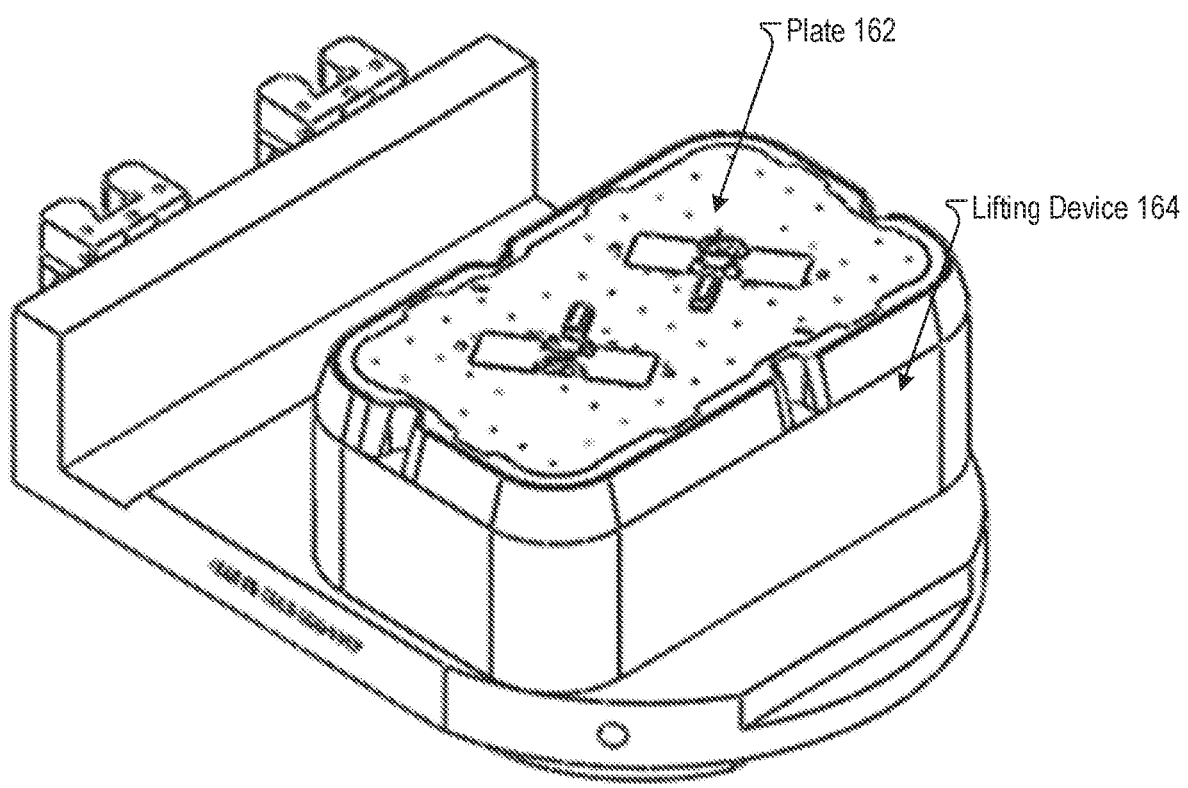
Figure 2H:
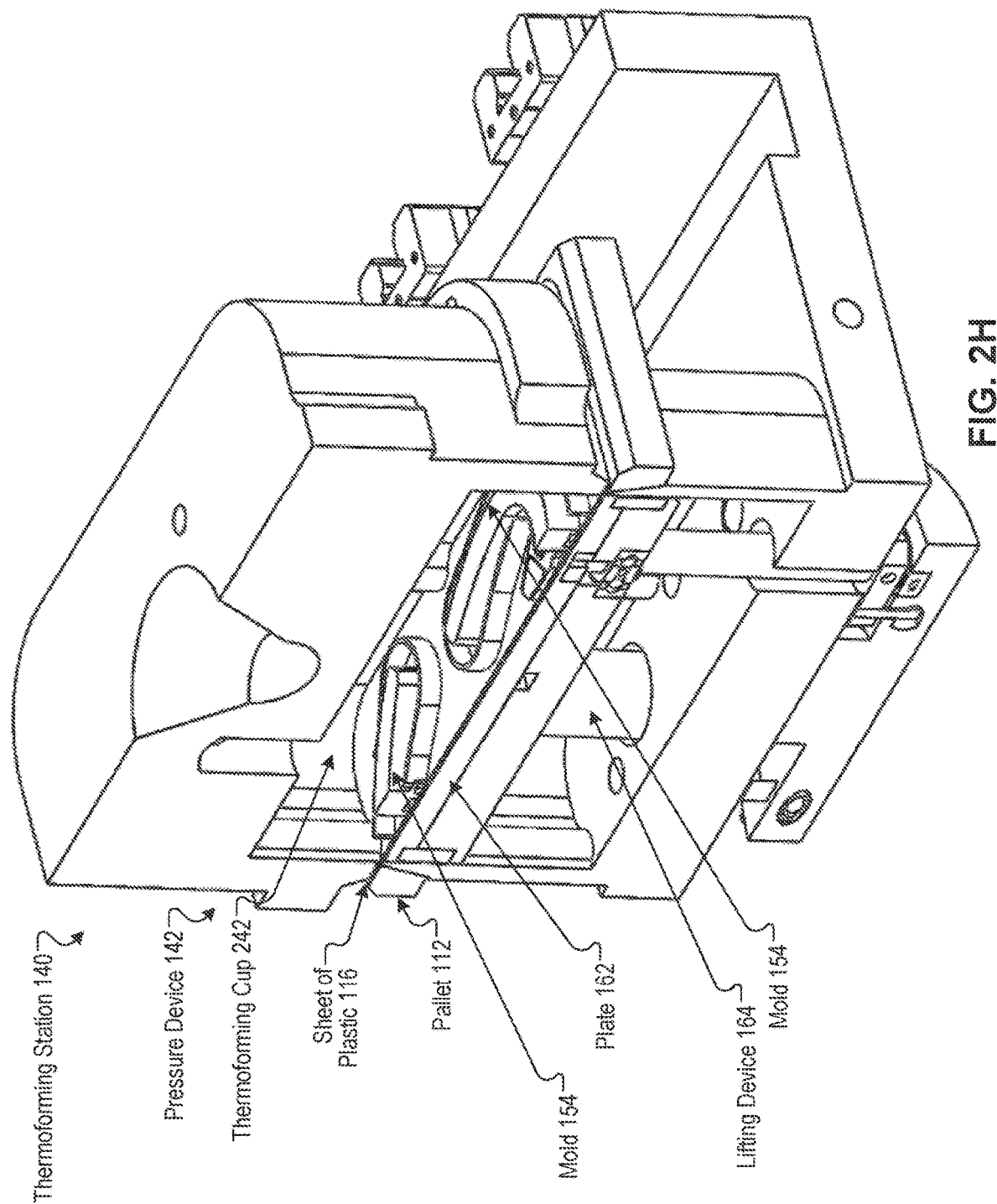
Figure 2I:
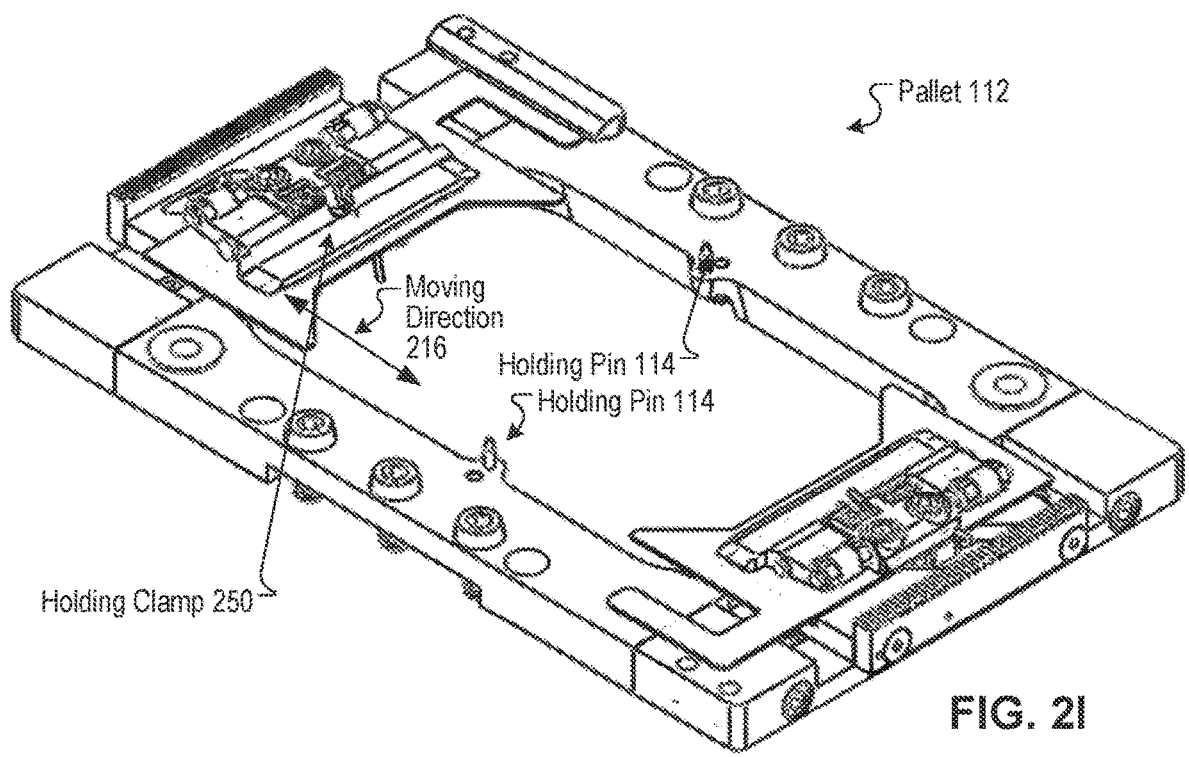
Figure 2J:
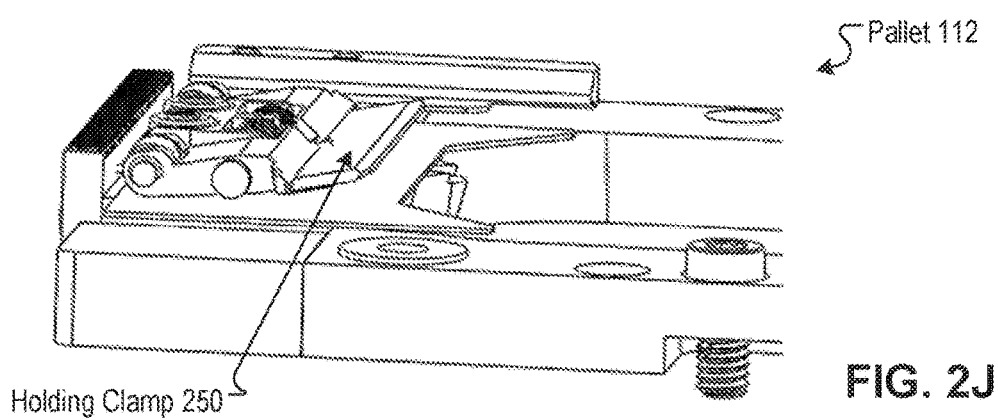
Figure 2K:
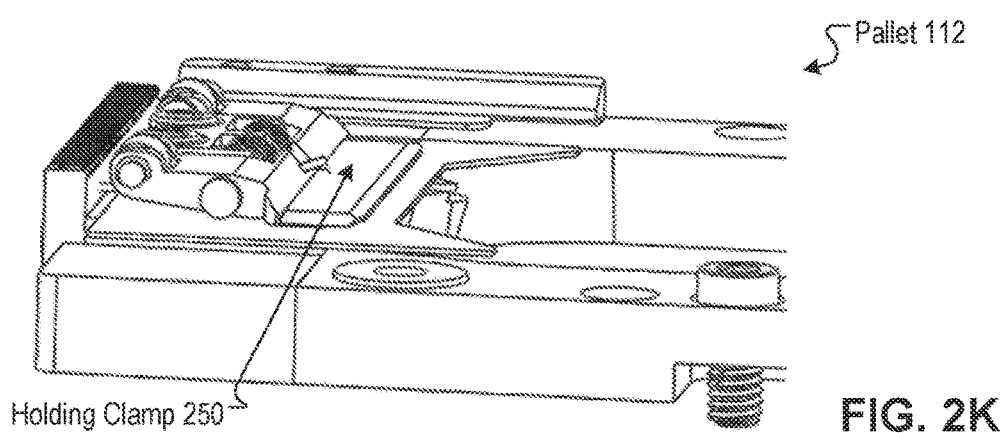

As shown in FIGS. 2I-K, in some embodiments, pallet 112 has one or more holding clamps 250 that is configured to secure the sheet of plastic 116 in place (e.g., in addition to or instead of holding pins 114). In some embodiments, pallet 112 includes a first holding clamp 250 proximate a first distal end of the pallet 112, a second holding clamp 250 proximate a second distal end of the pallet 112 opposite the first distal end, a first holding pin 114 between the first holding clamp 250 and the second holding clamp (e.g., on a first lateral portion of the pallet 112), and a second holding pin 114 between the first holding clamp 250 and the second holding clamp (e.g., on a second lateral portion of the pallet 112 opposite the first lateral portion of the pallet 112).

FIGS. 2D-E illustrate adjustment devices 220, according to certain embodiments. In some embodiments, FIG. 2D is a top perspective view of adjustment device 220 and FIG. 2E is a bottom perspective view of the adjustment device 220. Adjustment device 220 may couple (e.g., interconnect, mechanically connect to, electrically connect to) to and/or adjust one or more components of the dental appliance manufacturing system 100. In some embodiments, adjustment device 220 couples to pallet 112 (e.g., see FIGS. 2B-C) to adjust the length and/or width of the pallet 112.

Adjustment device 220 includes one or more guided mounting brackets 222, one or more servo-driven devices 224 (e.g., servo motors), one or more feedback devices 226 (e.g., linear variable differential transformer feedback for opening measurement), and/or moving walls 228 that open and close dynamically based on the molds 154 (e.g., mold geometry). The moving walls 228 may include flexible material for sealing (e.g., to prevent heat transfer and/or fluid transfer through the pallet 112). The adjustment device 220 adjusts one or more components (e.g., pallets 112) in the vertical and/or horizontal axis to accommodate the mold geometries.

In some embodiments, the sizing of the pallet 112 (e.g., as illustrated in one or more of FIGS. 2B-E) is performed in the sizing station 110.

FIGS. 2F-G illustrate plates 162 of dental appliance manufacturing systems 100 (e.g., in positioning station 160), according to certain embodiments. In some embodiments, FIG. 2F illustrates a lowered-configuration of the plate 162 and FIG. 2G illustrates a raised-configuration of the plate 162.

The controller 190 identifies geometries of molds and selects molds to be secured to a plate 162 based on the geometries. The controller 190 determines positioning (e.g., x-direction, y-direction, rotation) of the molds 154 on the plate 162 based on the geometries (e.g., to reduce material, energy, time, etc. used while meeting the clearances between components). In some embodiments, the controller 190 causes the molds to be secured to the plate 162 while the plate is in a lowered-configuration or in a raised-configuration of plate 162. Responsive to a heated sheet of plastic 116 being transported into the thermoforming station 140, the lifting device 164 lifts the plate 162 and molds 154 into the raised-position to form the dental appliances.

FIG. 2H illustrates a thermoforming station 140 (e.g., thermoforming chamber) of a dental appliance manufacturing system 100, according to certain embodiments. A heated sheet of plastic 116 may be secured to a pallet 112 by one or more holding pins 114 on the upper surface of the pallet 112. Molds 154A-B may be secured to an upper surface of a plate 162 that is coupled to a lifting device 164. The heated sheet of plastic 116 is transported into the thermoforming station 140. The pressure device 142 interfaces with the heated sheet of plastic 116 (e.g., to provide a sealed environment between the sheet of plastic 116 and the pressure device 142, the pressure device 142 provides a pressure level). In some embodiments, pressure device 142 of the thermoforming station 140 lowers onto an upper surface of an outer perimeter of the heated sheet of plastic 116 and/or pallet 112. The lifting device 164 lifts the plate 162 securing the molds 154 to cause the molds 154A-B to press against the lower surface of the heated sheet of plastic 116 with a specified amount of force while the pressure device 142 maintains a pressure (e.g., substantially vacuum). After a threshold amount of time, the lifting device 164 lowers plate 162, the pressure device 142 may lift from the sheet of plastic 116 secured to the pallet 112, and the pallet 112 (with the thermoformed sheet of plastic 116 secured to the upper surface of the pallet 112) may leave the thermoforming station 140.

In some embodiments, the controller 190 configures the thermoforming station 140 based on the molds. For example, the controller 190 may adjust the thermoforming cup size, the pressure level, and/or the like.

FIGS. 3A-E illustrate components associated with forming dental appliances, according to certain embodiments.

Figure 3A:
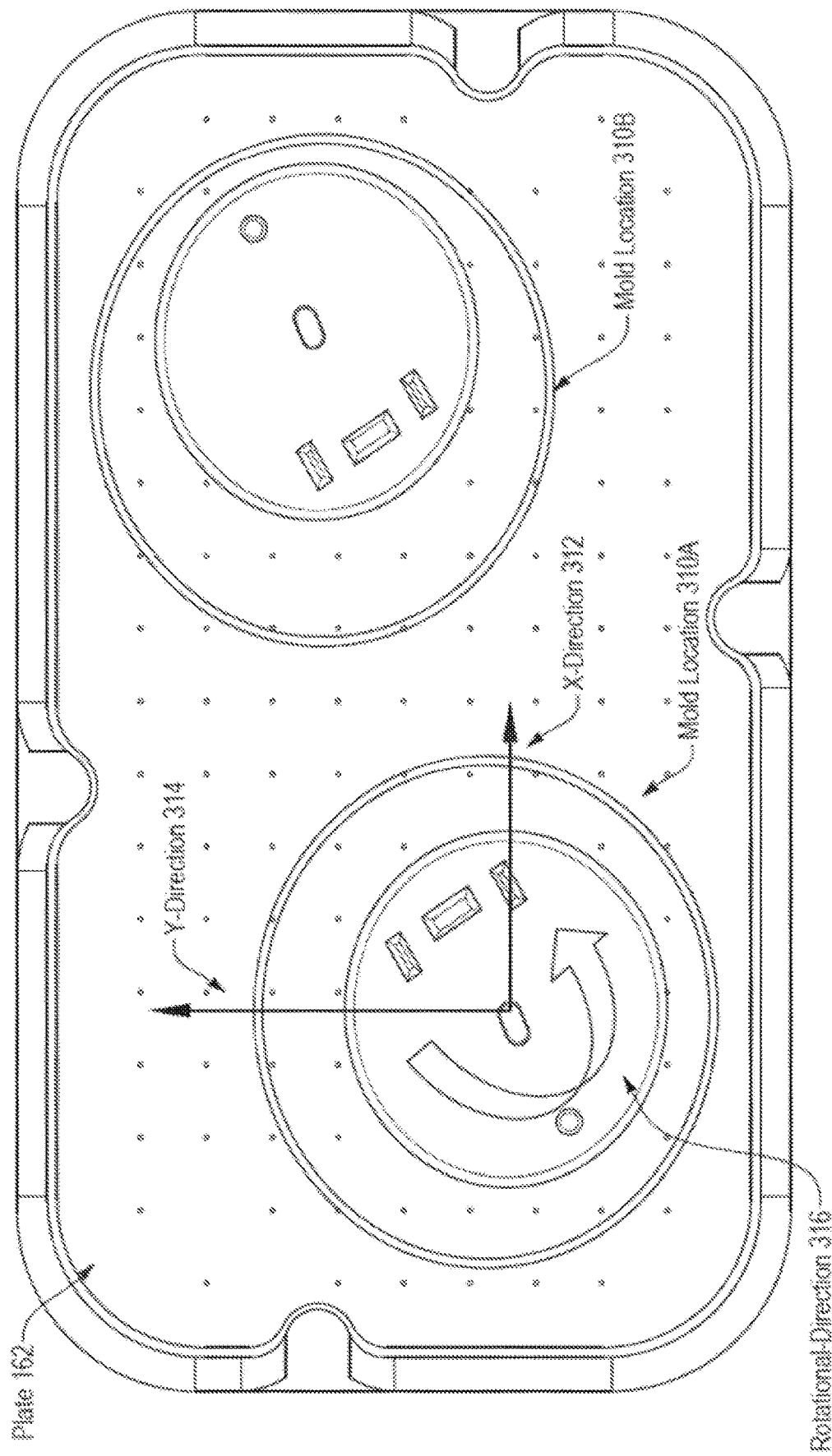

FIG. 3A illustrates a plate 162, according to certain embodiments. In some embodiments, molds 154 (e.g., two molds 154) can be disposed on the plate 162 within mold locations 310. For example, there may be two mold locations 310A-B that can each receive a mold 154. The mold location 310 may be an area (e.g., circular area, oval-shaped area, etc.) on the upper surface of the plate 162 where a mold 154 may be positioned. The spacing between the mold locations 310 and between each mold location and the edges of the plate 162 may correspond to manufacturing clearances. In some embodiments, a mold 154 can be moved in the x-direction 312, y-direction 314, and rotational direction 316 within a mold location 310.

The controller 190 may determine positioning of molds 154 in the mold locations 310 in the x-direction 312, y-direction 314, and rotational direction 316 and then the controller 190 may determine configurations of one or more portions of the dental appliance manufacturing system 100 (e.g., plate 162, pallet 112, sheet of plastic 116, heater 132, mask 134, pressure device 142, and/or the like) based on the positioning of the molds 154 on the plate 162. For example, responsive to the molds 154 occupying the entire area of the mold locations 310A-B, the controller 190 may adjust one or more portions of the dental appliance manufacturing system 100 to be the maximum size. In some examples, responsive to molds 154 occupying a portion of the area of mold locations 310A-B, the controller 190 may adjust one or more portions of the dental appliance manufacturing system 100 to accommodate a smaller area to save material, energy, and time.

Figure 3B:
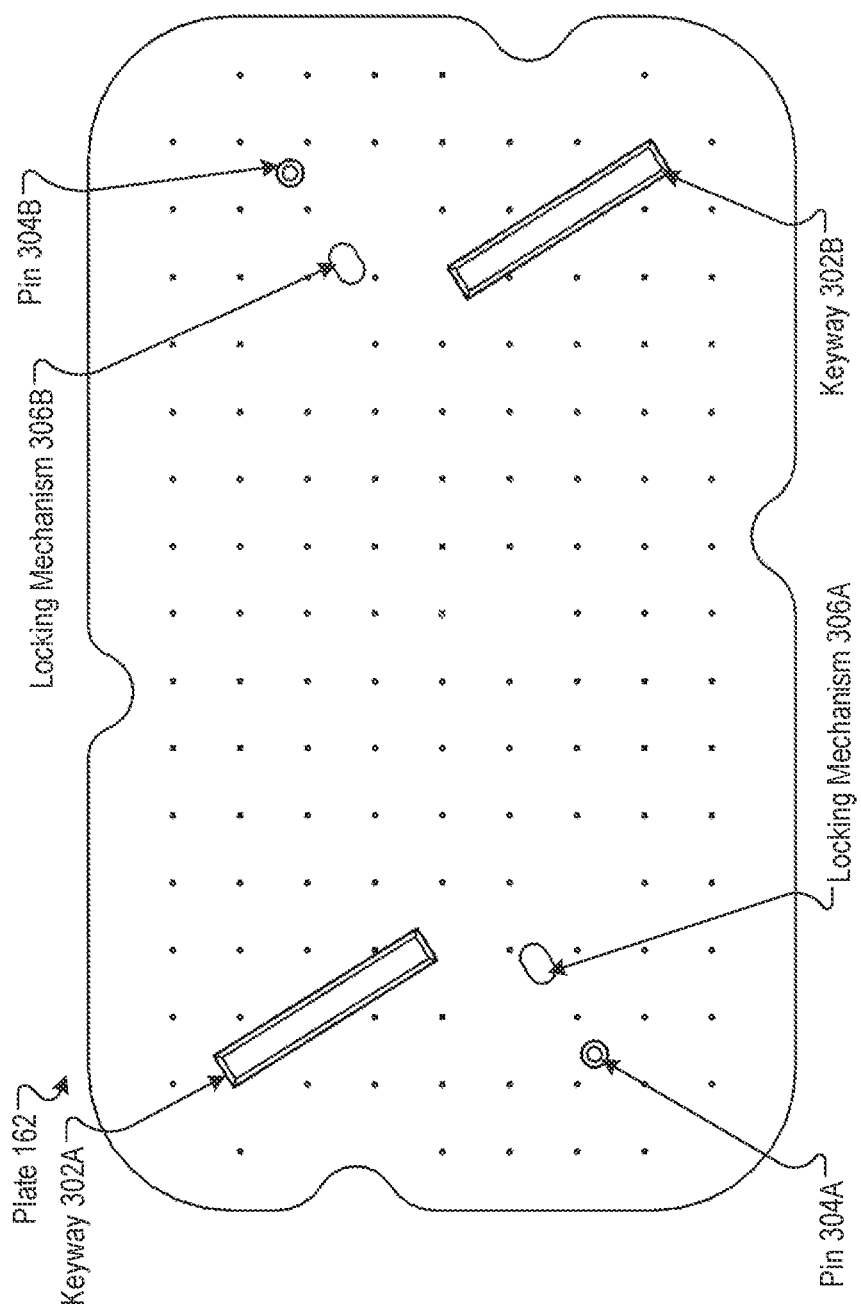

FIG. 3B illustrates a plate 162, according to certain embodiments. The plate 162 may include one or more features for securing molds 154. In some embodiments, the location of the features may be adjustable (e.g., the controller 190 may cause the features to be located in different locations to accommodate different sized molds 154). In some embodiments, for each mold, a plate 162 may include corresponding features including a corresponding keyway 302A-B, corresponding pin 304A-B, and corresponding locking mechanism 306A-B. The plate 162 may secure each mold 154A-B in a predetermined position, a predetermined orientation, and predetermined distances from inner walls of the thermoforming station 140 and/or from each other using the features.

Each keyway 302 may maintain orientation of a corresponding mold 154A-B. A lower surface of the mold 154A-B may have a feature (e.g., protrusion, recess) that interfaces with the keyway 302A-B so that the mold does not change orientation.

Each pin 304A-B may secure a corresponding mold 154A-B in an x-direction and a y-direction. Each mold 154A-B may have a recess (e.g., pin hole) formed by a lower surface of the mold 154A-B that interfaces with the pin 304A-B. The pin 304A-B interfacing with the recess may cause the mold 154A-B to not move in the x- and y-directions.

Each locking mechanism 306A-B may secure a corresponding mold 154A-B in the z-direction. For example, the locking mechanism may overlap an upper surface of the mold 154A-B so that the mold 154A-B does not move away from the plate 162. Each mold may form a hole (e.g., proximate a flat identification portion of the mold) that corresponds to the locking mechanism 306A-B. The mold 154A-B may be placed on the plate 162 so that a top portion of the locking mechanism 306A-B sticks through the hole and the top portion of the locking mechanism may be rotated to lock the mold 154A-B in the z-direction.

Figure 3C:
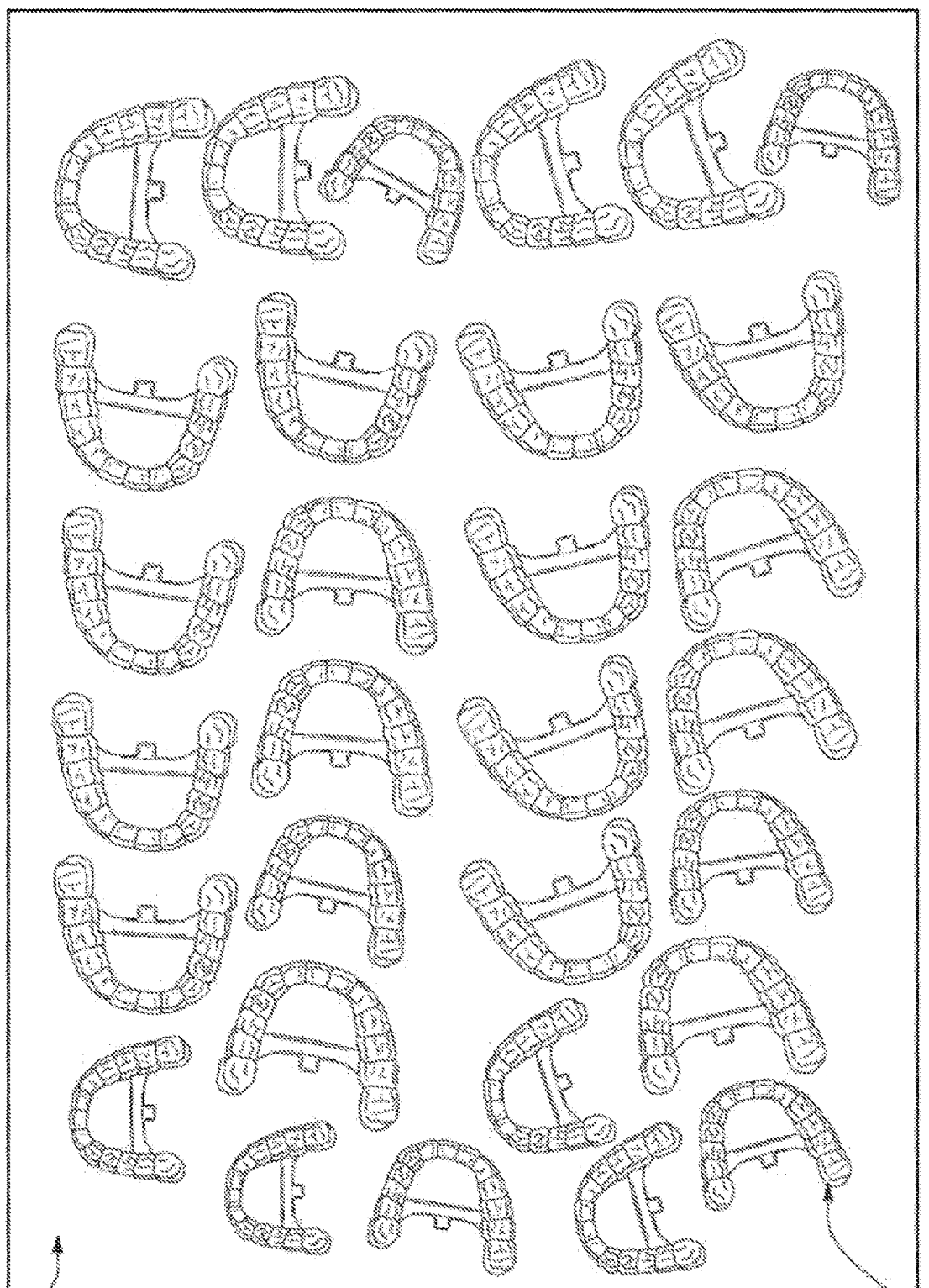

FIG. 3C illustrates a plate 162, according to certain embodiments. In some embodiments, multiple molds 154 may be secured to the plate 162 for thermoforming of dental appliances. In some embodiments, the controller 190 selects the maximum number of molds 154 that can be secured to the plate 162 while still maintaining clearances. The clearances may be determined based on distances between molds that resulted in functioning dental appliances and distances between molds that resulted in defective dental appliances. The controller 190, based on the incoming molds, may calculate the number of molds and positioning (e.g., orientation) of the molds. The controller 190 may cause a robot to pick up each mold and assign a specific location to each mold.

FIG. 3D illustrates a sheet of plastic 116, according to certain embodiments. The sheet of plastic 116 may have curved edges (e.g., may be oval-shaped, elliptical in shape, may be circular in shape, etc.) to save material (e.g., molds 154 have an oval-shaped portion).

FIG. 3E illustrates a plate 162, according to certain embodiments. In some embodiments, two or more sheets of plastic 116 may be used for simultaneously forming dental appliances. A first zone (e.g., first substantially thermally isolated zone, first substantially sealed environment, first pressure zone, etc.) may be provided for mold 154A and a second zone (e.g., second substantially thermally isolated zone, second substantially sealed environment, second pressure zone, etc.) may be provided for mold 154B. For example, mask 134, heater 132, and/or pressure device 142 may cause a separation (e.g., thermal separation, sealed environment separation, pressure separation) between the first zone and the second zone. A first sheet of plastic 116 may be used in the first zone and a second sheet of plastic 116 may be used in the second zone. There may be spacing 320 between the first zone and the second zone to provide the thermal and/or pressure isolation between the first zone and the second zone.

Figure 4:
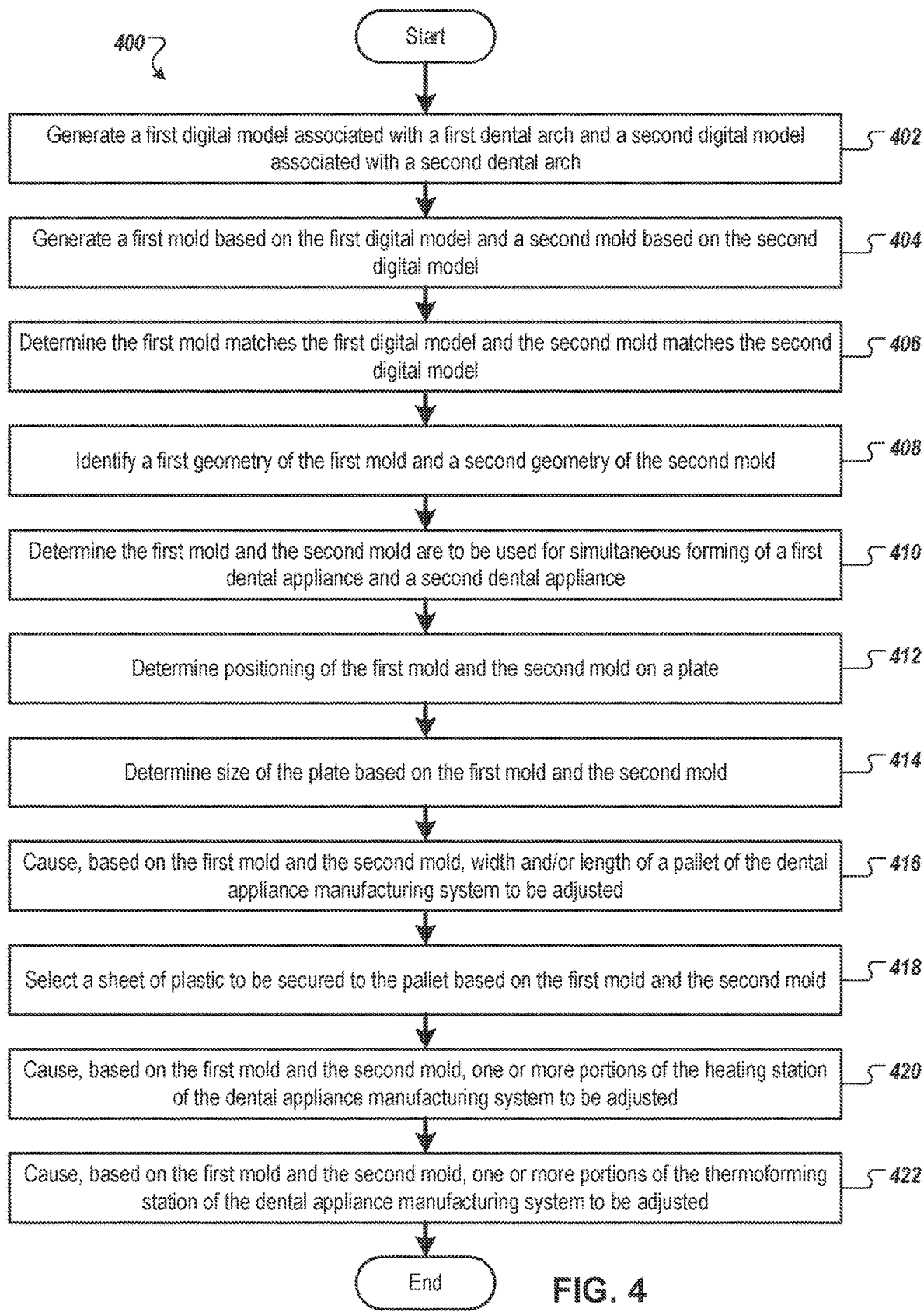
FIGS. 4-5 illustrate flow diagrams for methods associated with dynamically generating dental appliances, according to certain embodiments.
Figure 5:
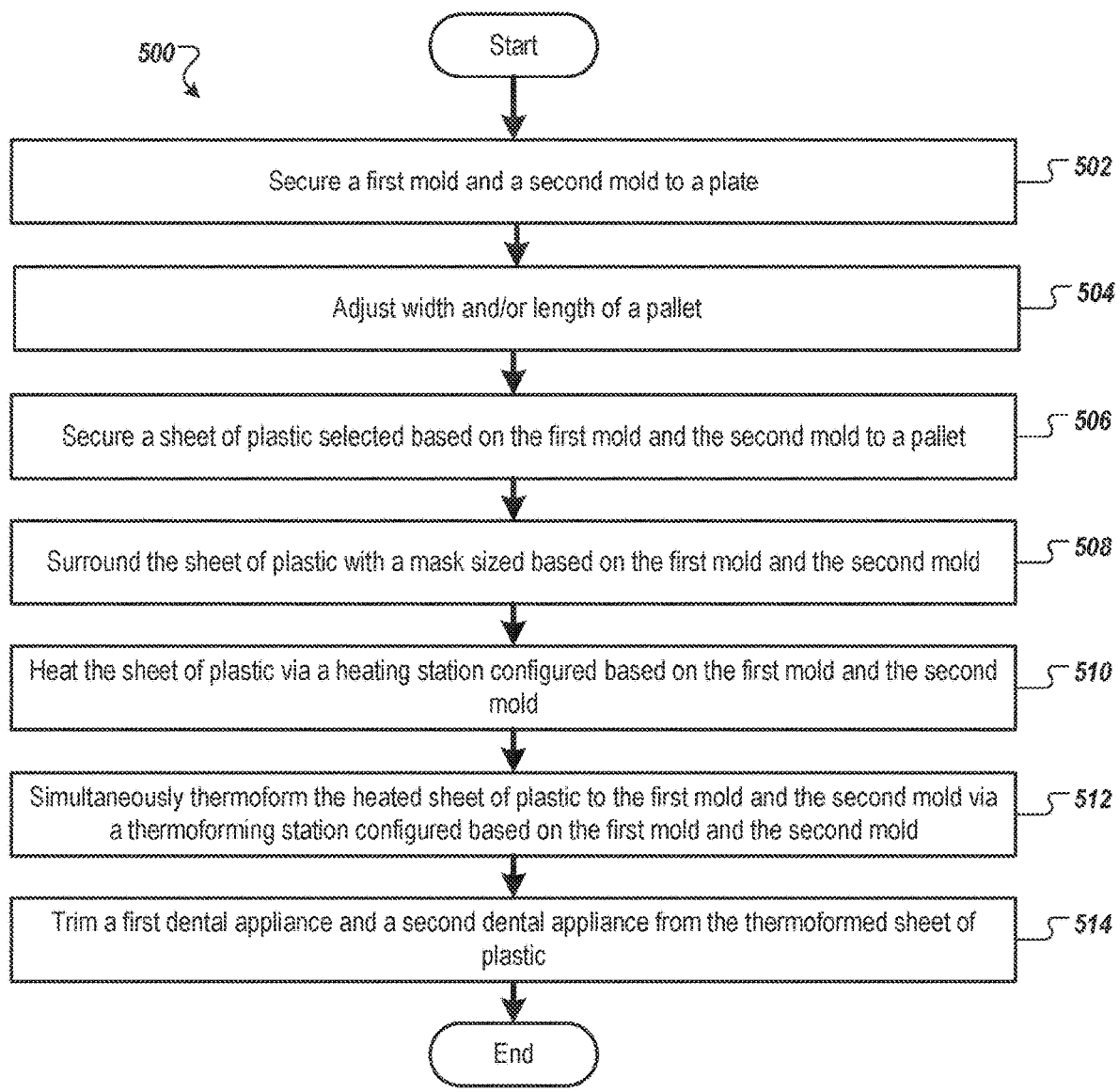

FIGS. 4-5 illustrate flow diagrams for methods 400 and 500 associated with dynamically generating dental appliances, according to certain embodiments. In some embodiments, one or more operations of methods 400 and 500 are performed by a processing logic of a computing device (e.g., controller 190) to automate one or more operations of forming a dental appliance. The processing logic may include hardware (e.g., circuitry, dedicated logic, programmable logic, microcode, etc.), software (e.g., instructions executed by a processing device), firmware, or a combination thereof. For example, one or more operations of methods 400 and 500 may be performed by a processing device executing a program or module, such as dental appliance generator 650 of FIG. 6.

Referring to FIG. 4, at block 402 of method 400, processing logic generates a first digital model associated with a first dental arch and a second digital model associated with a second dental arch. At block 402, processing logic generates a corresponding digital model for each mold. For example, a first digital model of a first mold and a second digital model of a second mold may be generated. A shape of a dental arch for a patient at a treatment stage may be determined based on a treatment plan to generate the digital model of the mold. In the example of orthodontics, the treatment plan may be generated based on an intraoral scan of a dental arch to be modeled. The intraoral scan of a patient's dental arch may be performed to generate a three dimensional (3D) virtual model of the patient's dental arch. For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled. The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

The processing logic may determine an initial shape for a mold of the patient's dental arch at a treatment stage based on the digital model of the dental arch at that treatment stage. Processing logic may additionally determine one or more features to add to the mold that will cause the dental appliance formed over the mold to have the determined markings and/or elements.

The processing logic may determine a final shape for the mold and may generate a digital model of the mold. Alternatively, the digital model may have already been generated. In such an instance, processing logic updates the already generated digital model to include the determined features for the mold. The digital model may be represented in a file such as a computer aided drafting (CAD) file or a 3D printable file such as a stereolithography (STL) file. The digital model may include instructions that will control a fabrication system or device in order to produce the mold with specified geometries.

At block 404, processing logic, causes a first mold to be generated based on the first digital model and causes a second mold to be generated based on the second digital model. Processing logic may cause a corresponding mold to be generated based on each digital model. Each virtual 3D model of a patient's dental arch may be used to generate a unique customized mold of the dental arch at a particular stage of treatment. The shape of the mold may be at least in part based on the shape of the virtual 3D model for that treatment stage. The mold may correspond to a dental arch of a patient and the mold may include a sloping portion that commences below a gum line of the dental arch and extends away from the dental arch to a lower portion of the mold. A portion of the thermoformed sheet of plastic 116 that is disposed on the sloping portion of the mold is to be trimmed (e.g., at block 514 to trim the dental appliances from the thermoformed sheet of plastic). In some embodiments, at block 404, the mold is generated with the sloping portion commencing below the gum line to assist in the release of the thermoformed sheet of plastic from the mold. The mold may be formed using a rapid prototyping equipment (e.g., 3D printers) to manufacture the mold using additive manufacturing techniques (e.g., stereolithography) or subtractive manufacturing techniques (e.g., milling). The digital model may be input into a rapid prototyping machine. The rapid prototyping machine then manufactures the mold using the digital model. One example of a rapid prototyping manufacturing machine is a 3D printer. 3D Printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In one embodiment, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Optionally, the rapid prototyping techniques described herein allow for fabrication of a mold including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate an object from a plurality of different materials. Alternatively or in combination, a multi-material direct fabrication method can involve forming an object from multiple materials in a plurality of sequential manufacturing steps. For instance, a first portion of the object (e.g., a main portion of the mold) can be formed from a first material in accordance with any of the direct fabrication methods herein, then a second portion of the object (e.g., complex features added to the mold) can be formed from a second material in accordance with methods herein, and so on, until the entirety of the object has been formed. The relative arrangement of the first and second portions can be varied as desired. In one embodiment, multi-material direct fabrication is used to cause a first material to be used for the markings of the cut line on the mold, and to cause one or more additional materials to be used for the remainder of the mold.

Dental appliances may be formed from each mold to provide forces to move the patient's teeth. The shape of each dental appliance is unique and customized for a particular patient and a particular treatment stage. In an example, the dental appliances can be pressure formed or thermoformed over the molds. Each mold may be used to fabricate a dental appliance that will apply forces to the patient's teeth at a particular stage of the orthodontic treatment. The dental appliances each have teeth-receiving cavities that receive and resiliently reposition the teeth in accordance with a particular treatment stage.

At block 406, processing logic determines (e.g., via a vision system, via an imaging system) the first mold matches the first digital model and the second mold matches the second digital model. In some embodiments, images are captured of each mold and the processing logic identifies, from the images, a corresponding identifier associated with each dental arch (e.g., associated with each mold). The processing logic may retrieve, based on the identifiers, the digital models corresponding to the molds. At block 406, to determine a mold matches a digital model, the processing logic may provide the images and the digital models as input to a trained machine learning model. To identify the identifiers, the processing logic may use optical character recognition (OCR) to read the identifier from one or more images. In some embodiments, the processing logic receives the identifier via an asset tag (e.g., RFID tag, NFC tag) associated with (e.g., embedded in) the mold.

At block 408, the processing logic identifies (e.g., via a vision system, via an imaging system) a first geometry of the first mold and a second geometry of the second mold. In some embodiments, the first geometry and the second geometry are determined based on digital models of the first mold and the second mold. In some embodiments, the first and second sizes are determined by measuring the first mold and the second mold (e.g., via automated optical measurement, manually, based on images of the first mold and the second mold, etc.). In some embodiments, the sizes of the molds are compared to threshold sizes.

At block 410, the processing logic determines the first mold and the second mold are to be used for simultaneous forming of a first dental appliance and a second dental appliance. In some embodiments, the processing logic determines the first mold and the second mold are to be used responsive to determining that the first mold and the second mold are the most similar in size out of the molds that are to be used for forming dental appliances. In some embodiments, the first mold and the second mold are selected responsive to determining that using the first mold and the second mold would use the least amount of material (e.g., minimize plastic used during simultaneous forming), time, and/or energy per dental appliance compared to other combinations of molds. In some embodiments, the processing logic calculates optimum geometry (e.g., of molds on the plate) based on cost analysis (e.g., reduction of waste of plastic).

At block 412, the processing logic determines positioning of the first mold and the second mold on a plate. The positioning may include at least two degrees of freedom (e.g., x-direction positioning and y-direction positioning). The positioning may include at least three degrees of freedom (e.g., x-direction positioning, y-direction positioning, and/or rotational positioning). The positioning may be free-form positioning where only a minimum clearance is to be between content (e.g., see FIG. 3C). The positioning may be U-shape (e.g., se FIG. 3E) where the plastic sheet is shut in a U shape (e.g., oval shape, two half oval shapes) and is utilized for the thermoforming process.

At block 414, the processing logic determines size of the plate based on the first mold and the second mold (e.g., based on the positioning of the first mold and the second mold on the plate). In some embodiments, the processing logic causes a plate corresponding to the size to be selected or causes adjustment of the size of the plate (e.g., via pneumatics, via servo-motors, etc.).

At block 416, the processing logic causes, based on the first mold and the second mold, width and/or length of a pallet of the dental appliance manufacturing system to be adjusted (e.g., via pneumatics, via servo-motors, etc.).

At block 418, the processing logic selects a sheet of plastic to be secured to the pallet based on the first mold and the second mold. In some embodiments, the processing logic causes the sheet of plastic to be generated (e.g., cut) based on the positioning of the first mold and the second mold and/or the size of the pallet.

At block 420, the processing logic causes, based on the first mold and the second mold, one or more portions of the heating station of the dental appliance manufacturing system to be adjusted. In some embodiments, the processing logic causes the size (e.g., width and/or length) of the mask to be adjusted, causes the location of the heating elements to be adjusted (e.g., in the horizontal direction), causes the temperature to be adjusted (e.g., adjust energy provided to one or more of the heating elements), and/or the like.

At block 422, the processing logic causes, based on the first mold and the second mold, one or more portions of the thermoforming station of the dental appliance manufacturing system to be adjusted. In some embodiments, the processing logic causes the thermoforming cup to be adjusted (e.g., .adjust length, width, and/or height) and/or causes the pressure level to be adjusted.

Referring to FIG. 5, at block 502 of method 500, a first mold and a second mold are secured to a plate. The first and second molds may be secured to the plate via fasteners such as a pin, a keyway, and a locking mechanism. The first and second molds may be secured to the plate to avoid movement in the x-, y-, and z-direction and to avoid rotation (e.g., change in angle) of the molds.

At block 504, a width and/or length of a pallet is adjusted based on the first mold and the second mold (e.g., via servo motors, via pneumatics).

At block 506, a sheet of plastic selected (e.g., length, width, and/or thickness of the sheet of plastic is selected) based on the first mold and the second mold is secured to the pallet. The sheet of plastic may be an elastic thermoplastic, a sheet of polymeric material, etc. The sheet of plastic may be lowered onto the pallet so that holding pins of the pallet pierce the sheet of plastic to secure the sheet of plastic to the pallet. The sheet of plastic is secured to the pallet and the pallet securing the sheet of plastic is transferred to a heating station.

At block 508, the sheet of plastic is surrounded with a mask sized based on the first mold and the second mold. The length and/or width of the mask may be controlled by the heating station, by servo motors, by pneumatics, and/or the like. A pressurized cylinder of the heating station may lower the mask onto the sheet of plastic secured to the pallet.

At block 510, the sheet of plastic is heated via a heating station configured based on the first mold and the second mold. One or more of heating element location, temperature, mask size, and/or the like of the heating station may be configured (e.g., based on the positioning of the first mold and the second mold.) The sheet of plastic may be heated to a temperature at which the sheet of plastic becomes pliable. The sheet of plastic may be heated using a ceramic heater, convection oven, or infrared heater. The mask may allow the sheet of plastic to be heated to, for example, 336° F. without hanging to avoid air leaks. A mask may be placed on the sheet of plastic to minimize heat transfer from the heater to other sheets of plastic. The heated sheet may be transferred to a thermoforming station.

At block 512, the heated sheet of plastic is simultaneously thermoformed to the first mold and the second mold (e.g., that are secured to the plate) via a thermoforming station that is configured based on the first mold and the second mold. One or more of the thermoforming cup dimensions (e.g., length, width, height) or pressure level may be configured (e.g., based on the positioning of the first mold and the second mold). To thermoform the heated sheet of plastic over the two molds, pressure may concurrently be applied to the sheet of plastic to form the now pliable sheet of plastic around the two molds (e.g., with features that will imprint markings and/or elements in the dental appliances formed on the molds). Once the sheet cools, the sheet has a shape that conforms to both molds. In one embodiment, a release agent (e.g., a non-stick material) is applied to the molds before forming the dental appliances (e.g., shells). This may facilitate later removal of the molds from the shells. In some embodiments, the sheet of plastic is pressure formed over the first mold and the second mold simultaneously. To unload the thermoformed sheet from the pallet and form the dental appliances, the thermoformed sheet may be transferred to an unloading station.

In some embodiments, the transferring of the pallet securing the sheet of plastic is via a conveyor system (e.g., via lateral movement, via conveyor system 170 of FIG. 1A). In some embodiments, the transferring of the pallet securing the sheet of plastic is via a dial system (e.g., via rotational movement, via dial system 184A of FIG. 1B).

In some embodiments, the first mold and the second mold are transferred to be located below the thermoforming station and are lifted to have the heated sheet thermoformed over the first mold and the second mold. In some embodiments, the transferring of the first mold and the second mold to be located below the thermoforming station is via lateral movement. In some embodiments, the transferring of the first mold and the second mold to be located below the thermoforming station is via rotational movement (e.g., via dial system 184A of FIG. 1B).

At block 514, the first dental appliance and the second dental appliance are trimmed from the thermoformed sheet of plastic. The thermoformed sheet of plastic may be removed from the molds (e.g., using a shell removal device). The thermoformed sheet of plastic may be trimmed to generate the first and second dental appliances. In some embodiments, for each mold, the portion of thermoformed sheet of plastic that is disposed on a portion of the corresponding mold that slopes outward below the gum line is removed during the trimming of the thermoformed sheet of plastic to generate the dental appliances. After the thermoformed sheet of plastic is removed from the mold for a treatment stage, the thermoformed sheet of plastic is subsequently trimmed along one or more cut lines (also referred to as a trim line). The cut line may be a gingival cut line that represents an interface between a dental appliance and a patient's gingiva. In one embodiment, the dental appliance is manually cut by a technician using scissors, a bur, a cutting wheel, a scalpel, or any other cutting implement. In another embodiment, the dental appliance is cut by a computer controlled trimming machine such as a CNC machine or a laser trimming machine. The computer controlled trimming machine may control an angle and position of a cutting tool of the trimming machine to trim the thermoformed sheet of plastic. In some embodiments, the thermoformed sheet of plastic is divided into two parts (each part corresponding to a respective dental appliance) prior to the trimming of thermoformed sheet of plastic to generate the dental appliances.

Figure 6:
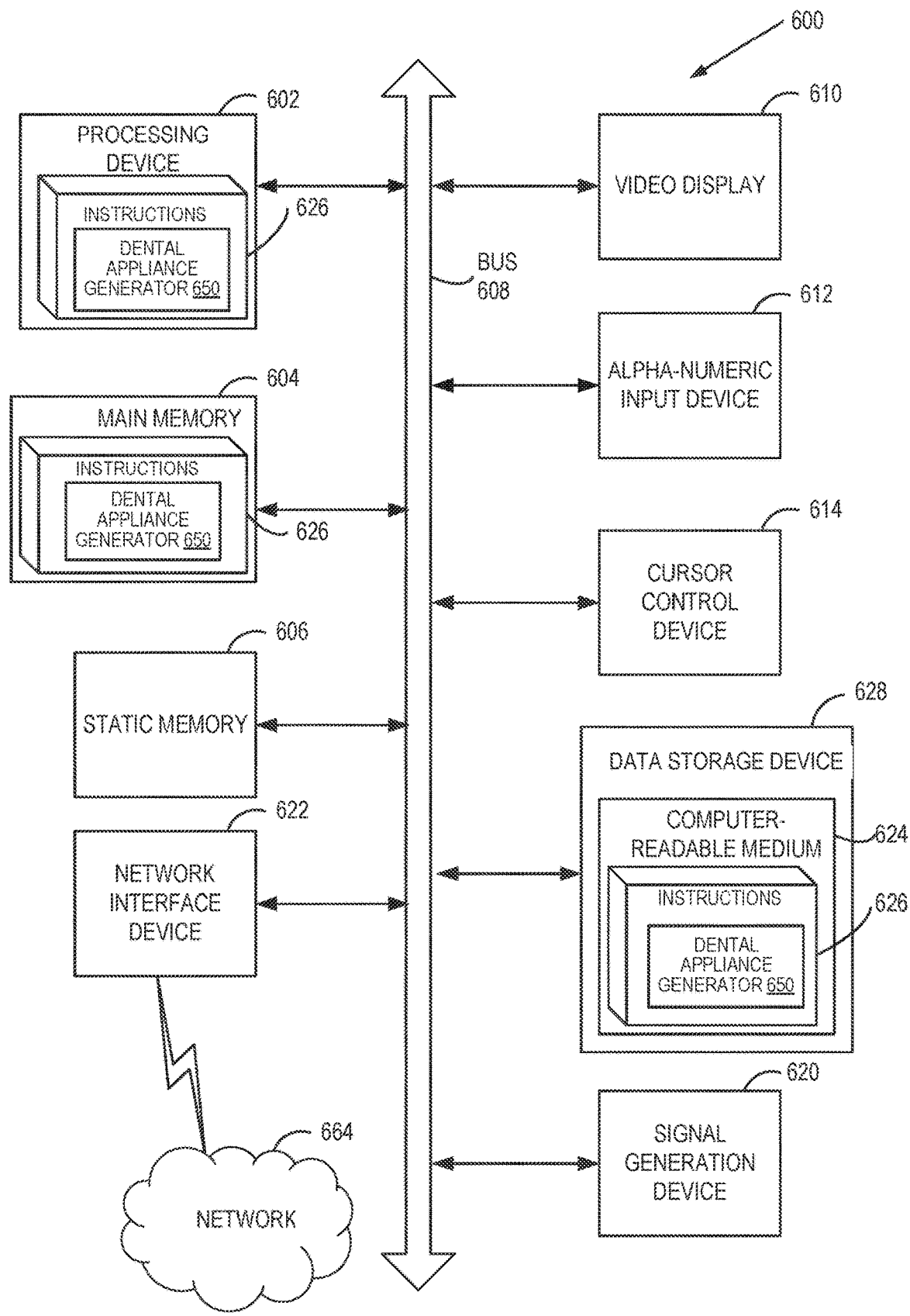
FIG. 6 illustrates a block diagram of an example computing device, according to certain embodiments.

FIG. 6 illustrates a diagrammatic representation of a machine in the example form of a computing device 600 within which a set of instructions, for causing the machine to perform any one or more of the methods described herein. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 628), which communicate with each other via a bus 608.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 626) for performing operations and steps discussed herein.

The computing device 600 may further include a network interface device 622 for communicating with a network 664. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 628 may include a machine-readable storage medium (or more specifically a non-transitory computer-readable storage medium) 624 on which is stored one or more sets of instructions 626 embodying any one or more of the methodologies or functions described herein. A non-transitory storage medium refers to a storage medium other than a carrier wave. The instructions 626 may also reside, completely or at least partially, within the main memory 604 and/or within the processing device 602 during execution thereof by the computing device 600, the main memory 604 and the processing device 602 also constituting computer-readable storage media.

The computer-readable storage medium 624 may also be used to store one or more instructions for dental appliance production and/or a dental appliance generator 650, which may perform one or more of the operations of methods described herein. The computer-readable storage medium 624 may also store a software library containing methods that call a dental appliance generator 650. While the computer-readable storage medium 624 is shown in an example embodiment to be a single medium, the term "non-transitory computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing or encoding a set of instructions for execution by the machine and that cause the machine to perform any one or more of the methodologies of the present disclosure. The term "non-transitory computer-readable storage medium" shall accordingly be taken to include, but not be limited to, solid-state memories, and optical and magnetic media.

Figure 7A:
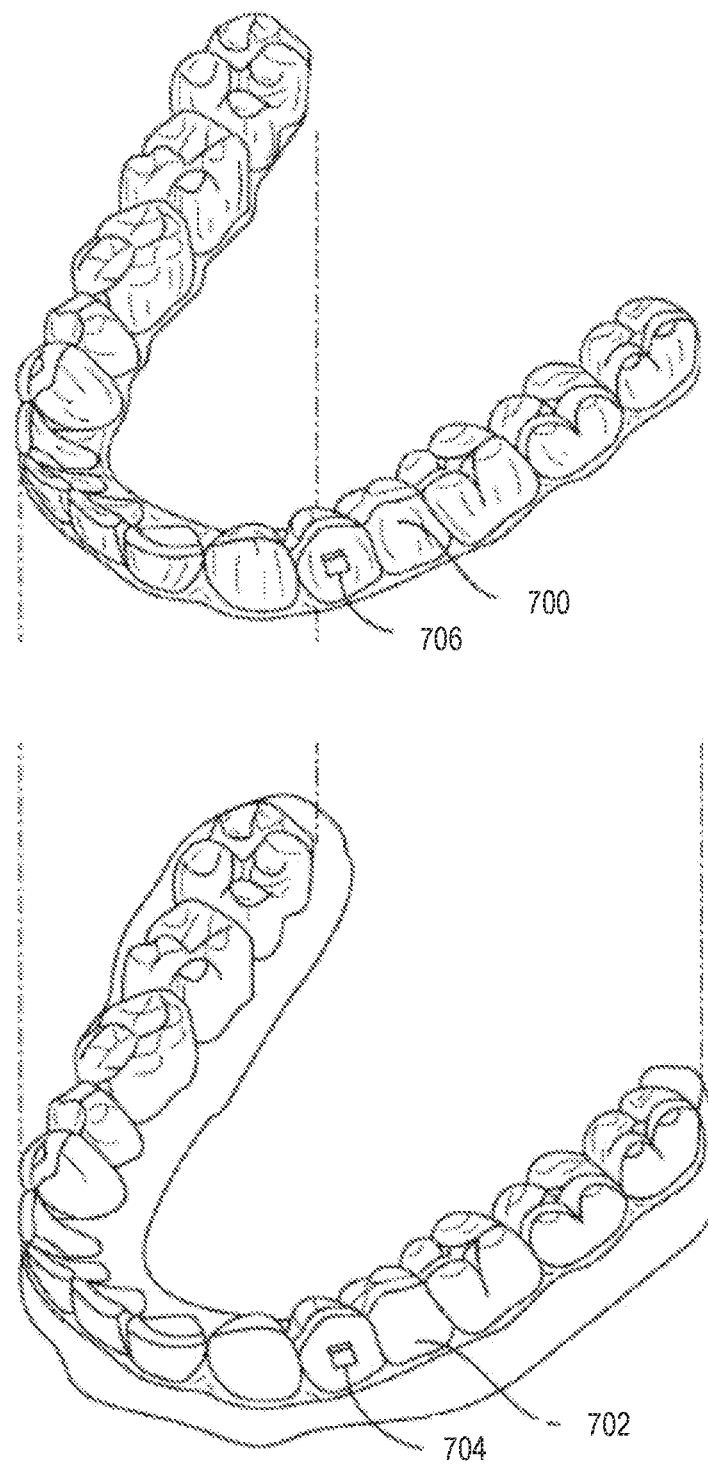
FIG. 7A illustrates a tooth repositioning appliance, according to certain embodiments.

FIG. 7A illustrates an exemplary tooth repositioning appliance or aligner 700 that can be worn by a patient in order to achieve an incremental repositioning of individual teeth 702 in the jaw. The aligner 700 may be trimmed from a thermoformed sheet of plastic 116 (e.g., of FIG. 1A) that was formed by dynamically thermoforming dental appliances, as described herein. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. A "polymeric material," as used herein, may include any material formed from a polymer. A "polymer," as used herein, may refer to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Useful polymers include organic polymers or inorganic polymers that may be in amorphous, semi-amorphous, crystalline or semi-crystalline states. Polymers may include polyolefins, polyesters, polyacrylates, polymethacrylates, polystyrenes, Polypropylenes, polyethylenes, Polyethylene terephthalates, poly lactic acid, polyurethanes, epoxide polymers, polyethers, poly (vinyl chlorides), polysiloxanes, polycarbonates, polyamides, poly acrylonitriles, polybutadienes, poly(cycloolefins), and copolymers. The systems and/or methods provided herein are compatible with a range of plastics and/or polymers. Accordingly, this list is not all inclusive, but rather is exemplary. The plastics can be thermosets or thermoplastics. The plastic may be a thermoplastic.

Examples of materials applicable to the embodiments disclosed herein include, but are not limited to, those materials described in the following patent applications filed by Align Technology: "MULTILAYER DENTAL APPLIANCES AND RELATED METHODS AND SYSTEMS," U.S. Pat. No. 9,655,691 to Li, et al., filed May 14, 2012; "SYSTEMS AND METHODS FOR VARYING ELASTIC MODULUS APPLIANCES," U.S. Pat. No. 6,964,564 to Phan, et al., filed Jul. 26, 2002; "METHODS OF MAKING ORTHODONTIC APPLIANCES," U.S. Pat. No. 7,641,828 to DeSimone, et al., filed Oct. 12, 2004; "TREATMENT OF TEETH BY ALIGNERS," U.S. Pat. No. 8,740,614 to Wen et al., filed Jul. 29, 2009; and any applications claiming benefit therefrom or providing benefit thereto (including publications and issued patents), including any divisional, continuation, or continuation-in-part thereof, the content of which are incorporated by reference herein.

Examples of materials applicable to the embodiments disclosed herein include a hard polymer layer disposed between two soft polymer layers. In some embodiments, the hard inner polymer layer includes a co-polyester and has a polymer layer elastic modulus. In some embodiments, a first soft outer polymer layer and a second soft outer polymer layer each include a thermoplastic polyurethane elastomer and each have a soft polymer elastic modulus less than the hard polymer layer elastic modulus, a flexural modulus of greater than about 35,000 psi, a hardness of about 60 A to about 85 D, and a thickness in a range from 25 microns to 100 microns. In some embodiments, the hard inner polymer layer is disposed between the first soft outer polymer layer and the second soft outer polymer layer so as to reduce degradation of the resilient position force applied to the teeth when the appliance is worn. The hard polymer layer can include a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate or a combination thereof (e.g., a blend of at least two of the listed hard polymeric materials). In some embodiments, the hard polymer layer includes two or more hard polymer layers. The soft outer polymer material may include a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or a combination thereof (e.g., a blend of at least two of the listed soft polymeric materials). The soft polymer layers can be the same material or a different material.

Examples of materials applicable to the embodiments disclosed herein include a middle layer disposed between two layers. The two layers individually include a thermoplastic polymer having a flexural modulus of from about 1,000 MPa to 2,500 MPa and a glass transition temperature and/or melting point of from about 80° C. to 180° C. The middle layer includes a polyurethane elastomer having a flexural modulus of from about 50 MPa to about 500 MPa and one or more of a glass transition temperature and/or melting point of from about 90° C. to about 220° C. The polymeric sheet composition has a combined thickness of the middle layer and the outer layers of from 250 microns to 2000 microns and a flexural modulus of from 500 MPa to 1,500 MPa. In some embodiments, the outer layers include one or more of a co-polyester, a polycarbonate, a polyester polycarbonate blend, a polyurethane, a polyamide, or a polyolefin. The middle layer may have a Shore hardness of from A90 to D55 and a compression set of less than 35% after 22 hours at 25° C. In some embodiments, the outer layers have a lateral restoring force of less than 100 Newtons (N) per square centimeter when displayed by 0.05 mm to 0.1 mm relative to each other. In some embodiments, the interplay peel strength between the outer layers and the middle layer is greater than 50 N per 2.5 cm. In some embodiments, the combined thickness of the outer layers is from 50 microns to 1,000 microns. In some embodiments one or more of the outer layers include a microcrystalline polyamide including from about 50 to 100 mole % of C6 to C14 aliphatic diacid moieties and about 50 to 100 mole % of 4,4'-methylene-bis(cyclohexylamine), having a glass transition of between about 100° C. and 180° C., a heat of fusion of less than 20 J/g and a light transmission of greater than 80%. In some embodiments, one or more of the outer layers includes a co-polyester including: a dicarboxylic acid component including 70 mole % to 100 mole % of terephthalic acid residues; and a diol component including (i) 0 to 90 mole % ethylene glycol, (ii) 5 mole % to 50 mole % of 2,2,4,4-tetramethyl-1,3-cyclobutanediol residues, (iii) 50 mole % to 95 mole % 1,4-cyclohexanedimethanol residues, and (iv) 0 to 1 mole % of a polyol having three or more hydroxyl groups, where the sum of the mole % of diol residues (i), (ii), (iii), and (iv) amounts to 100 mole % and the co-polyester exhibits a glass transition temperature Tg from to 150° C. In some embodiments, the middle layer includes an aromatic polyether polyurethane having a Shore hardness of from A90 to D55 and a compression set of less than 35%, where the interlayer peel strength between the outer layers and the middle layer is greater than 50 N per 2.5 cm. In some embodiments, one or more of the outer layers includes a polyurethane that includes: a di-isocyanate including 80 mole % to 100 mole % of methylene diphenyl diisocyanate residues and/or hydrogenated methylene diphenyl diisocyanate; and a diol component including: (i) 0 to 100 mole % hexamethylene diol; and (ii) 0 to 50 mole % 1,4-cyclohexanedimethanol, where the sum of (i) and (ii) amounts to greater than 90 mole % and the polyurethane has a glass transition temperature Tg from about 85° C. to about 150° C.

Although polymeric aligners are discussed herein, the techniques disclosed may also be applied to aligners having different materials. Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.) and/or shells for non-dental applications. Accordingly, it should be understood that embodiments herein that refer to aligners also apply to other types of shells. For example, the principles, features and methods discussed may be applied to any application or process in which it is useful to perform simultaneous forming multiple shells which are any suitable type of shells that are form fitting devices such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other like athletic/protective devices.

The aligner 700 can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 704 on teeth 702 with corresponding receptacles or apertures 706 in the aligner 700 (e.g., appliance) so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 7B:
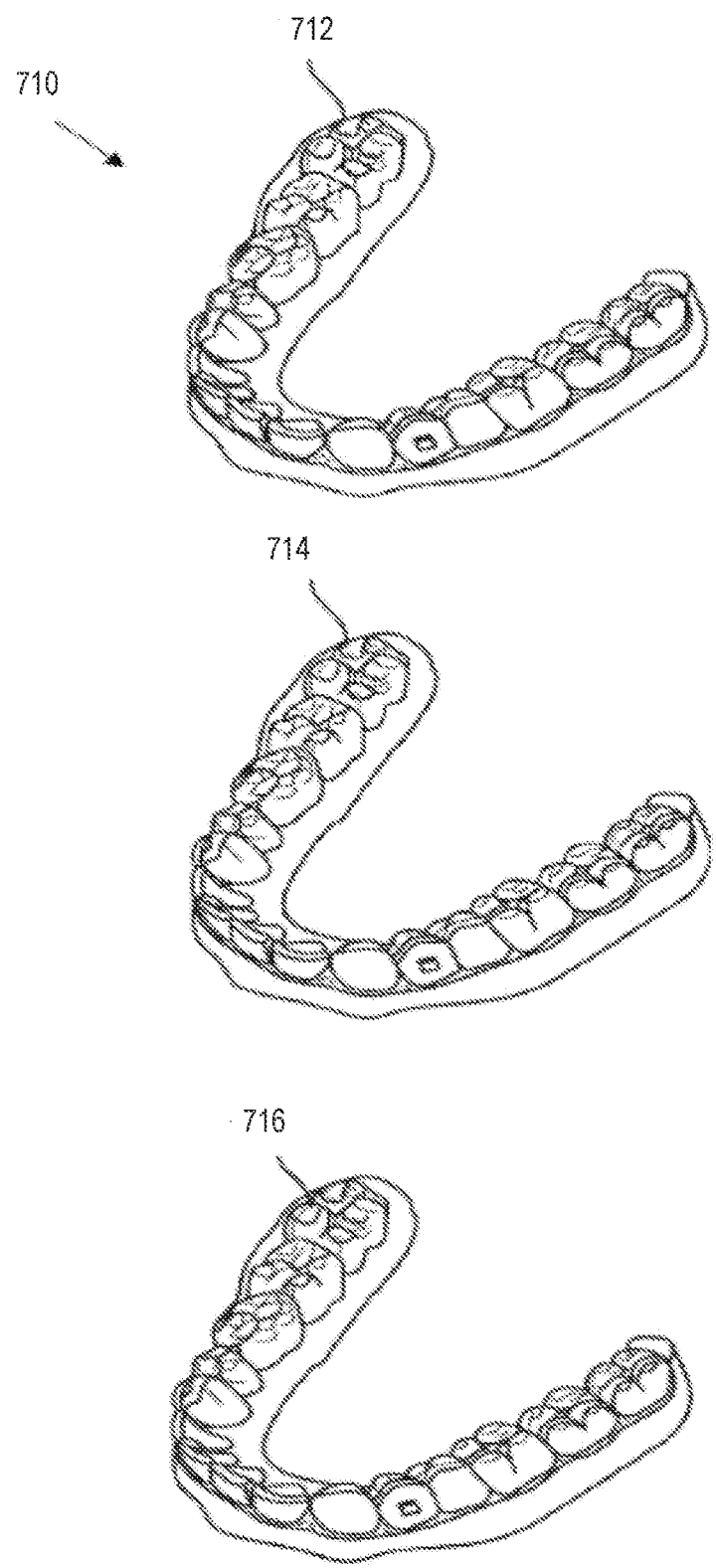
FIG. 7B illustrates a tooth repositioning system, according to certain embodiments.

FIG. 7B illustrates a tooth repositioning system 710 including a plurality of appliances 712, 714, 716. The appliances 712, 714, 716 may be trimmed from a thermoformed sheet of plastic that was formed via dynamically thermoforming dental appliances, as described herein. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 710 can include a first appliance 712 corresponding to an initial tooth arrangement, one or more intermediate appliances 714 corresponding to one or more intermediate arrangements, and a final appliance 716 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

In some embodiments, the appliances 712, 714, 716 (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In an example of indirect fabrication, a mold of a patient's dental arch may be fabricated from a digital model of the dental arch, and a shell may be formed over the mold (e.g., by thermoforming a polymeric sheet over the mold of the dental arch and then trimming the thermoformed polymeric sheet). The fabrication of the mold may be performed by a rapid prototyping machine (e.g., a stereolithography (SLA) 3D printer). The rapid prototyping machine may receive digital models of molds of dental arches and/or digital models of the appliances 712, 714, 716 after the digital models of the appliances 712, 714, 716 have been processed by processing logic of a computing device, such as the computing device in FIG. 6. The processing logic may include hardware (e.g., circuitry, dedicated logic, programmable logic, microcode, etc.), software (e.g., instructions executed by a processing device), firmware, or a combination thereof. For example, one or more operations may be performed by a processing device executing a dental appliance generator 650.

To manufacture the molds, a shape of a dental arch for a patient at a treatment stage is determined based on a treatment plan. In the example of orthodontics, the treatment plan may be generated based on an intraoral scan of a dental arch to be modeled. The intraoral scan of the patient's dental arch may be performed to generate a three dimensional (3D) virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

Accordingly, multiple different virtual 3D models (digital designs) of a dental arch may be generated for a single patient. A first virtual 3D model may be a unique model of a patient's dental arch and/or teeth as they presently exist, and a final virtual 3D model may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate a unique customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specified geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In some instances, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermopolymeric polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermopolymeric elastomer (TPE), a thermopolymeric vulcanizate (TPV) elastomer, a polyurethane elastomer, a block copolymer elastomer, a polyolefin blend elastomer, a thermopolymeric co-polyester elastomer, a thermopolymeric polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Appliances may be formed from each mold and when applied to the teeth of the patient, may provide forces to move the patient's teeth as dictated by the treatment plan. The shape of each appliance is unique and customized for a particular patient and a particular treatment stage. In an example, the appliances 712, 714, 716 can be pressure formed or thermoformed over the molds. Each mold may be used to fabricate an appliance that will apply forces to the patient's teeth at a particular stage of the orthodontic treatment. The appliances 712, 714, 716 each have teeth-receiving cavities that receive and resiliently reposition the teeth in accordance with a particular treatment stage.

In one embodiment, a sheet of material is pressure formed or thermoformed over the mold. The sheet may be, for example, a sheet of polymeric (e.g., an elastic thermopolymeric, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell. Forces may be applied to lift the appliance from the mold. In some instances, a breakage, warpage, or deformation may result from the removal forces. Accordingly, embodiments disclosed herein may determine where the probable point or points of damage may occur in a digital design of the appliance prior to manufacturing and may perform a corrective action.

Additional information may be added to the appliance. The additional information may be any information that pertains to the appliance. Examples of such additional information includes a part number identifier, patient name, a patient identifier, a case number, a sequence identifier (e.g., indicating which appliance a particular liner is in a treatment sequence), a date of manufacture, a clinician name, a logo and so forth. For example, after determining there is a probable point of damage in a digital design of an appliance, an indicator may be inserted into the digital design of the appliance. The indicator may represent a recommended place to begin removing the polymeric appliance to prevent the point of damage from manifesting during removal in some embodiments.

In some embodiments, a library of removal methods/patterns may be established and this library may be referenced when simulating the removal of the aligner in the numerical simulation. Different patients or production technicians may tend to remove aligners differently, and there might be a few typical patterns. For example: 1) some patients lift from the lingual side of posteriors first (first left and then right, or vice versa), and then go around the arch from left/right posterior section to the right/left posterior section; 2) similar to #1, but some other patients lift only one side of the posterior and then go around the arch; 3) similar to #1, but some patients lift from the buccal side rather than the lingual side of the posterior; 4) some patients lift from the anterior incisors and pull hard to remove the aligner; 5) some other patients grab both lingual and buccal side of a posterior location and pull out both sides at the same time; 6) some other patients grab a random tooth in the middle. The library can also include a removal guideline provided by the manufacturer of the aligner. Removal approach may also depend on presence or absence of attachments on teeth as some pf the above method may result in more comfortable way of removal. Based on the attachment situation on each tooth, it can be determined how each patient would probably remove an aligner and adapt that removal procedure for that patient in that specific simulation.

After an appliance is formed over a mold for a treatment stage, the appliance is removed from the mold (e.g., automated removal of the appliance from the mold), and the appliance is subsequently trimmed along a cutline (also referred to as a trim line). The processing logic may determine a cutline for the appliance. The determination of the cutline(s) may be made based on the virtual 3D model of the dental arch at a particular treatment stage, based on a virtual 3D model of the appliance to be formed over the dental arch, or a combination of a virtual 3D model of the dental arch and a virtual 3D model of the appliance. The location and shape of the cutline can be important to the functionality of the appliance (e.g., an ability of the appliance to apply desired forces to a patient's teeth) as well as the fit and comfort of the appliance. For shells such as orthodontic appliances, orthodontic retainers and orthodontic splints, the trimming of the shell may play a role in the efficacy of the shell for its intended purpose (e.g., aligning, retaining or positioning one or more teeth of a patient) as well as the fit of the shell on a patient's dental arch. For example, if too much of the shell is trimmed, then the shell may lose rigidity and an ability of the shell to exert force on a patient's teeth may be compromised. When too much of the shell is trimmed, the shell may become weaker at that location and may be a point of damage when a patient removes the shell from their teeth or when the shell is removed from the mold. In some embodiments, the cut line may be modified in the digital design of the appliance as one of the corrective actions taken when a probable point of damage is determined to exist in the digital design of the appliance.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the appliance at the gingival line, below the gingival line, or above the gingival line. In some embodiments, the cutline may be a gingival cutline that represents an interface between an appliance and a patient's gingiva. In such embodiments, the cutline controls a distance between an edge of the appliance and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

FIG. 7C illustrates a method 750 of orthodontic treatment using a plurality of appliances, in accordance with embodiments. One or more of the plurality of appliances may be generated from dynamically thermoforming dental appliances (e.g., two or more of the plurality of appliances may be simultaneously thermoformed using a dental appliance manufacturing system, as described herein). The method 750 can be practiced using any of the appliances or appliance sets described herein. In block 760, a first orthodontic appliance is applied to a patient's teeth in order to reposition the teeth from a first tooth arrangement to a second tooth arrangement. In block 770, a second orthodontic appliance is applied to the patient's teeth in order to reposition the teeth from the second tooth arrangement to a third tooth arrangement. The method 750 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

FIG. 8 illustrates a method 800 for designing an orthodontic appliance to be produced by direct fabrication, in accordance with embodiments. The method 800 can be applied to any embodiment of the orthodontic appliances described herein (e.g., dental appliances dynamically thermoformed as described herein). Some or all of the blocks of the method 800 can be performed by any suitable data processing system or device, e.g., one or more processors configured with suitable instructions.

In block 810, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 820, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 830, appliance design for an orthodontic appliance configured to produce the force system is determined. Determination of the orthodontic appliance, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the Auto-CAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systemes of Waltham, MA.

Optionally, one or more orthodontic appliances can be selected for testing or force modeling. As noted above, a desired tooth movement, as well as a force system required or desired for eliciting the desired tooth movement, can be identified. Using the simulation environment, a candidate orthodontic appliance can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 840, instructions for fabrication of the orthodontic appliance incorporating the appliance design are generated. The instructions can be configured to control a fabrication system or device in order to produce the orthodontic appliance with the specified orthodontic appliance. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming. In some embodiments, the instructions for fabrication of the orthodontic appliance include instructions for simultaneous thermoforming of multiple orthodontic appliances (e.g., simultaneous thermoforming of multiple aligners using an aligner manufacturing system, as described herein).

Method 800 may comprise additional blocks: 1) The upper arch and palate of the patient is scanned intraorally to generate three dimensional data of the palate and upper arch; and/or 2) The three dimensional shape profile of the appliance is determined to provide a gap and teeth engagement structures as described herein.

Although the above blocks show a method 800 of designing an orthodontic appliance in accordance with some embodiments, a person of ordinary skill in the art will recognize some variations based on the teaching described herein. Some of the blocks may comprise sub-blocks. Some of the blocks may be repeated as often as desired. One or more blocks of the method 800 may be performed with any suitable fabrication system or device, such as the embodiments described herein. Some of the blocks may be optional, and the order of the blocks can be varied as desired.

Figure 9:
FIG. 9 illustrates a method for digitally planning an orthodontic treatment, according to certain embodiments.

FIG. 9 illustrates a method 900 for digitally planning an orthodontic treatment and/or design or fabrication of an appliance, in accordance with embodiments. The dental appliance may be generated by dynamical thermoforming, as described herein. The method 900 can be applied to any of the treatment procedures described herein and can be performed by any suitable data processing system.

In block 910, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 920, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 930, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired. The fabrication of the appliance may include simultaneous thermoforming of multiple appliances (e.g., simultaneous thermoforming of multiple aligners via dental appliance manufacturing system 100, as described herein).

In some instances, staging of various arrangements or treatment stages may not be necessary for design and/or fabrication of an appliance. As illustrated by the dashed line in FIG. 9, design and/or fabrication of an orthodontic appliance, and perhaps a particular orthodontic treatment, may include use of a representation of the patient's teeth (e.g., receive a digital representation of the patient's teeth at block 910), followed by design and/or fabrication of an orthodontic appliance based on a representation of the patient's teeth in the arrangement represented by the received representation.

Figure 10:
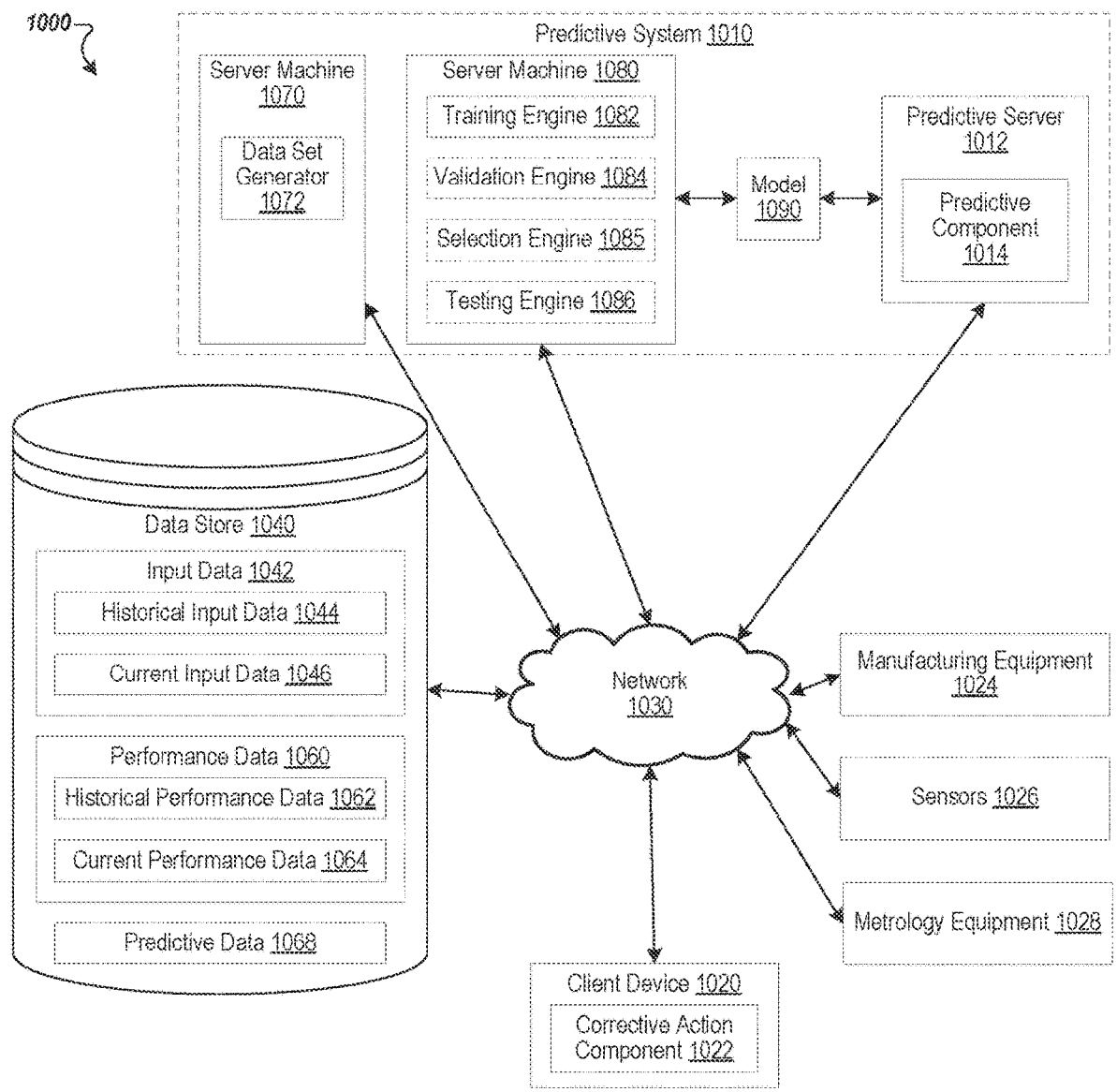
FIG. 10 illustrates a block diagram illustrating an exemplary system architecture, according to certain embodiments.

FIG. 10 is a block diagram illustrating an exemplary system 1000 (exemplary system architecture), according to certain embodiments. The system 1000 includes a client device 1020, manufacturing equipment 1024, sensors 1026, metrology equipment 1028, a predictive server 1012, and a data store 1040. In some embodiments, the predictive server 1012 is part of a predictive system 1010. In some embodiments, the predictive system 1010 further includes server machines 1070 and 1080.

In some embodiments, one or more of the client device 1020, manufacturing equipment 1024, sensors 1026, metrology equipment 1028, predictive server 1012, data store 1040, server machine 1070, and/or server machine 1080 are coupled to each other via a network 1030 for generating predictive data 1068 to perform corrective actions. In some embodiments, network 1030 is a public network that provides client device 1020 with access to the predictive server 1012, data store 1040, and other publically available computing devices. In some embodiments, network 1030 is a private network that provides client device 1020 access to manufacturing equipment 1024, sensors 1026, metrology equipment 1028, data store 1040, and other privately available computing devices. In some embodiments, network 1030 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

In some embodiments, manufacturing equipment 1024 includes one or more of dental appliance manufacturing system 100 of one or more of FIGS. 1A-C, dental appliance trimming equipment, mold generation equipment, sheet of plastic forming (e.g., cutting) equipment, and/or the like. In some embodiments, sensors 1026 include one or more sensors (e.g., sensors 136 and/or sensors 146 of FIG. 1A) associated with the manufacturing equipment 1024. In some embodiments, metrology equipment 1028 includes imaging devices (e.g., imaging device 152 of FIG. 1A) used to generate image data associated with one or more of molds 154, sheets of plastic 116, dental appliances, pallets 112 (e.g., responsive to adjusting in size), masks 134 (e.g., responsive to adjusting in size), adjusted heaters 132 (e.g., responsive to adjusting in location), adjusted pressure device 142 (e.g., responsive to adjusting thermoforming cup in size), and/or the like.

In some embodiments, the client device 1020 includes a computing device such as Personal Computers (PCs), laptops, mobile phones, smart phones, tablet computers, netbook computers, etc. In some embodiments, the client device 1020 includes a corrective action component 1022. Client device 1020 includes an operating system that allows users to one or more of generate, view, or edit data (e.g., indication associated with manufacturing equipment 1024, corrective actions associated with manufacturing equipment 1024, etc.).

In some embodiments, corrective action component 1022 receives user input (e.g., via a Graphical User Interface (GUI) displayed via the client device 1020) of an indication associated with manufacturing equipment 1024. In some embodiments, the corrective action component 1022 transmits the indication to the predictive system 1010, receives output (e.g., predictive data 1068) from the predictive system 1010, determines a corrective action associated with the manufacturing equipment 1024 based on the output, and causes the corrective action to be implemented. In some embodiments, the corrective action component 1022 obtains input data 1042 (e.g., current input data 1046) associated with the manufacturing equipment 1024 (e.g., from data store 1040, etc.) and provides the input data 1042 (e.g., current input data 1046) associated with the manufacturing equipment 1024 to the predictive system 1010. In some embodiments, the corrective action component 1022 stores input data 1042 in the data store 1040 and the predictive server 1012 retrieves the input data 1042 from the data store 1040. In some embodiments, the predictive server 1012 stores output (e.g., predictive data 1068) of the trained machine learning model 1090 in the data store 1040 and the client device 1020 retrieves the output from the data store 1040. In some embodiments, the corrective action component 1022 receives an indication of a corrective action from the predictive system 1010 and causes the corrective action to be implemented.

In some embodiments, the predictive server 1012, server machine 1070, and server machine 1080 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 1012 includes a predictive component 1014. In some embodiments, the predictive component 1014 receives input data 1042 (e.g., receive from the client device 1020, retrieve from the data store 1040) and generates output (e.g., predictive data 1068) for performing corrective action based on the input data 1042. In some embodiments, the predictive component 1014 uses one or more trained machine learning models 1090 to determine the output for performing the corrective action based on the input data 1042. In some embodiments, trained machine learning model 1090 is trained using historical input data 1044 and historical performance data 1062.

In some embodiments, the predictive system 1010 (e.g., predictive server 1012, predictive component 1014) generates predictive data 1068 using supervised machine learning (e.g., supervised data set, etc.). In some embodiments, the predictive system 1010 generates predictive data 1068 using semi-supervised learning (e.g., semi-supervised data set, performance data 1060 is a predictive percentage, etc.). In some embodiments, the predictive system 1010 generates predictive data 1068 using unsupervised machine learning (e.g., unsupervised data set, clustering, clustering based on performance data 1060, etc.).

In some embodiments, the sensors 1026 provide input data 1042 (e.g., sensor values, historical sensor values, current sensor values) associated with manufacturing equipment 1024. In some embodiments, the sensors 1026 include one or more of a pressure sensor, a temperature sensor, a flow rate sensor, an imaging device, and/or the like. In some embodiments, the input data 1042 is used for equipment health and/or product health (e.g., product quality, dental appliance quality, mold quality). In some embodiments, the input data 1042 is received over a period of time.

In some embodiments, the input data 1042 (e.g., historical input data 1044, current input data 1046, etc.) is processed (e.g., by the client device 1020 and/or by the predictive server 1012). In some embodiments, processing of the input data 1042 includes generating features. In some embodiments, the features are a pattern in the input data 1042 (e.g., slope, width, height, peak, etc.) or a combination of values from the input data 1042 (e.g., power derived from voltage and current, etc.). In some embodiments, the input data 1042 includes features and the features are used by the predictive component 1014 for obtaining predictive data 1068 for performance of a corrective action.

In some embodiments, the metrology equipment 1028 is used to determine metrology data (e.g., inspection data, performance data) corresponding to products (e.g., dental appliances, molds, etc.) of the manufacturing equipment 1024. In some examples, after the manufacturing equipment 1024 generates molds, sheets of plastic, and/or dental appliances and the metrology equipment 1028 is used to inspect one or more portions of the molds, sheets of plastic, and/or dental appliances. In some embodiments, the metrology equipment 1028 includes an imaging device.

In some embodiments, the data store 1040 is a memory (e.g., random access memory), a drive (e.g., a hard drive, a flash drive), a database system, or another type of component or device capable of storing data. In some embodiments, data store 1040 includes multiple storage components (e.g., multiple drives or multiple databases) that span multiple computing devices (e.g., multiple server computers). In some embodiments, the data store 1040 stores one or more of input data 1042, performance data 1060, and/or predictive data 1068.

Input data 1042 includes historical input data 1044 and current input data 1046. In some embodiments, the input data 1042 include one or more of a pressure value, a pressure range, dimensions of molds, dimensions of aligners, image data, digital models of dental arches, heat capacity data, time data, ambient temperature data, actual temperature data, temperature values, temperature range, comparison parameters for comparing inspection data with threshold data, threshold data, cooling rate value, cooling rate range, and/or the like.

Performance data 1060 includes historical performance data 1062 and current performance data 1064. In some embodiments, the performance data 1060 is indicative of heating element setpoints and/or heating performance data (e.g., whether the heating is substantially even across the sheet of plastic, whether the total heating time meets a threshold amount of time, and/or the like). In some embodiments, at least a portion of the performance data 1060 is associated with a quality of products (e.g., molds, dental appliances, sheets of plastic) produced by the manufacturing equipment 1024 (e.g., whether the products meet threshold dimensions). In some embodiments, at least a portion of the performance data 1060 is based on metrology data from the metrology equipment 1028 (e.g., historical performance data 1062 indicates correctly produced products, property data of products, yield, etc.). In some embodiments, the performance data 1060 includes an indication of an absolute value (e.g., dimension values of the products) or a relative value (e.g., dimension values of the products miss the threshold dimensions by 5%). In some embodiments, the performance data 1060 is indicative of meeting a threshold amount of error (e.g., at least 5% error in production, at least 5% error in flow, at least 5% error in deformation, specification limit).

In some embodiments, the client device 1020 provides performance data 1060 (e.g., product data, equipment data). In some examples, the client device 1020 provides (e.g., based on user input) performance data 1060 that indicates an abnormality in products (e.g., defective products) and/or manufacturing equipment 1024 (e.g., component failure, maintenance, energy usage, variance of a component compared to similar components, etc.). In some embodiments, the performance data 1060 includes an amount of products that have been produced that were normal or abnormal (e.g., 98% normal products). In some embodiments, the performance data 1060 indicates an amount of products that are being produced that are predicted as normal or abnormal. In some embodiments, the performance data 1060 includes one or more of yield a previous batch of products, average yield, predicted yield, predicted amount of defective or non-defective product, or the like. In some examples, responsive to yield on a first batch of product being 98% (e.g., 98% of the products were normal and 2% were abnormal), the client device 1020 provides performance data 1060 indicating that the upcoming batch of product is to have a yield of 98%.

Historical data includes one or more of historical input data 1044 and/or historical performance data 1062 (e.g., at least a portion for training the machine learning model 1090). Current data includes one or more of current input data 1046 and/or current performance data 1064 (e.g., at least a portion to be input into the trained machine learning model 1090 subsequent to training the model 1090 using the historical data) for which predictive data 1068 is generated (e.g., for performing corrective actions). In some embodiments, the current data is used for retaining the trained machine learning model 1090.

In some embodiments, the predictive data 1068 is indicative of predictive performance data of manufacturing equipment 1024 and/or products (e.g., molds, dental appliances, sheets of plastic). In some examples, the predictive data 1068 is indicative of predicted error in heating distribution and/or the like. In some embodiments, the predictive data 1068 is indicative of whether a predicted error value is greater than an error threshold value. In some embodiments, the predictive data 1068 is indicative of an absolute value or relative value of error. In some embodiments, the predictive data 1068 is associated with one or more of predicted property data (e.g., of products to be produced or that have been produced using current input data 1046), predicted metrology data (e.g., virtual metrology data of the products to be produced or that have been produced using current input data 1046), an indication of abnormalities (e.g., abnormal products, abnormal components, abnormal manufacturing equipment 1024, abnormal energy usage, etc.), one or more causes of abnormalities or errors, and/or indication of an end of life of a component of manufacturing equipment 1024.

In some embodiments, a corrective action is performed based on the predictive data 1068. In some embodiments, a corrective action is associated with one or more of Computational Process Control (CPC), Statistical Process Control (SPC) (e.g., SPC to compare to a graph of 3-sigma, etc.), Advanced Process Control (APC), model-based process control, preventative operative maintenance, design optimization, updating of manufacturing parameters, feedback control, machine learning modification, or the like.

In some embodiments, the corrective action includes updating input data (e.g., heating setpoints, digital models, etc.) associated with production of products (e.g., molds, dental appliances, sheets of plastic). In some embodiments, the corrective action includes providing an alert (e.g., an alarm to not use the mold, dental appliance, or sheet of plastic if the predictive data 1068 indicates a predicted abnormality). In some embodiments, the corrective action includes providing feedback control (e.g., modifying input data responsive to the predictive data 1068 indicating a predicted abnormality). In some embodiments, the corrective action includes providing machine learning (e.g., causing modification of one or more input data of production of products based on the predictive data 1068). In some embodiments, the corrective action includes interrupting operation of the manufacturing equipment 1024.

In some embodiments, manufacturing parameters are suboptimal (e.g., incorrectly calibrated, etc.) for producing product which has costly results of increased resource (e.g., energy, material, etc.) consumption, increased amount of time to produce the products, increased component failure, increased amounts of defective products, etc. By inputting the input data 1042 into the trained machine learning model 1090, receiving an output of predictive data 1068, and performing (e.g., based on the predictive data 1068) a corrective action of updating manufacturing parameters, system 100 has the technical advantage of using optimal manufacturing parameters to avoid costly results of suboptimal manufacturing parameters.

In some embodiments, predictive system 1010 further includes server machine 1070 and server machine 1080. Server machine 1070 includes a data set generator 1072 that is capable of generating data sets (e.g., a set of data inputs and a set of target outputs) to train, validate, and/or test a machine learning model(s) 1090. Some operations of data set generator 1072 are described in detail below with respect to FIGS. 11 and 13A. In some embodiments, the data set generator 1072 partitions the historical data (e.g., historical input data 1044 and historical performance data 1062) into a training set (e.g., sixty percent of the historical data), a validating set (e.g., twenty percent of the historical data), and a testing set (e.g., twenty percent of the historical data). In some embodiments, the predictive system 1010 (e.g., via predictive component 1014) generates multiple sets of features. In some examples a first set of features corresponds to a first set of types of input data 1042 (e.g., from a first set of sensors, first combination of values from first set of sensors, first patterns in the values from the first set of sensors) that correspond to each of the data sets (e.g., training set, validation set, and testing set) and a second set of features correspond to a second set of types of input data 1042 (e.g., from a second set of sensors different from the first set of sensors, second combination of values different from the first combination, second patterns different from the first patterns) that correspond to each of the data sets.

Server machine 1080 includes a training engine 1082, a validation engine 1084, selection engine 1085, and/or a testing engine 1086. In some embodiments, an engine (e.g., training engine 1082, a validation engine 1084, selection engine 1085, and a testing engine 1086) refers to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 1082 is capable of training a machine learning model 1090 using one or more sets of features associated with the training set from data set generator 1072. In some embodiments, the training engine 1082 generates multiple trained machine learning models 1090, where each trained machine learning model 1090 corresponds to a distinct set of features of the training set (e.g., input data 1042 from a distinct set of sensors). In some examples, a first trained machine learning model was trained using all features (e.g., X1-X5), a second trained machine learning model was trained using a first subset of the features (e.g., X1, X2, X4), and a third trained machine learning model was trained using a second subset of the features (e.g., X1, X3, X4, and X5) that partially overlaps the first subset of features.

The validation engine 1084 is capable of validating a trained machine learning model 1090 using a corresponding set of features of the validation set from data set generator 1072. For example, a first trained machine learning model 1090 that was trained using a first set of features of the training set is validated using the first set of features of the validation set. The validation engine 1084 determines an accuracy of each of the trained machine learning models 1090 based on the corresponding sets of features of the validation set. The validation engine 1084 discards trained machine learning models 1090 that have an accuracy that does not meet a threshold accuracy. In some embodiments, the selection engine 1085 is capable of selecting one or more trained machine learning models 1090 that have an accuracy that meets a threshold accuracy. In some embodiments, the selection engine 1085 is capable of selecting the trained machine learning model 1090 that has the highest accuracy of the trained machine learning models 1090.

The testing engine 1086 is capable of testing a trained machine learning model 1090 using a corresponding set of features of a testing set from data set generator 1072. For example, a first trained machine learning model 1090 that was trained using a first set of features of the training set is tested using the first set of features of the testing set. The testing engine 1086 determines a trained machine learning model 1090 that has the highest accuracy of all of the trained machine learning models based on the testing sets.

In some embodiments, the machine learning model 1090 refers to the model artifact that is created by the training engine 1082 using a training set that includes data inputs and corresponding target outputs (correct answers for respective training inputs). Patterns in the data sets can be found that map the data input to the target output (the correct answer), and the machine learning model 1090 is provided mappings that captures these patterns. In some embodiments, the machine learning model 1090 uses one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, neural network (e.g., artificial neural network), etc. In some embodiments, the machine learning model 1090 is a multi-variable analysis (MVA) model.

Predictive component 1014 provides current input data 1046 to the trained machine learning model 1090 and runs the trained machine learning model 1090 on the input to obtain one or more outputs. The predictive component 1014 is capable of determining (e.g., extracting) predictive data 1068 from the output of the trained machine learning model 1090 and determines (e.g., extract) confidence data from the output that indicates a level of confidence that the predictive data 1068 corresponds to current performance data 1064 (e.g., model 1090) of the manufacturing equipment 1024 at the current input data 1046. In some embodiments, the predictive component 1014 or corrective action component 1022 use the confidence data to decide whether to cause a corrective action associated with the manufacturing equipment 1024 based on the predictive data 1068.

The confidence data includes or indicates a level of confidence that the predictive data 1068 corresponds to current performance data 1064 at the current input data 1046. In one example, the level of confidence is a real number between 0 and 1 inclusive, where 0 indicates no confidence that the predictive data 1068 corresponds to current performance data 1064 associated with the current input data 1046 and 1 indicates absolute confidence that the predictive data 1068 corresponds to current performance data 1064 associated with the current input data 1046. In some embodiments, the system 100 uses predictive system 1010 to determine predictive data 1068 instead of generating products and using the metrology equipment 1028 to determine current performance data 1064. In some embodiments, responsive to the confidence data indicating a level of confidence that is below a threshold level, the system 100 causes generating products and causes the metrology equipment 1028 to generate the current performance data 1064. Responsive to the confidence data indicating a level of confidence below a threshold level for a predetermined number of instances (e.g., percentage of instances, frequency of instances, total number of instances, etc.) the predictive component 1014 causes the trained machine learning model 1090 to be re-trained (e.g., based on the current input data 1046 and current performance data 1064, etc.).

Figure 11:
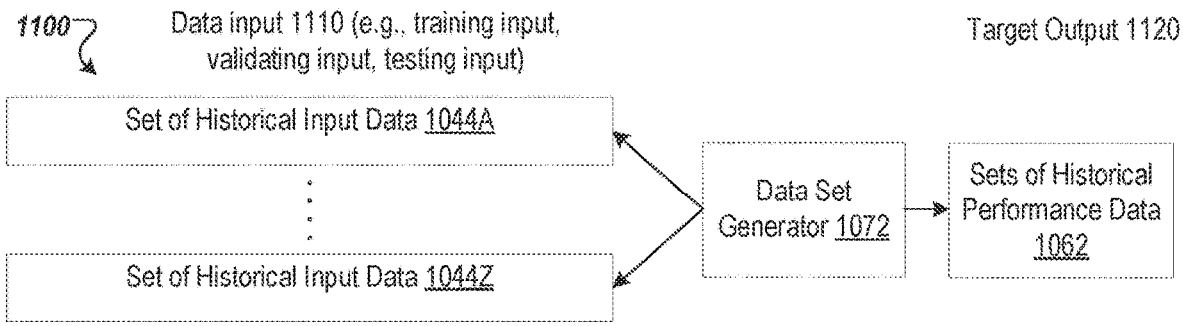
FIG. 11 illustrates a data set generator to create data sets for a machine learning model, according to certain embodiments.

For purpose of illustration, rather than limitation, aspects of the disclosure describe the training of one or more machine learning models 1090 using historical data (e.g., historical input data 1044 and historical performance data 1062) and inputting current data (e.g., current input data 1046) into the one or more trained machine learning models 1090 to determine predictive data 1068 (e.g., current performance data 1064). In other implementations, a heuristic model or rule-based model is used to determine predictive data 1068 (e.g., without using a trained machine learning model). Predictive component 1014 monitors historical input data 1044 and historical performance data 1062. In some embodiments, any of the information described with respect to data inputs 1110 of FIG. 11 are monitored or otherwise used in the heuristic or rule-based model.

In some embodiments, the functions of client device 1020, predictive server 1012, server machine 1070, and server machine 1080 are be provided by a fewer number of machines. For example, in some embodiments, server machines 1070 and 1080 are integrated into a single machine, while in some other embodiments, server machine 1070, server machine 1080, and predictive server 1012 are integrated into a single machine. In some embodiments, client device 1020 and predictive server 1012 are integrated into a single machine.

In general, functions described in one embodiment as being performed by client device 1020, predictive server 1012, server machine 1070, and server machine 1080 can also be performed on predictive server 1012 in other embodiments, if appropriate. In addition, the functionality attributed to a particular component can be performed by different or multiple components operating together. For example, in some embodiments, the predictive server 1012 determines the corrective action based on the predictive data 1068. In another example, client device 1020 determines the predictive data 1068 based on output from the trained machine learning model.

In addition, the functions of a particular component can be performed by different or multiple components operating together. In some embodiments, one or more of the predictive server 1012, server machine 1070, or server machine 1080 are accessed as a service provided to other systems or devices through appropriate application programming interfaces (API).

In some embodiments, a "user" is represented as a single individual. However, other embodiments of the disclosure encompass a "user" being an entity controlled by a plurality of users and/or an automated source. In some examples, a set of individual users federated as a group of administrators is considered a "user."

Although embodiments of the disclosure are discussed in terms of generating predictive data 1068 to perform a corrective action in manufacturing facilities (e.g., dental appliance manufacturing facilities), in some embodiments, the disclosure can also be generally applied to verifying correct parameters of producing components. Embodiments can be generally applied to verifying parameters (e.g., design parameters, production parameters, etc.) based on different types of data.

FIG. 11 illustrates a data set generator 1072 (e.g., data set generator 1072 of FIG. 10) to create data sets for a machine learning model (e.g., model 1090 of FIG. 10), according to certain embodiments. In some embodiments, data set generator 1072 is part of server machine 1070 of FIG. 10.

Data set generator 1072 (e.g., data set generator 1072 of FIG. 10) creates data sets for a machine learning model (e.g., model 1090 of FIG. 10). Data set generator 1072 creates data sets using historical input data 1044 and historical performance data 1062. System 1100 of FIG. 11 shows data set generator 1072, data inputs 1110, and target output 1120.

In some embodiments, data set generator 1072 generates a data set (e.g., training set, validating set, testing set) that includes one or more data inputs 1110 (e.g., training input, validating input, testing input) and one or more target outputs 1120 that correspond to the data inputs 1110. The data set also includes mapping data that maps the data inputs 1110 to the target outputs 1120. Data inputs 1110 are also referred to as "features," "attributes," or information." In some embodiments, data set generator 1072 provides the data set to the training engine 1082, validating engine 1084, or testing engine 1086, where the data set is used to train, validate, or test the machine learning model 1090. Some embodiments of generating a training set are further described with respect to FIG. 13A.

In some embodiments, data set generator 1072 generates the data input 1110 and target output 1120. In some embodiments, data inputs 1110 include one or more sets of historical input data 1044. In some embodiments, historical input data 1044 include one or more of input data from one or more types of sensors, combination of input data from one or more types of sensors, patterns from input data from one or more types of sensors, dimensions products, and/or the like.

In some embodiments, data set generator 1072 generates a first data input corresponding to a first set of historical input data 1044A to train, validate, or test a first machine learning model and the data set generator 1072 generates a second data input corresponding to a second set of historical input data 1044B to train, validate, or test a second machine learning model.

In some embodiments, the data set generator 1072 discretizes (e.g., segments) one or more of the data input 1110 or the target output 1120 (e.g., to use in classification algorithms for regression problems). Discretization (e.g., segmentation via a sliding window) of the data input 1110 or target output 1120 transforms continuous values of variables into discrete values. In some embodiments, the discrete values for the data input 1110 indicate discrete historical input data 1044 to obtain a target output 1120 (e.g., discrete historical performance data 1062).

Data inputs 1110 and target outputs 1120 to train, validate, or test a machine learning model include information for a particular facility (e.g., for a particular dental appliance manufacturing facility). In some examples, historical input data 1044 and historical performance data 1062 are for the same facility.

In some embodiments, the information used to train the machine learning model is from specific types of manufacturing equipment 1024 of the facility having specific characteristics and allow the trained machine learning model to determine outcomes for a specific group of manufacturing equipment 1024 based on input for current input data 1046 associated with one or more components sharing characteristics of the specific group. In some embodiments, the information used to train the machine learning model is for components from two or more facilities (e.g., dental appliance manufacturing systems) and allows the trained machine learning model to determine outcomes for components based on input from one facility.

In some embodiments, subsequent to generating a data set and training, validating, or testing a machine learning model 1090 using the data set, the machine learning model 1090 is further trained, validated, or tested (e.g., current performance data 1064 of FIG. 10) or adjusted (e.g., adjusting weights associated with input data of the machine learning model 1090, such as connection weights in a neural network).

Figure 12:
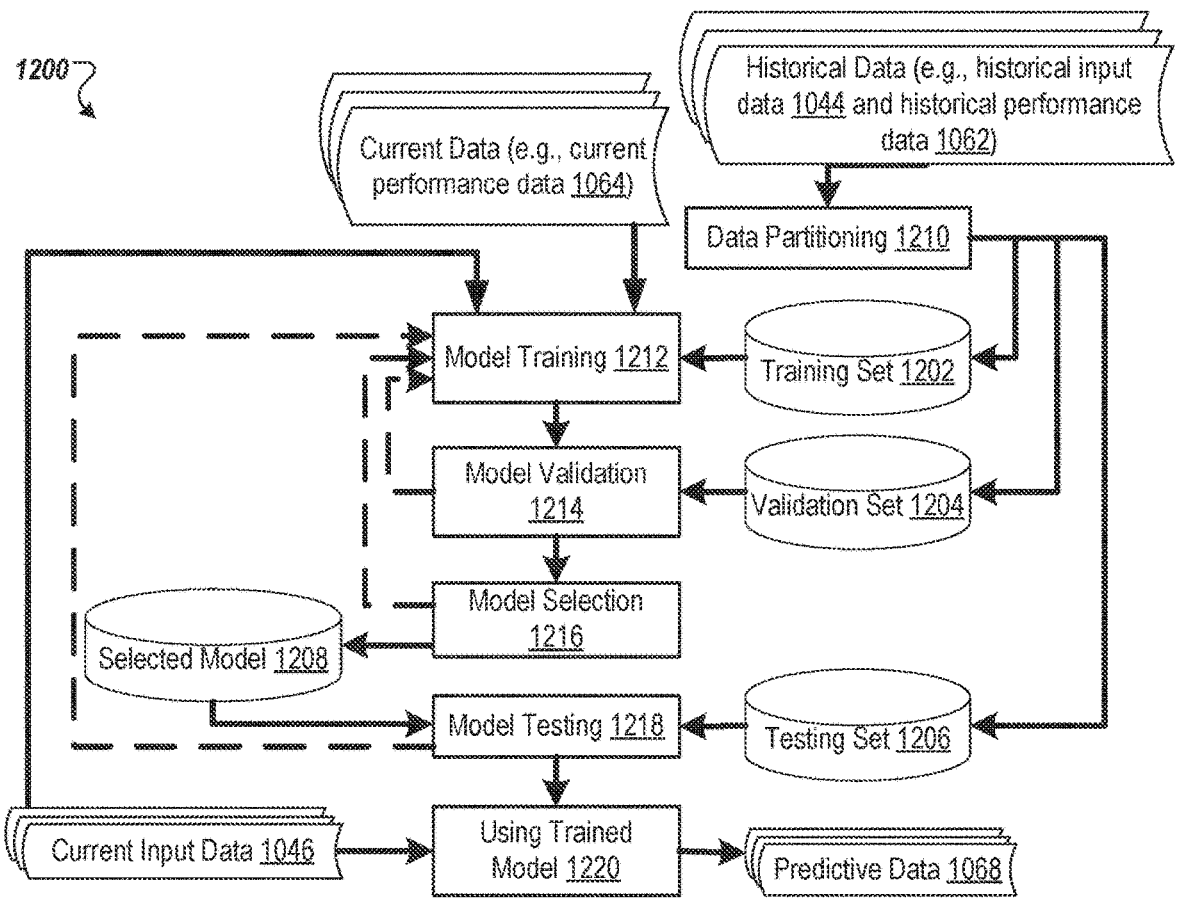
FIG. 12 illustrates a block diagram illustrating determining predictive data, according to certain embodiments.

FIG. 12 is a block diagram illustrating a system 1200 for generating predictive data 1068, according to certain embodiments. The system 1200 is used to determine predictive data 1068 to cause a corrective action (e.g., associated with manufacturing equipment 1024, associated with production of products).

At block 1210, the system 1200 (e.g., predictive system 1010 of FIG. 10) performs data partitioning (e.g., via data set generator 1072 of server machine 1070 of FIG. 10) of the historical data (e.g., historical input data 1044 and historical performance data 1062 for model 1090 of FIG. 10) to generate the training set 1202, validation set 1204, and testing set 1206. In some examples, the training set is 60% of the historical data, the validation set is 20% of the historical data, and the testing set is 20% of the historical data. The system 1200 generates a plurality of sets of features for each of the training set, the validation set, and the testing set. In some examples, if the historical data includes features derived from input data from 20 sensors (e.g., sensors 1026 of FIG. 10) and 100 products (e.g., products that each correspond to the input data from the 20 sensors), a first set of features is sensors 1-10, a second set of features is sensors 11-20, the training set is products 1-60, the validation set is products 61-80, and the testing set is products 81-100. In this example, the first set of features of the training set would be data input from sensors 1-10 for products 1-60.

At block 1212, the system 1200 performs model training (e.g., via training engine 1082 of FIG. 10) using the training set 1202. In some embodiments, the system 1200 trains multiple models using multiple sets of features of the training set 1202 (e.g., a first set of features of the training set 1202, a second set of features of the training set 1202, etc.). For example, system 1200 trains a machine learning model to generate a first trained machine learning model using the first set of features in the training set (e.g., input data from sensors 1-10 for products 1-60) and to generate a second trained machine learning model using the second set of features in the training set (e.g., input data from sensors 11-20 for products 1-60). In some embodiments, the first trained machine learning model and the second trained machine learning model are combined to generate a third trained machine learning model (e.g., which is a better predictor than the first or the second trained machine learning model on its own in some embodiments). In some embodiments, sets of features used in comparing models overlap (e.g., first set of features being input data from sensors 1-15 and second set of features being input data from sensors 5-20). In some embodiments, hundreds of models are generated including models with various permutations of features and combinations of models.

At block 1214, the system 1200 performs model validation (e.g., via validation engine 1084 of FIG. 10) using the validation set 1204. The system 1200 validates each of the trained models using a corresponding set of features of the validation set 1204. For example, system 1200 validates the first trained machine learning model using the first set of features in the validation set (e.g., input data from sensors 1-10 for products 61-80) and the second trained machine learning model using the second set of features in the validation set (e.g., input data from sensors 11-20 for products 61-80). In some embodiments, the system 1200 validates hundreds of models (e.g., models with various permutations of features, combinations of models, etc.) generated at block 1212. At block 1214, the system 1200 determines an accuracy of each of the one or more trained models (e.g., via model validation) and determines whether one or more of the trained models has an accuracy that meets a threshold accuracy. Responsive to determining that none of the trained models has an accuracy that meets a threshold accuracy, flow returns to block 1212 where the system 1200 performs model training using different sets of features of the training set. Responsive to determining that one or more of the trained models has an accuracy that meets a threshold accuracy, flow continues to block 1216. The system 1200 discards the trained machine learning models that have an accuracy that is below the threshold accuracy (e.g., based on the validation set).

At block 1216, the system 1200 performs model selection (e.g., via selection engine 1085 of FIG. 10) to determine which of the one or more trained models that meet the threshold accuracy has the highest accuracy (e.g., the selected model 1208, based on the validating of block 1214). Responsive to determining that two or more of the trained models that meet the threshold accuracy have the same accuracy, flow returns to block 1212 where the system 1200 performs model training using further refined training sets corresponding to further refined sets of features for determining a trained model that has the highest accuracy.

At block 1218, the system 1200 performs model testing (e.g., via testing engine 1086 of FIG. 10) using the testing set 1206 to test the selected model 1208. The system 1200 tests, using the first set of features in the testing set (e.g., data input from sensors 1-10 for products 81-100), the first trained machine learning model to determine the first trained machine learning model meets a threshold accuracy (e.g., based on the first set of features of the testing set 1206). Responsive to accuracy of the selected model 1208 not meeting the threshold accuracy (e.g., the selected model 1208 is overly fit to the training set 1202 and/or validation set 1204 and is not applicable to other data sets such as the testing set 1206), flow continues to block 1212 where the system 1200 performs model training (e.g., retraining) using different training sets corresponding to different sets of features (e.g., data input from different sensors). Responsive to determining that the selected model 1208 has an accuracy that meets a threshold accuracy based on the testing set 1206, flow continues to block 1220. In at least block 1212, the model learns patterns in the historical data to make predictions and in block 1218, the system 1200 applies the model on the remaining data (e.g., testing set 1206) to test the predictions.

At block 1220, system 1200 uses the trained model (e.g., selected model 1208) to receive current input data 1046 and determines (e.g., extracts), from the output of the trained model, predictive data 1068 to perform corrective actions associated with the manufacturing equipment 1024 and/or production of products. In some embodiments, the current input data 1046 corresponds to the same types of features in the historical data input. In some embodiments, the current input data 1046 corresponds to a same type of features as a subset of the types of features in historical input data 1044 that is used to train the selected model 1208.

In some embodiments, current data is received. In some embodiments, current data includes current performance data 1064. In some embodiments, the current data is received from metrology equipment (e.g., metrology equipment 1028 of FIG. 10) or via user input. The model 1208 is re-trained based on the current data. In some embodiments, a new model is trained based on the current data.

In some embodiments, one or more of the operations 1210-1220 occur in various orders and/or with other operations not presented and described herein. In some embodiments, one or more of operations 1210-1220 are not be performed. For example, in some embodiments, one or more of data partitioning of block 1210, model validation of block 1214, model selection of block 1216, and/or model testing of block 1218 are not be performed.

FIGS. 13A-E are flow diagrams of methods 1300A-E associated with dynamically generating dental appliances, according to certain embodiments. In some embodiments, methods 1300A-E are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, methods 1300A-E are performed, at least in part, by predictive system 1010. In some embodiments, method 1300A is performed, at least in part, by predictive system 1010 (e.g., server machine 1070 and data set generator 1072 of FIG. 10). In some embodiments, predictive system 1010 uses method 1300A to generate a data set to at least one of train, validate, or test a machine learning model. In some embodiments, methods 1300B and 1300D are performed by server machine 1080 (e.g., training engine 1082, etc.). In some embodiments, methods 1300C and 1300E are performed by predictive server 1012 (e.g., predictive component 1014). In some embodiments, a non-transitory storage medium stores instructions that when executed by a processing device (e.g., of predictive system 1010, of server machine 1080, of predictive server 1012, etc.), cause the processing device to perform one or more of methods 1300A-E.

For simplicity of explanation, methods 1300A-E are depicted and described as a series of operations. However, operations in accordance with this disclosure can occur in various orders and/or concurrently and with other operations not presented and described herein. Furthermore, in some embodiments, not all illustrated operations are performed to implement methods 1300A-E in accordance with the disclosed subject matter. In addition, those skilled in the art will understand and appreciate that methods 1300A-E could alternatively be represented as a series of interrelated states via a state diagram or events.

Figure 13A:
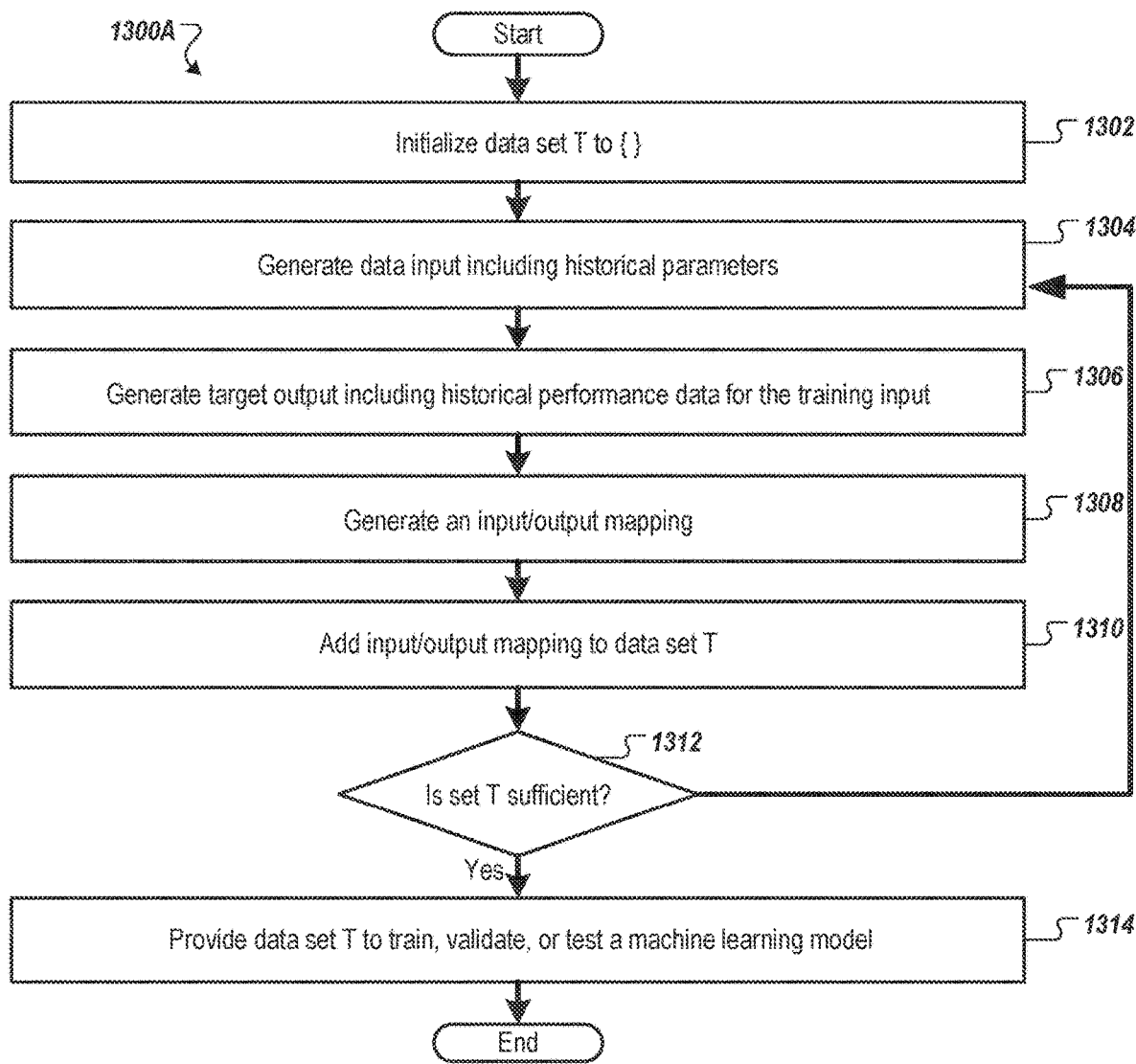
FIGS. 13A-E illustrate flow diagrams for methods associated with dynamically generating dental appliances, according to certain embodiments.

FIG. 13A is a flow diagram of a method 1300A for generating a data set for a machine learning model for generating predictive data (e.g., predictive data 1068 of FIG. 10), according to certain embodiments.

Figure 13B:
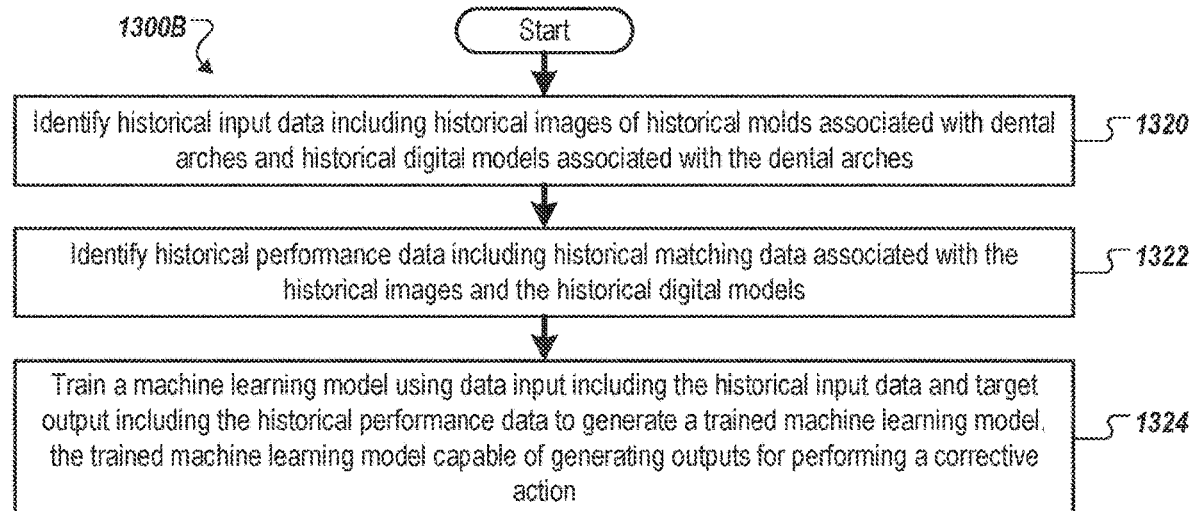

Referring to FIG. 13B, in some embodiments, at block 1302 the processing logic implementing method 1300B initializes a training set T to an empty set.

At block 1304, processing logic generates first data input (e.g., first training input, first validating input) that includes data input (e.g., historical input data 1044 of FIG. 10). In some embodiments, the first data input includes a first set of features for types of input data and a second data input includes a second set of features for types of input data (e.g., as described with respect to FIG. 11).

At block 1306, processing logic generates a first target output for one or more of the data inputs (e.g., first data input). In some embodiments, the first target output is historical performance data (e.g., historical performance data 1062 of FIG. 10).

At block 1308, processing logic optionally generates mapping data that is indicative of an input/output mapping. The input/output mapping (or mapping data) refers to the data input (e.g., one or more of the data inputs described herein), the target output for the data input (e.g., where the target output identifies historical performance data 1062), and an association between the data input(s) and the target output.

At block 1310, processing logic adds the mapping data generated at block 1308 to data set T.

At block 1312, processing logic branches based on whether data set T is sufficient for at least one of training, validating, and/or testing machine learning model 1090. If so, execution proceeds to block 1314, otherwise, execution continues back at block 1304. It should be noted that in some embodiments, the sufficiency of data set T is determined based simply on the number of input/output mappings in the data set, while in some other implementations, the sufficiency of data set T is determined based on one or more other criteria (e.g., a measure of diversity of the data examples, accuracy, etc.) in addition to, or instead of, the number of input/output mappings.

At block 1314, processing logic provides data set T (e.g., to server machine 1080) to train, validate, and/or test machine learning model 1090. In some embodiments, data set T is a training set and is provided to training engine 1082 of server machine 1080 to perform the training. In some embodiments, data set T is a validation set and is provided to validation engine 1084 of server machine 1080 to perform the validating. In some embodiments, data set T is a testing set and is provided to testing engine 1086 of server machine 1080 to perform the testing. In the case of a neural network, for example, input values of a given input/output mapping (e.g., numerical values associated with data inputs 1110) are input to the neural network, and output values (e.g., numerical values associated with target outputs 1120) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 1314, machine learning model (e.g., machine learning model 1090) can be at least one of trained using training engine 1082 of server machine 1080, validated using validating engine 1084 of server machine 1080, or tested using testing engine 1086 of server machine 1080. The trained machine learning model is implemented by predictive component 1014 (of predictive server 1012) to generate predictive data 1068 for performing corrective action associated with the manufacturing equipment 1024.

FIG. 13B is a method 1300B for training a machine learning model (e.g., model 1090 of FIG. 10) for determining predictive data (e.g., predictive data 1068 of FIG. 10) to perform a corrective action.

Referring to FIG. 13B, at block 1320 of method 1300C, the processing logic identifies sets of historical input data (e.g., historical input data 1044 of FIG. 10) including historical images of historical molds associated with dental arches and historical digital models associated with the dental arches. In some embodiments, a historical digital model is identified (e.g., via OCR processing, via QR code scanning, via barcode scanning, etc.) based on an identifier determined from a corresponding historical image. In some embodiments, a historical digital model is identified based on scanning an asset tag (e.g., RFID tag, NFC tag) associated with the model.

At block 1322, the processing logic identifies historical performance data (e.g., historical performance data 1062 of FIG. 10) including historical matching data associated with the historical images and the historical digital models. Each of the sets of the historical performance data corresponds to a respective set of historical input data of the sets of historical input data. In some embodiments, the historical performance data is indicative of whether dimensions measured from the historical images are within a threshold value of dimensions of the historical digital model. In some embodiments, the historical matching data is indicative of whether a corresponding historical mold is a threshold match to a corresponding historical digital model.

At block 1324, the processing logic trains a machine learning model using data input including the sets of historical input data and target output including the sets of historical performance data to generate a trained machine learning model. The trained machine learning model is capable of generating outputs for performing a corrective action. In some embodiments, the trained machine learning model is configured to provide output (e.g., predictive data) to determine whether a current mold matches a current digital model. Responsive to the current mold not matching the current digital model, the trained machine learning model provides output to cause a corrective action. Responsive to the current mold matching the current digital model, the trained machine learning model provides output to cause the current mold to be used to form a dental appliance.

Figure 13C:
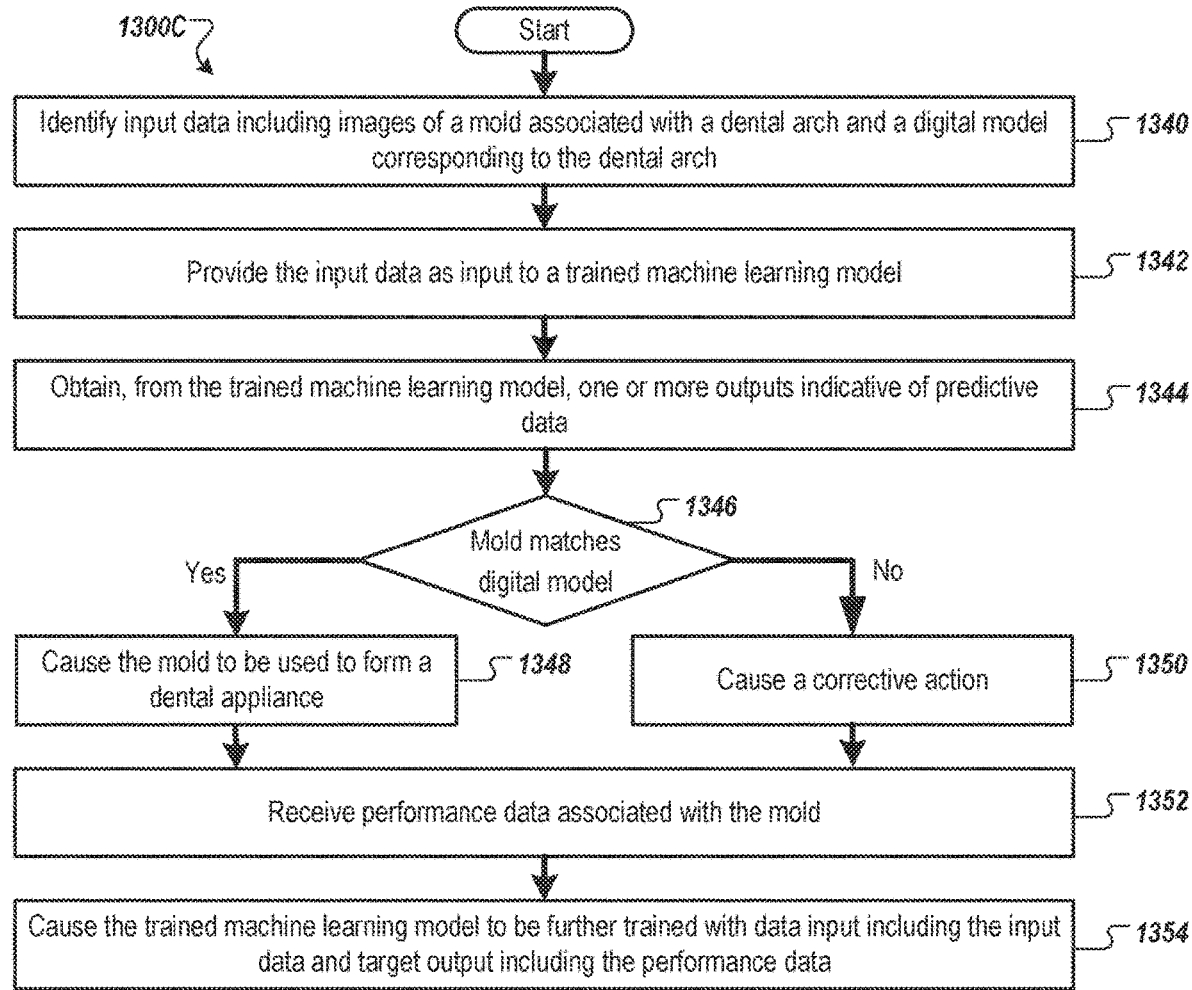

FIG. 13C is a method 1300C for using a trained machine learning model (e.g., model 1090 of FIG. 10) to cause performance of a corrective action.

Referring to FIG. 13C, at block 1340 of method 1300C, the processing logic identifies sets of input data (e.g., current input data 1046 of FIG. 10) including images of a mold associated with a dental arch and a digital model corresponding to the dental arch. The processing logic may cause an imaging device to capture the images of the mold. The processing logic may identify the digital model based on an identifier associated with the mold. In some examples, the processing logic reads the identifier from the images (e.g., via OCR processing, via QR scanning, via barcode scanning). In some examples, the processing logic receives the identifier from an asset tag (e.g., RFID tag, NFC tag) associated with (e.g., embedded in, secured to, etc.) the mold.

At block 1342, the processing logic provides the input data as input to a trained machine learning model (e.g., trained via method 1300B of FIG. 13B).

At block 1344, the processing logic obtains, from the trained machine learning model, one or more outputs indicative of predictive data (e.g., predictive data 1068 of FIG. 10).

At block 1346, the processing logic determines, based on the one or more outputs (e.g., the predictive data, the predictive matching data), whether the mold matches the digital model. Responsive to the mold matching the digital model, flow continues to block 1348. Responsive to the mold not matching the digital model, flow continues to block 1350.

At block 1348, the processing logic causes the mold to be used to form a dental appliance (e.g., see method 500 of FIG. 5).

At block 1350, the processing logic causes a corrective action. In some embodiments, the corrective action is one or more of discarding the mold, causing a new mold to be generated, providing an alert, interrupting the production of molds, changing manufacturing parameters to produce the molds, and/or the like.

At block 1352, the processing logic receives performance data (e.g., current performance data 1064 of FIG. 10) associated with the mold (e.g., inspection data of the mold, usage data of the mold, etc.).

At block 1354, the processing logic causes the trained machine learning model to be further trained (e.g., retrained) with data input including the input data (e.g., identified at block 1340) and target output including the performance data (e.g., received at block 1352).

In some embodiments, one or more of blocks 1340-1354 are repeated until the one or more outputs (e.g., predictive data) indicates that no further corrective actions are to be performed.

Although methods 1300B-C are directed towards molds, the methods can be used for other products, such as dental appliances, sheets of plastic, prosthesis molding, palatal expanders, automatic packaging wrapping systems, and/or the like.

Figure 13D:
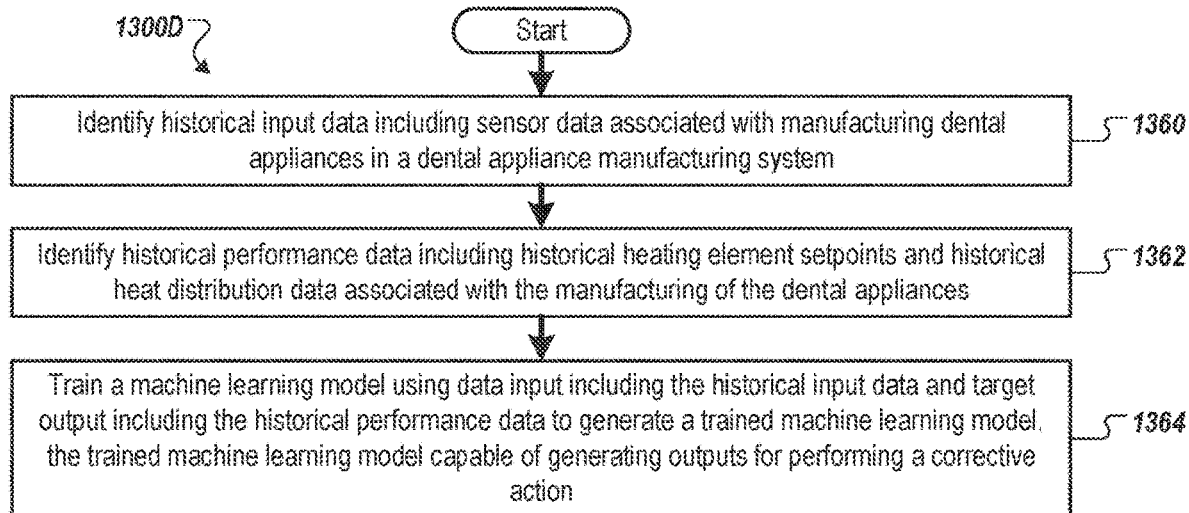

FIG. 13D is a method 1300D for training a machine learning model (e.g., model 1090 of FIG. 10) for determining predictive data (e.g., predictive data 1068 of FIG. 10) to perform a corrective action.

Referring to FIG. 13D, at block 1360 of method 1300C, the processing logic identifies sets of historical input data (e.g., historical input data 1044 of FIG. 10) including historical sensor data associated with manufacturing of dental appliances in one or more dental appliance manufacturing systems. The historical input data may include one or more of heating capacity data associated with one or more components (e.g., sheet of plastic, mold, etc.), ambient temperature data, actual temperature data, target temperature data, heating time data, and/or the like. In some embodiments, the data input is provided while the heating station of the dental appliance manufacturing system is operating (e.g., heating a sheet of plastic). In some embodiments, the sensor data is provided from multiple sensors (e.g., sensor above and below the sheet of plastic) for each zone (e.g., corresponding to a heating element of the heating station).

At block 1362, the processing logic identifies historical performance data (e.g., historical performance data 1062 of FIG. 10) including historical heating element setpoints (e.g., energy provided to the heating elements, temperature provided by the heating elements, location of the heating elements, etc.) and historical heat distribution data associated with the manufacturing of dental appliances. Each of the sets of the historical performance data corresponds to a respective set of historical input data of the sets of historical input data.

In some embodiments, the heat distribution data is one or more of an indication that the heating is substantially constant across the sheet of plastic, an indication of differences in heating over the sheet of plastic, an indication that heating meets a threshold time, an indication that heating does not meet a threshold time (e.g., heating is too fast so that it is overly aggressive and may cause defects, or heating is too slow and causes a decrease in yield).

At block 1364, the processing logic trains a machine learning model using data input including the sets of historical input data and target output including the sets of historical performance data to generate a trained machine learning model. The trained machine learning model is capable of generating outputs for performing a corrective action. In some embodiments, the trained machine learning model is configured to provide output (e.g., predictive data) for changing one or more manufacturing parameters (e.g., heating element setpoints) to cause a substantially even heat distribution on a sheet of plastic to form dental appliances.

Figure 13E:
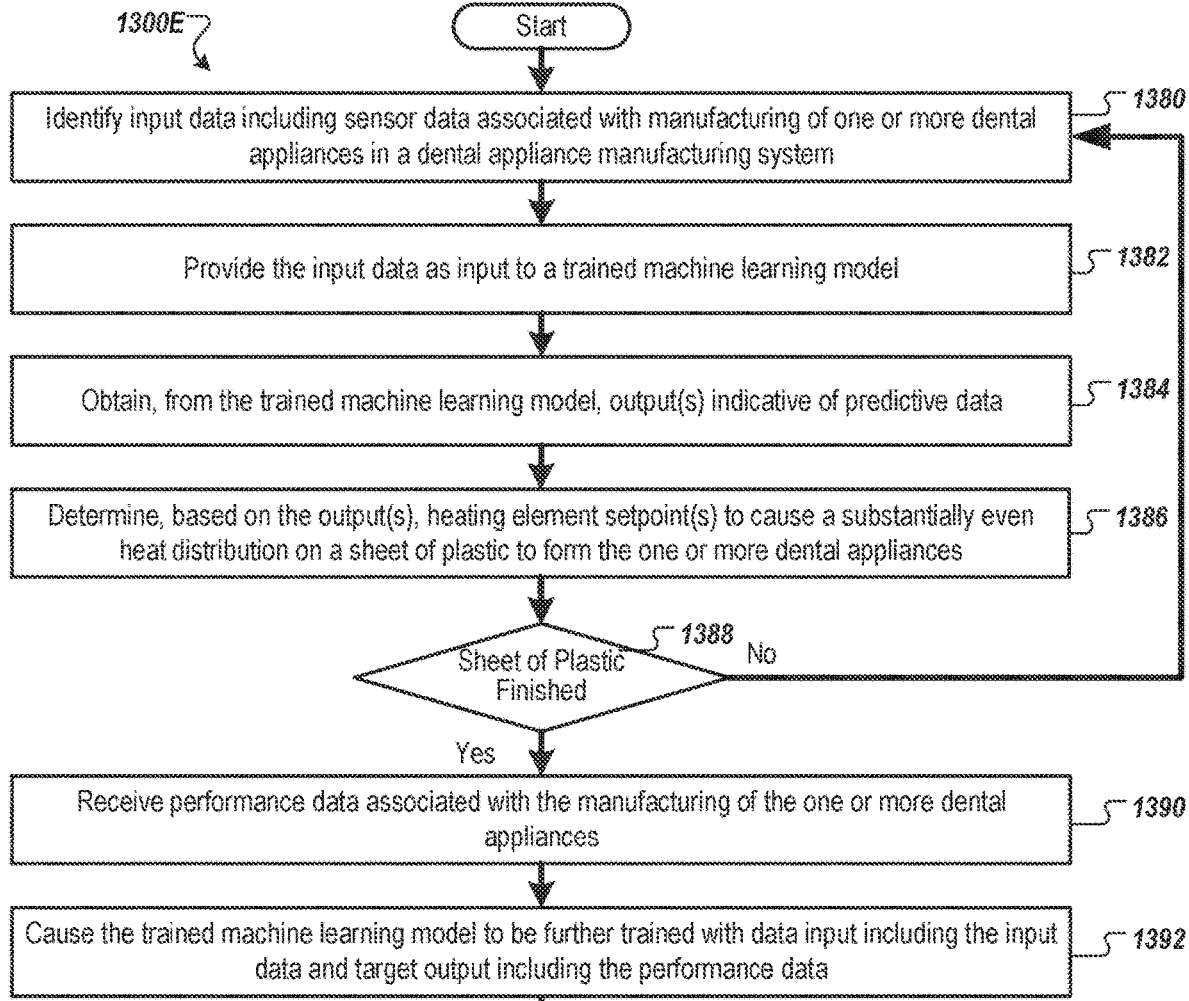

FIG. 13E is a method 1300E for using a trained machine learning model (e.g., model 1090 of FIG. 10) to cause performance of a corrective action.

Referring to FIG. 13E, at block 1380 of method 1300E, the processing logic identifies sets of input data (e.g., current input data 1046 of FIG. 10) including sensor data associated with manufacturing dental appliances in a dental appliance manufacturing system. The input data may include one or more of heating capacity data (e.g., associated with one or more of a mold associated with a dental arch or a sheet of plastic forming a dental appliance), heating time data, ambient temperature, target temperature associated with the sheet of plastic, actual temperature data associated with the sheet of plastic, and/or the like.

In some embodiments, the sensor data is received from sensors, where two or more sensors are associated with each zone of a plurality of zones of the dental appliance manufacturing system. Each zone of the plurality of zones may be associated with a corresponding heating element.

At block 1382, the processing logic provides the input data as input to a trained machine learning model (e.g., trained by method 1300D of FIG. 13D).

At block 1384, the processing logic obtains, from the trained machine learning model, outputs indicative of predictive data (e.g., predictive data 1068 of FIG. 10).

At block 1386, the processing logic determines, based on the outputs (e.g., predictive data), corrective actions. The corrective actions may include updated heating element setpoints to cause a substantially even heat distribution on a sheet of plastic to form the dental appliances. In some embodiments, the corrective action may include one or more of discarding the sheet of plastic, providing an alert, interrupting heating of the sheet of plastic, updating heating element setpoints substantially in real-time for the heating of the plastic.

In some embodiments, the dental appliance manufacturing system includes heating elements, where each heating element of the heating elements corresponds to a respective zone of zones associated with the sheet of plastic. The heating element setpoints correspond to one or more of the zones. Each of the heating element setpoints corresponds to a respective amount of energy to be provided to a corresponding heating element. The sensor data corresponds to current setpoints and the heating element setpoints correspond to updates to the current setpoints. The processing logic may cause energy to be output to one or more heating elements of the dental appliance manufacturing system to operate based on the one or more heating element setpoints.

At block 1388, the processing logic determines whether the sheet of plastic is finished being heated. Responsive to the sheet of plastic not being finished, flow returns to block 1380 where more sensor data is collected while manufacturing the dental appliances at the updated heating element setpoints. Responsive to the sheet of plastic being finished, flow continues to block 1390.

At block 1390, the processing logic receives performance data associated with the manufacturing of the dental appliances based on the updated heating element setpoints (e.g., current performance data 1064 of FIG. 10) associated with the manufacturing of the one or more dental appliances (e.g., inspection data of the heated or thermoformed sheet of plastic, inspection data of the dental appliances formed from the sheet of plastic, etc.).

At block 1392, the processing logic causes the trained machine learning model to be further trained with data input including the input data (e.g., identified at block 1380) and target output including the performance data (e.g., received at block 1390).

Although methods 1300D-E are directed towards production of dental appliances, the methods can be used for other products, such as molds, sheets of plastic, prosthesis molding, palatal expanders, automatic packaging wrapping systems, and/or the like.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
identifying one or more images of a mold of a dental arch;
identifying a digital model corresponding to the mold of the dental arch;
providing the one or more images and the digital model as input into a trained machine learning model;
receiving, from the trained machine learning model, output; and
determining, based on the output, whether the mold matches the digital model.

2. The method of claim 1 further comprising, responsive to determining the mold does not match the digital model, causing a corrective action.

3. The method of claim 1 further comprising, responsive to determining the mold matches the digital model, causing the mold to be used to form a dental appliance.

4. The method of claim 1 further comprising:
identifying, from at least one of the one or more images, an identifier associated with the dental arch; and
retrieving, based on the identifier, the digital model corresponding to the mold.

5. The method of claim 4, wherein the identifying of the identifier is via optical character recognition (OCR) of a portion of the mold or an asset tag associated with the mold.

6. A method comprising:
receiving historical images of a plurality of historical molds of dental arches;
identifying historical digital models corresponding to the plurality of historical molds;
receiving historical matching data; and
training a machine learning model based on input comprising the historical images and the historical digital models and target output comprising historical matching data to generate a trained machine learning model, wherein the trained machine learning model is configured to provide output to determine whether a current mold matches a current digital model.

7. The method of claim 6, wherein the trained machine learning model is configured to provide output to cause a corrective action responsive to the current mold not matching the current digital model.

8. The method of claim 6, wherein the trained machine learning model is configured to provide output to cause the current mold to be used to form a dental appliance responsive to the current mold matching the current digital model.

9. The method of claim 6, wherein the historical matching data is indicative of whether a corresponding historical mold is a threshold match to a corresponding historical digital model.

10. The method of claim 6, wherein each of the historical digital models is identified based on an identifier determined from a corresponding historical image of the historical images.

11. A method comprising:
receiving sensor data associated with manufacturing of one or more dental appliances in a dental appliance manufacturing system;
providing the sensor data as input into a trained machine learning model;
receiving, from the trained machine learning model, output; and
determining, based on the output, one or more heating element setpoints to cause a substantially even heat distribution on a sheet of plastic to form the one or more dental appliances.

12. The method of claim 11, wherein the input to the trained machine learning model further comprises heating capacity data associated with one or more of a mold of a dental arch or a corresponding sheet of plastic associated with forming a dental appliance of the one or more dental appliances.

13. The method of claim 11, wherein the input to the trained machine learning model further comprises heating time data.

14. The method of claim 11, wherein the sensor data comprises a first subset and a second subset, the first subset being associated with ambient temperature, and the second subset being associated with target or actual temperature data associated with the sheet of plastic.

15. The method of claim 11, wherein the dental appliance manufacturing system comprises a plurality of heating elements, wherein each heating element of the plurality of heating elements corresponds to a respective zone of a plurality of zones associated with the sheet of plastic, and wherein the one or more heating element setpoints correspond to one or more of the plurality of zones.

16. The method of claim 11, wherein each of the one or more heating element setpoints corresponds to a respective amount of energy to be provided to a corresponding heating element.

17. The method of claim 11, wherein the sensor data corresponds to current setpoints and the one or more heating element setpoints correspond to one or more updates to the current setpoints.

18. The method of claim 11 further comprising causing energy to be output to one or more heating elements of the dental appliance manufacturing system to operate based on the one or more heating element setpoints.

19. The method of claim 11, wherein the sensor data is received from a plurality of sensors, wherein two or more sensors are associated with each zone of a plurality of zones of the dental appliance manufacturing system, and wherein each zone of the plurality of zones is associated with a corresponding heating element.

20. A method comprising:
receiving historical sensor data associated with manufacturing dental appliances in a dental appliance manufacturing system;
identifying historical heating element setpoints and historical heat distribution data associated with the manufacturing of the dental appliances; and
training a machine learning model based on input data comprising the historical sensor data and target output comprising the historical heating element setpoints and the historical heat distribution data to generate a trained machine learning model, wherein the trained machine learning model is configured to provide an output for determining one or more current heating element setpoints based on current sensor data to cause a substantially even heat distribution on a sheet of plastic to form one or more dental appliances.

21. The method of claim 20, wherein the historical heat distribution data is one or more of heating that is substantially constant, heating that meets a threshold time, or heating that does not meet the threshold time.

* * * * *